(12) United States Patent
Chalifour

(10) Patent No.: US 12,060,108 B2
(45) Date of Patent: Aug. 13, 2024

(54) METHOD FOR ASSEMBLING VEHICLES OF A FAMILY OF VEHICLES AND CORRESPONDING VEHICLES

(71) Applicant: BOMBARDIER RECREATIONAL PRODUCTS INC., Valcourt (CA)

(72) Inventor: Eric Chalifour, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 367 days.

(21) Appl. No.: 17/500,445

(22) Filed: Oct. 13, 2021

(65) Prior Publication Data

US 2022/0033005 A1 Feb. 3, 2022

Related U.S. Application Data

(62) Division of application No. 17/055,911, filed as application No. PCT/IB2019/054113 on May 17, 2019, now Pat. No. 11,173,959.

(Continued)

(51) Int. Cl.
 *B62D 21/18* (2006.01)
 *B60K 5/00* (2006.01)
 (Continued)

(52) U.S. Cl.
 CPC ......... *B62D 21/183* (2013.01); *B62D 23/005* (2013.01); *B62D 27/00* (2013.01);
 (Continued)

(58) Field of Classification Search
 CPC .... B62D 21/183; B62D 23/005; B62D 27/00; B62D 33/02; B62D 33/03; B60K 2005/003; B60Y 2200/20
 See application file for complete search history.

(56) References Cited

U.S. PATENT DOCUMENTS 6,905,159 B1 * 6/2005 Saito .................. B60N 2/305
 296/65.09
8,029,021 B2 10/2011 Leonard et al.
 (Continued)

FOREIGN PATENT DOCUMENTS

JP 2015066992 A * 4/2015 ........... B60N 2/3031

OTHER PUBLICATIONS

International Search Report of PCT/IB2019/054113; Shane Thomas; Dec. 12, 2019.

(Continued)

*Primary Examiner* — Drew J Brown
(74) *Attorney, Agent, or Firm* — BCF LLP

(57) ABSTRACT

A vehicle has a frame including a front frame module defining at least in part a cockpit, and a rear frame module having a cargo bed support structure. The vehicle has a rear seat row or a cargo bed support structure extension disposed rearwardly of a front seat row. A wheelbase length measured between centers of front and rear wheels of the vehicle is approximately the same regardless of which of the rear seat row and the cargo bed support structure extension is disposed rearwardly of the front seat row. A longitudinal cargo pivot distance measured between the center of the front wheels and a cargo bed pivot axis is approximately the same regardless of which of the rear seat row and the cargo bed support structure extension is disposed rearwardly of the front seat row. A method of assembling a vehicle of a family of vehicles is also contemplated.

21 Claims, 55 Drawing Sheets

Related U.S. Application Data

(60) Provisional application No. 62/773,798, filed on Nov. 30, 2018, provisional application No. 62/672,684, filed on May 17, 2018.

(51) Int. Cl.
  B62D 23/00 (2006.01)
  B62D 27/00 (2006.01)
  B62D 33/02 (2006.01)

(52) U.S. Cl.
  CPC ..... *B60K 2005/003* (2013.01); *B60Y 2200/20* (2013.01); *B62D 33/02* (2013.01)

(56) References Cited

U.S. PATENT DOCUMENTS

| | | | |
|---|---|---|---|
| 8,303,013 B2 | 11/2012 | Horiuchi et al. | |
| 8,479,854 B1 | 7/2013 | Gagnon | |
| 8,548,710 B1 | 10/2013 | Reisenberger | |
| 8,556,324 B1* | 10/2013 | Yamamoto | B60N 2/3065 |
| | | | 296/65.09 |
| 8,672,387 B1 | 3/2014 | Kaku et al. | |
| 9,150,182 B1 | 10/2015 | Schlangen et al. | |
| 10,486,552 B2* | 11/2019 | Wakabayashi | B60H 1/16 |
| 10,640,155 B2* | 5/2020 | Sharma | B60P 3/423 |
| 2008/0308334 A1 | 12/2008 | Leonard et al. | |
| 2009/0071737 A1 | 3/2009 | Leonard et al. | |
| 2009/0121518 A1 | 5/2009 | Leonard et al. | |
| 2009/0301830 A1 | 12/2009 | Kinsman et al. | |
| 2010/0314191 A1 | 12/2010 | Deckard et al. | |
| 2011/0148144 A1* | 6/2011 | Kosuge | B60P 3/423 |
| | | | 296/183.1 |
| 2011/0156441 A1* | 6/2011 | Kosuge | B60R 5/04 |
| | | | 296/183.1 |
| 2011/0240393 A1 | 10/2011 | Hurd et al. | |
| 2012/0031688 A1 | 2/2012 | Safranski et al. | |
| 2012/0032465 A1* | 2/2012 | Morita | B62D 33/08 |
| | | | 296/26.11 |
| 2014/0022456 A1 | 1/2014 | Casagrande et al. | |
| 2014/0103627 A1 | 4/2014 | Deckard et al. | |
| 2014/0116796 A1 | 5/2014 | Poulin et al. | |
| 2014/0144719 A1 | 5/2014 | Morgan et al. | |
| 2014/0183894 A1* | 7/2014 | Yamamoto | B60P 3/423 |
| | | | 296/26.11 |
| 2014/0224563 A1 | 8/2014 | Shinbori et al. | |
| 2015/0259011 A1 | 9/2015 | Deckard et al. | |
| 2015/0375803 A1 | 12/2015 | Raska | |
| 2015/0377341 A1 | 12/2015 | Renner et al. | |
| 2016/0090130 A1 | 3/2016 | Nakao et al. | |
| 2016/0185393 A1 | 6/2016 | Nozaki et al. | |
| 2016/0185398 A1 | 6/2016 | Yamamoto | |
| 2016/0186705 A1 | 6/2016 | Tsumiyama et al. | |
| 2016/0332495 A1 | 11/2016 | Franker et al. | |
| 2016/0347137 A1 | 12/2016 | Despres-Nadeau et al. | |
| 2017/0028881 A1 | 2/2017 | Proulx et al. | |
| 2017/0029035 A1 | 2/2017 | Dube et al. | |
| 2017/0174027 A1 | 6/2017 | Mailhot et al. | |
| 2017/0174141 A1 | 6/2017 | Jhant et al. | |
| 2017/0232905 A1 | 8/2017 | Jhant et al. | |
| 2018/0029558 A1 | 2/2018 | Beauchemin et al. | |
| 2018/0178858 A1 | 6/2018 | Hollman et al. | |
| 2018/0186413 A1 | 7/2018 | Tsumiyama et al. | |
| 2018/0222311 A1 | 8/2018 | Toupin et al. | |
| 2018/0222395 A1 | 8/2018 | Roy et al. | |
| 2018/0334199 A1 | 11/2018 | Ueno et al. | |
| 2019/0009823 A1 | 1/2019 | Savard et al. | |
| 2019/0168658 A1* | 6/2019 | Keziah | B62D 47/003 |
| 2019/0176613 A1 | 6/2019 | Bastien et al. | |
| 2019/0308672 A1 | 10/2019 | Schounard et al. | |
| 2020/0282829 A1 | 9/2020 | Dumas et al. | |
| 2021/0023936 A1 | 1/2021 | Marietta | |
| 2021/0031580 A1 | 2/2021 | Booth et al. | |
| 2021/0033183 A1 | 2/2021 | Dumas et al. | |
| 2021/0188084 A1 | 6/2021 | Safranski et al. | |
| 2021/0237802 A1* | 8/2021 | Chalifour | B62D 23/005 |

OTHER PUBLICATIONS

ATV Riders, 2009 Kawasaki MULE™ 4010 TRANSAX4® Side X Side Utility Vehicle, retrieved from http://www.atvriders.com/atvmodels/kaeasaki-2009-mule-4010-trans-4x4-side-x-side-utv.html on Nov. 16, 2020.

* cited by examiner

METHOD FOR ASSEMBLING VEHICLES OF A FAMILY OF VEHICLES AND CORRESPONDING VEHICLES

CROSS-REFERENCE

The present application is a divisional of U.S. patent application Ser. No. 17/055,911, filed on Nov. 16, 2020, which is a national phase entry of PCT Patent Application No. PCT/IB2019/054113, filed on May 17, 2019, which claims priority to U.S. Provisional Patent Application No. 62/773,798, filed on Nov. 30, 2018 and U.S. Provisional Patent Application No. 62/672,684, filed on May 17, 2018, the entirety of each of which is incorporated herein by reference.

FIELD OF TECHNOLOGY

The present technology relates to assembling various vehicles of a family of vehicles by connecting multiple frame modules, and to side-by-side off-road vehicles having a storage compartment.

BACKGROUND

Side-by-side off-road vehicles are typically used in off-road conditions. Different models of side-by-side off-road vehicles are designed to offer different features for particular applications. For instance, in some cases, some vehicles are provided with additional seating for accommodating more passengers in the vehicle. In other cases, additional space for transporting cargo is prioritized by equipping the vehicle with additional cargo holding space in the form of a larger cargo bed disposed behind a cockpit of the vehicle.

While it is desirable for a given manufacturer to offer different models of side-by-side off-road vehicles with different features, the variations in the vehicle models can complicate their design and/or assembly. Notably, the frames of the various off-road vehicle models offered by a manufacturer are typically substantially different in order to accommodate particular features (e.g., additional seating or cargo space). Consequently, the manufacturer will typically have a significant amount of different frame components on hand to be able to manufacture the different vehicle models. Moreover, if the variations in the frames of the vehicles are important enough, the vehicles' frames may require complete redesigns to ensure that each vehicle frame can properly support the loads exerted thereon by the components mounted on the frame.

Furthermore, although the addition of a cargo bed substantially increases the cargo carrying capacity of side-by-side off-road vehicles, users may not want to put all of their cargo in the cargo bed. The cargo bed is typically pivotable to permit easy dumping of its content, such a soil for example. As such, should a user carry other things in the cargo bed in addition to the cargo that is to be dumped, the user has to remove these other things before dumping the cargo that is to be dumped in order to prevent these other things from being dumped at the same time. Once this cargo is dumped, the user as to put these other things back in the cargo bed. This is inconvenient to the user. As such it would be desirable to provide other locations in the vehicle to store items. However, due to the compact nature of side-by-side off-road vehicles, the cockpit, the power pack (i.e. engine, transmission and associated components), the air intake system, the exhaust system, the fuel tank and the cargo bed occupy most of the space in the vehicle. Some side-by-side off-road vehicles are provided with storage compartments in the cockpit, such as a glove box for example, but these are relatively small, thus only permitting the storage of small items.

In addition, the cargo bed is typically not covered. As such, anything stored in it is exposed to the elements, which may not be desirable for some cargo. Although a tarpaulin can be used to cover the cargo stored in the cargo bed, this can be inconvenient to the user.

There is therefore a desire for a method for assembling multiple vehicles of a family of vehicles having different functional characteristics, as well as for a side-by-side off-road vehicle having storage capacity in addition to the storage capacity provided by a cargo bed to address at least in part some of the aforementioned drawbacks.

SUMMARY

It is an object of the present technology to ameliorate at least some of the inconveniences present in the prior art.

As will be described in greater detail below, in some aspects, the present technology provides for different frame "modules" that are connectable to one another and can be adapted in different configurations to assemble different vehicles of a family of vehicles, with each vehicle of the family sharing common characteristics. Specifically, by assembling the different frame modules in the manners described herein, various vehicle models can be produced offering different features (e.g., greater storage capacity, additional seating) but which share certain dimensional characteristics that are common to each vehicle of the family. These common dimensional characteristics may facilitate the design of the vehicles' frames. Moreover, supply chain management may be also be facilitated as one or more common frame modules can be used to assemble the different vehicles.

According to an aspect of the present technology, there is provided a method of assembling a vehicle of a family of vehicles, including at least a first vehicle and a second vehicle. The method includes providing a front frame module, providing a rear frame module and providing a group of cargo beds. The front frame module defines at least in part a cockpit of the vehicle including a front seat row space adapted to accommodate a front seat row including at least a driver seat. The front frame module defines a configurable space disposed rearward of the front seat row space. The front frame module includes a front suspension mounting structure for mounting left and right front suspension assemblies of the vehicle. The left and right front suspension assemblies are configured to operatively connect left and right front wheels of the vehicle to the front frame module. The rear frame module defines at least in part a motor compartment of the vehicle for supporting a motor of the vehicle. The rear frame module includes: a rear suspension mounting structure for mounting left and right rear suspension assemblies of the vehicle; and a cargo bed support structure for supporting a cargo bed of the vehicle. The left and right rear suspension assemblies are configured to operatively connect left and right rear wheels to the rear frame module. The cargo bed support structure defines at least in part a cargo bed pivot for pivotably mounting the cargo bed. The group of cargo beds includes a short cargo bed and a long cargo bed. The long cargo bed has a length that is greater than a length of the short cargo bed. The method also includes, when assembling the first vehicle: connecting the front frame module to the rear frame module; installing the front seat row in the front seat row space defined by the front frame module; installing a rear seat row in the configurable space defined by the front frame module such that the rear seat row is disposed rearwardly of the front seat row; mounting the short cargo bed to the cargo bed pivot; mounting first front suspension assemblies and first rear suspension assemblies to the front and rear frame modules respectively; and mounting first front wheels and first rear wheels to the first front and first rear suspension assemblies respectively. The first vehicle has a first wheelbase length measured longitudinally between respective centers of the first front and first rear wheels. The first vehicle has a first longitudinal cargo pivot distance measured between the center of the first front wheels and a cargo bed pivot axis defined by the cargo bed pivot. The method also includes, when assembling the second vehicle: connecting the front frame module to the rear frame module; installing the front seat row in the front seat row space defined by the front frame module; mounting the long cargo bed to the cargo bed pivot; mounting second front suspension assemblies and second rear suspension assemblies to the front and rear frame modules respectively; and mounting second front wheels and second rear wheels to the second front and second rear suspension assemblies respectively. The second vehicle has a second wheelbase length measured longitudinally between the respective centers of the second front and second rear wheels. The second vehicle has a second longitudinal cargo pivot distance measured between the center of the second front wheels and the cargo bed pivot axis defined by the cargo bed pivot. The first and second wheelbase lengths are approximately the same. The first and second longitudinal cargo pivot distances are approximately the same.

In some embodiments, the method also includes, when assembling the second vehicle: installing a storage compartment structure on the front frame module such that the configurable space defines at least in part a storage compartment extending rearwardly of the front seat row.

In some embodiments, the front frame module includes: a lower frame structure for supporting a storage compartment floor and vertically-extending frame members extending vertically from the lower frame structure. Installing the storage compartment structure includes connecting the storage compartment structure to the vertically-extending frame members. The storage compartment structure defines at least in part a top of the storage compartment such that the storage compartment structure and the storage compartment floor partly define the storage compartment therebetween.

In some embodiments, when assembling the second vehicle, the long cargo bed extends longitudinally, in a lowered position, over at least a portion of the configurable space defined by the front frame module.

In some embodiments, the method also includes, when assembling the first vehicle, connecting a long roll cage to the front frame module, the long roll cage extending over the front seat row and the rear seat row. The method also includes, when assembling the second vehicle, connecting a short roll cage to the front frame module, the short roll cage extending over the front seat row. The long roll cage has a length that is greater than a length of the short roll cage.

In some embodiments, the method also includes providing a family of roll cages. The family of roll cages includes the long roll cage and the short roll cage. Each roll cage of the family of roll cages shares common components including: front left and front right roll cage legs and rear left and rear right roll cage legs.

In some embodiments, the front frame module includes: first left and right roll cage mounts; second left and right roll cage mounts located longitudinally rearward of the first roll cage mounts; and third left and right roll cage mounts located longitudinally rearward of the second roll cage mounts. The method also includes, when assembling the first vehicle: connecting the front left and front right roll cage legs to the first roll cage mounts; connecting intermediate left and intermediate right roll cage legs to the second roll cage mounts; connecting the rear left and rear right roll cage legs to the third roll cage mounts; and connecting the front, intermediate and rear roll cage legs to one another.

In some embodiments, the method also includes, when assembling the second vehicle: connecting the front left and front right roll cage legs to the first roll cage mounts; and connecting the rear left and rear right roll cage legs to the second roll cage mounts.

In some embodiments, the front frame module includes: a lower frame structure for supporting a cockpit floor and vertically-extending frame members extending vertically from the lower frame structure at a rear portion of the front frame module. The vertically-extending frame members define the third roll cage mounts.

In some embodiments, the family of vehicles includes a third vehicle. The front frame module is a first front frame module. The front suspension mounting structure is a first front suspension mounting structure. The rear frame module is a first rear frame module. The method also includes: providing a second front frame module and providing a second rear frame module. The second front frame module defines at least in part the cockpit of the vehicle. The cockpit is adapted to accommodate the front seat row. The second front frame module includes a second front suspension mounting structure for mounting the left and right front suspension assemblies of the vehicle. The left and right front suspension assemblies are configured to operatively connect the left and right front wheels of the vehicle to the second front frame module. The second rear frame module includes: a second rear suspension mounting structure for mounting additional left and right rear suspension assemblies of the vehicle and a second cargo bed support structure for supporting the cargo bed of the vehicle. The additional left and right rear suspension assemblies are configured to operatively connect additional left and right rear wheels to the second rear frame module. The cargo bed support structure defines at least in part a second cargo bed pivot for pivotably mounting the cargo bed. The method also includes, when assembling the third vehicle: connecting the second front frame module, the first rear frame module and the second rear frame module to one another such that the second rear frame module is rearward of the first rear frame module; mounting the long cargo bed to the second cargo bed pivot; mounting third front suspension assemblies to the second front frame module; mounting third rear suspension assemblies to the first rear frame module; mounting the additional rear suspension assemblies to the second rear frame module; mounting third front wheels, third rear wheels and additional rear wheels to the third front suspension assemblies, the third rear suspension assemblies and additional rear suspension assemblies respectively. The third vehicle has a third wheelbase length measured longitudinally between the center of the third front wheels and a center of the additional rear wheels. The third vehicle has a third longitudinal cargo pivot distance measured between the center of the third front wheels and a second cargo bed pivot axis defined by the second cargo bed pivot. The first, second and third wheelbase lengths are approximately the same. The first, second and third longitudinal cargo pivot distances are approximately the same.

In some embodiments, the first front frame module includes a first top portion and a first base portion extending below and connected to the first top portion. The second front frame module includes a second top portion and a second base portion extending below and connected to the second top portion. The first top portion is identical to the second top portion. The first base portion is different from the second base portion.

In some embodiments, the first top portion includes at least part of a roll cage of the vehicle.

In some embodiments, the first base portion includes a first lower frame structure for supporting a cockpit floor. The second base portion includes a second lower frame structure for supporting the cockpit floor. The first lower frame structure has a length that is greater than a length of the second lower frame structure.

In some embodiments, the first front frame module includes first rear roll cage legs defining at least in part a roll cage of the vehicle. The first lower frame structure extends rearwardly of the first rear roll cage legs. The second front frame module includes second rear roll cage legs defining at least in part the roll cage of the vehicle. The second rear roll cage legs extending rearwardly of the second lower frame structure.

In some embodiments, the motor is an internal combustion engine. The method also includes, when assembling the first vehicle: mounting a first engine to the rear frame module; mounting a first continuously variable transmission (CVT) to the rear frame module; and connecting a first air intake conduit to one of the first engine and the first CVT for feeding air thereto. The first air intake conduit defines an inlet located rearward of the rear seat row. The method also includes, when assembling the second vehicle: mounting a second engine to the rear frame module; mounting a second CVT to the rear frame module; and connecting a second air intake conduit to the one of the second engine and the second CVT for feeding air thereto. An inlet of the second air intake conduit is located rearward of the cockpit of the vehicle and frontward of the rear frame module.

In some embodiments, the motor is an internal combustion engine. The method also includes, when assembling the third vehicle: mounting the engine to the first rear frame module; mounting a continuously variable transmission (CVT) to the first rear frame module; and connecting an air intake conduit to one of the engine and the CVT for feeding air thereto. The air intake conduit defines an inlet located rearward of the cockpit of the vehicle. The inlet extends above the first rear frame module.

In some embodiments, the front frame module includes: a first sub-module including the front suspension mounting structure; and a second sub-module connected to the first sub-module. The second-sub module is disposed rearwardly of the first sub-module. The second sub-module defines the configurable space. When assembling the first vehicle, the rear seat row is installed in the configurable space defined by the second sub-module. When assembling the second vehicle, the long cargo bed extends longitudinally, in the lowered position, over at least a rear portion of the configurable space defined by the second-sub module.

In some embodiments, each of the short cargo bed and the long cargo bed has a lock for retaining the cargo bed in a lowered position. When assembling the first vehicle, the lock of the short cargo bed engages, in the lowered position, a first lock-engaging frame subassembly of the rear frame module. When assembling the second vehicle, the lock of the long cargo bed engages, in the lowered position, a second lock-engaging frame subassembly disposed on the front frame module. The first lock-engaging frame subassembly and the second lock-engaging frame subassembly have substantially similar geometries.

In some embodiments, each of the first and second lock-engaging frame subassemblies includes: a laterally-extending frame member for engaging the lock; and a supporting frame member connected to and supporting the laterally-extending frame member. The laterally-extending frame member is disposed at a given angle relative to the laterally-extending frame member. The given angle is substantially the same in the first lock-engaging frame subassembly and the second lock-engaging frame subassembly.

According to another aspect of the present technology, there is provided a vehicle. The vehicle includes a frame including a front frame module and a rear frame module connected to the front frame module. The front frame module defines at least in part a cockpit of the vehicle including a front seat row space. The front frame module includes a front suspension mounting structure. The rear frame module includes a rear suspension mounting structure and a cargo bed support structure defining at least in part a cargo bed pivot. The vehicle also includes a front seat row, including at least a driver seat, supported in the front seat row space defined by the front frame module. The vehicle also includes one of: a rear seat row disposed rearwardly of the front seat row; and a cargo bed support structure extension disposed rearwardly of the front seat row. The vehicle also includes: a motor supported by the frame; left and right front suspension assemblies mounted to the front suspension mounting structure; left and right rear suspension assemblies mounted to the rear suspension mounting structure; left and right front wheels mounted to the front suspension assemblies; left and right rear wheels mounted to the rear suspension assemblies; and one of a short cargo bed and a long cargo bed pivotably mounted to the cargo bed pivot. The long cargo bed has a length that is greater than a length of the short cargo bed. The one of the short cargo bed and the long cargo bed is: the short cargo bed if the one of the rear seat row and the cargo bed support structure extension is the rear seat row; and the long cargo bed if the one of the rear seat row and the cargo bed support structure extension is the cargo bed support structure extension. The vehicle has: a wheelbase length measured longitudinally between respective centers of the front and rear wheels, and a longitudinal cargo pivot distance measured between the center of the front wheels and a cargo bed pivot axis defined by the cargo bed pivot. The wheelbase length is approximately the same regardless of the one of the rear seat row and the cargo bed support structure extension being disposed rearwardly of the front seat row. The longitudinal cargo pivot distance is approximately the same regardless of the one of the rear seat row and the cargo bed support structure extension being disposed rearwardly of the front seat row.

In some embodiments, the rear frame module defines at least in part the motor compartment of the frame. The motor is at least partly supported in the rear frame module.

In some embodiments, the one of the rear seat row and the cargo bed support structure extension is the rear seat row. The front frame module includes: first left and right roll cage mounts; second left and right roll cage mounts located longitudinally rearward of the first roll cage mounts; and third left and right roll cage mounts located longitudinally rearward of the second roll cage mounts. The vehicle also includes: front left and front right roll cage legs connected to the first roll cage mounts; intermediate left and intermediate right roll cage legs connected to the second roll cage mounts; and rear left and rear right roll cage legs connected to the third roll cage mounts. The front, intermediate and rear roll cage legs are connected to one another. The short cargo bed is disposed rearwardly of the third roll cage mounts.

In some embodiments, the one of the rear seat row and the cargo bed support structure extension is the cargo bed support structure extension. The front frame module includes: first left and right roll cage mounts; second left and right roll cage mounts located longitudinally rearward of the first roll cage mounts; and third left and right roll cage mounts located longitudinally rearward of the second roll cage mounts. The vehicle also includes: front left and front right roll cage legs connected to the first roll cage mounts; and rear left and rear right roll cage legs connected to the second roll cage mounts. The long cargo bed extends, in a lowered position, forwardly of the third roll cage mounts.

In some embodiments, the front frame module includes: a lower frame structure supporting a storage compartment floor; and vertically-extending frame members extending vertically from the lower frame structure. The frame also includes a storage compartment structure connected to the vertically-extending frame members. The storage compartment structure defines at least in part a top of a storage compartment such that the storage compartment structure and the storage compartment floor partly define the storage compartment therebetween.

In some embodiments, the long cargo bed extends longitudinally, in the lowered position, over at least a portion of the storage compartment.

In some embodiments, the front frame module includes: a first sub-module including the front suspension mounting structure; and a second sub-module connected to the first sub-module. The second sub-module defines a configurable space. The second-sub module is disposed rearwardly of the first sub-module. The one of the rear seat row and the cargo bed support structure extension is the rear seat row. The second-sub module accommodates at least partly the rear seat row in the configurable space.

In some embodiments, the one of the rear seat row and the cargo bed support structure extension is the cargo bed support structure extension. The long cargo bed extends longitudinally, in a lowered position, over at least a portion of the configurable space of the second-sub module.

In some embodiments, the front frame module is one of a first front frame module and a second front frame module. The first front frame module includes a first top portion and a first base portion extending below and connected to the first top portion. The second front frame module includes a second top portion and a second base portion extending below and connected to the second top portion. The first top portion is identical to the second top portion and the first base portion is different from the second base portion.

In some embodiments, the first and second top portions each include at least part of a roll cage of the vehicle.

In some embodiments, the first base portion includes a first lower frame structure for supporting a cockpit floor. The second base portion includes a second lower frame structure for supporting the cockpit floor. The first lower frame structure has a length that is greater than a length of the second lower frame structure.

In some embodiments, the rear frame module is a rearmost rear frame module. The rear suspension mounting structure is a rearmost rear suspension mounting structure. The rear suspension assemblies are rearmost rear suspension assemblies. The rear wheels are rearmost rear wheels. The one of the rear seat row and the cargo bed support structure extension is the cargo bed support structure extension. The frame also includes a central frame module. The central frame module is connected between the front frame module and the rearmost rear frame module. The central frame module defines at least in part the motor compartment. The motor is at least partly supported in the central frame module. The central frame module includes a central suspension mounting structure. The vehicle also includes: left and right central suspension assemblies mounted to the central suspension mounting structure; and left and right central wheels mounted to the central suspension assemblies.

In some embodiments, each of the short cargo bed and the long cargo bed has a lock for retaining the cargo bed in a lowered position. The rear frame module has a first lock-engaging frame subassembly for engaging and supporting the lock of either of the short and long cargo beds. The cargo bed support structure extension has a second lock-engaging frame subassembly for engaging and supporting the lock of the long cargo bed. The first and second lock-engaging frame subassemblies have substantially similar geometries.

In some embodiments, each of the first and second lock-engaging frame subassemblies includes: a laterally-extending frame member for engaging the lock; and a supporting frame member connected to and supporting the laterally-extending frame member. The laterally-extending frame member is disposed at a given angle relative to the laterally-extending frame member. The given angle is substantially the same in the first lock-engaging frame subassembly and the second lock-engaging frame subassembly.

According to another aspect of the present technology, there is provided a method of assembling a vehicle of a family of vehicles, including at least a first vehicle and a second vehicle. The method includes providing a front frame module, providing a rear frame module and providing a group of cargo beds. The front frame module defines at least in part a cockpit of the vehicle. The front frame module includes a front suspension mounting structure for mounting left and right front suspension assemblies of the vehicle. The left and right front suspension assemblies are configured to operatively connect left and right front wheels of the vehicle to the front frame module. The rear frame module defines at least in part a motor compartment of the vehicle for supporting a motor of the vehicle. The rear frame module includes: a rear suspension mounting structure for mounting left and right rear suspension assemblies of the vehicle; and a cargo bed support structure for supporting a cargo bed of the vehicle. The left and right rear suspension assemblies are configured to operatively connect left and right rear wheels to the rear frame module. The cargo bed support structure defines at least in part a cargo bed pivot for pivotably mounting the cargo bed. The group of cargo beds includes a short cargo bed and a long cargo bed. The long cargo bed has a length that is greater than a length of the short cargo bed. The method also includes, when assembling the first vehicle: connecting the front frame module to the rear frame module; mounting the short cargo bed to the cargo bed pivot; mounting first front suspension assemblies and first rear suspension assemblies to the front and rear frame modules respectively; and mounting first front wheels and first rear wheels to the first front and first rear suspension assemblies respectively. The first vehicle has a first wheelbase length measured longitudinally between respective centers of the first front and first rear wheels. The first vehicle has a first longitudinal cargo pivot distance measured between the center of the first front wheels and a cargo bed pivot axis defined by the cargo bed pivot. The method also includes, when assembling the second vehicle: connecting the front frame module to the rear frame module; mounting the long cargo bed to the cargo bed pivot; mounting second front suspension assemblies and second rear suspension assemblies to the front and rear frame modules respectively; and mounting second front wheels and second rear wheels to the second front and second rear suspension assemblies respectively. The second vehicle has a second wheelbase length measured longitudinally between the respective centers of the second front and second rear wheels. The second vehicle has a second longitudinal cargo pivot distance measured between the center of the second front wheels and the cargo bed pivot axis defined by the cargo bed pivot. The first and second wheelbase lengths are approximately the same. The first and second longitudinal cargo pivot distances are approximately the same.

According to another aspect of the present technology, there is provided a side-by-side off-road vehicle having a cockpit, a driver seat disposed in the cockpit, a passenger seat disposed in the cockpit, the driver and passenger seats being disposed side-by-side, a storage compartment disposed rearward of the cockpit, a motor compartment disposed rearward of the storage compartment, a frame defining at least in part the cockpit, the storage compartment and the motor compartment, two front ground engaging members operatively connected to the frame, two rear ground engaging members operatively connected to the frame, a motor disposed at least in part in the motor compartment, the motor being operatively connected to at least two of the ground engaging members, and a cargo bed pivotally connected to the frame. The cargo bed is pivotable between a lowered position and raised position. In the lowered position, the cargo bed extends over at least a portion of the motor compartment and at least a portion of the storage compartment. At least one first partition is disposed between the cockpit and the storage compartment. The at least one first partition defines at least in part a front of at least a portion of the storage compartment. At least one second partition is disposed between the storage compartment and the motor compartment. The at least one second partition defines at least in part a rear of at least a portion of the storage compartment. A floor is disposed between the at least one first partition and the at least one second partition. The floor defines at least in part a bottom of the storage compartment. The storage compartment has a left access aperture defined in a left side of the vehicle and a right access aperture defined in a right side of the vehicle. The storage compartment defines a storage space. The storage space extends continuously from the left access aperture to the right access aperture.

In some embodiments, a left door selectively closes the left access aperture, and a right door selectively closes the right access aperture.

In some embodiments, when the left and right doors close the left and right access apertures respectively, a portion of the storage compartment is disposed closer to a front of the vehicle than the left and right doors. The portion of the storage compartment is disposed under at least one of the driver seat and the passenger seat.

In some embodiments, the left and right doors are removable from the left and right access apertures respectively.

In some embodiments, the frame has a front frame section defining at least in part the cockpit, a central frame section defining at least in part the storage compartment, and a rear frame section defining at least in part the motor compartment. The central frame section has an upper left central frame member extending longitudinally from the rear frame section to the front frame section, the upper left central frame member defining at least in part a top of the left access aperture, and an upper right central frame member extending longitudinally from the rear frame section to the front frame section, the upper right central frame member defining at least in part at top of the right access aperture.

In some embodiments, the frame has a front frame section defining at least in part the cockpit, a central frame section defining at least in part the storage compartment, and a rear frame section defining at least in part the motor compartment. The side-by-side off-road vehicle also has a roll cage connected to the front frame section.

In some embodiments, the central frame section has an upper central frame structure extending over the storage compartment. In the lowered position, the cargo bed extends over at least a portion of the upper central frame structure. The upper central frame structure is connected between the front frame section and the rear frame section. A front left portion of the upper central frame structure is connected to a vertically extending left frame member. A front right portion of the upper central frame structure is connected to a vertically extending right frame member. A rear left leg of the roll cage is connected to the vertically extending left frame member. A rear right leg of the roll cage is connected to the vertically extending right frame member.

In some embodiments, a first fastener fastens the front left portion of the upper central frame structure to the vertically extending left frame member. A second fastener fastens the front right portion of the upper central frame structure to the vertically extending right frame member. A third fastener fastens the rear left leg of the roll cage to the vertically extending left frame member. A fourth fastener fastens the rear right leg of the roll cage is connected to the vertically extending right frame member. The third fastener is vertically higher than the first fastener. The fourth fastener is vertically higher than the second fastener.

In some embodiments, the vertically extending left frame member is a first vertically extending left frame member, and the vertically extending right frame member is a first vertically extending right frame member. A rear left portion of the upper central frame structure is connected to a second vertically extending left frame member. The second vertically extending left frame member is rearward of the first vertically extending left frame member. A rear right portion of the upper central frame structure is connected to a second vertically extending right frame member. The second vertically extending left frame member is rearward of the first vertically extending left frame member. The left access aperture is disposed longitudinally between the first and second vertically extending left frame members. The right access aperture is disposed longitudinally between the first and second vertically extending right frame members.

In some embodiments, a continuously variable transmission (CVT) operatively connects the motor to the at least two of the ground engaging members. The CVT is disposed at least in part in the motor compartment rearward of the second vertically extending left frame member and of the second vertically extending right frame member.

In some embodiments, a top panel is disposed between the at least one first partition and the at least one second partition. The top panel defines at least in part a top of the storage compartment.

In some embodiments, the frame has an upper central frame structure extending over the top panel. In the lowered position, the cargo bed extends over at least a portion of the upper central frame structure.

In some embodiments, at least one air intake conduit is disposed vertically between the top panel and the upper central frame structure.

In some embodiments, the top panel defines at least one recess, and the at least one air intake conduit is disposed in the at least one recess.

In some embodiments, the motor is an internal combustion engine. The at least one air intake conduit includes an engine air intake conduit fluidly connected to the engine for supplying air to the engine.

In some embodiments, a continuously variable transmission (CVT) operatively connects the engine to the at least two of the ground engaging members. A CVT housing houses the CVT. The at least one air intake conduit also includes a CVT air intake conduit fluidly connected to the CVT housing for supplying air inside the CVT housing.

In some embodiments, an inlet of the engine air intake conduit is disposed rearward of the seats above the storage compartment. An inlet of the CVT air intake conduit is disposed rearward of the seats above the storage compartment.

In some embodiments, a continuously variable transmission (CVT) operatively connects the motor to the at least two of the ground engaging members. A CVT housing houses the CVT. The at least one air intake conduit also includes a CVT air intake conduit fluidly connected to the CVT housing for supplying air inside the CVT housing.

In some embodiments, the frame has an upper central frame structure extending over the storage compartment. In the lowered position, the cargo bed extends over at least a portion of the upper central frame structure.

In some embodiments, at least one air intake conduit is disposed vertically between the storage compartment and the upper central frame structure.

In some embodiments, the motor is an internal combustion engine. The at least one air intake conduit includes an engine air intake conduit fluidly connected to the engine for supplying air to the engine.

In some embodiments, a continuously variable transmission (CVT) operatively connects the motor to the at least two of the ground engaging members. A CVT housing houses the CVT. The at least one air intake conduit also includes a CVT air intake conduit fluidly connected to the CVT housing for supplying air inside the CVT housing.

In some embodiments, a lock is connected to the cargo bed. The lock selectively engages a frame member of the upper central frame structure for selectively locking the cargo bed in the lowered position. In the lowered position of the cargo bed, the lock is above the storage compartment.

In some embodiments, a fuel tank is disposed at least in part in the motor compartment rearward of the at least one second partition. The motor is an internal combustion engine.

In some embodiments, a continuously variable transmission (CVT) operatively connects the motor to the at least two of the ground engaging members. The CVT is disposed at least in part in the motor compartment rearward of the at least one second partition. The CVT and the fuel tank are disposed on opposite lateral sides of the engine.

In some embodiments, the two rear ground engagement members are disposed rearward of the storage compartment.

In some embodiments, a length of the cargo bed is greater than a horizontal distance measured from a front-most point of the vehicle to a front-most point of the cargo bed when the cargo bed is in the lowered position.

In some embodiments, the storage space extends under at least one of the passenger and driver seats.

In some embodiments, the storage space extends under the passenger seat and the driver seat.

For purposes of the present application, terms related to spatial orientation when referring to a vehicle and components in relation to the vehicle, such as "forwardly", "rearwardly", "left", "right", "above" and "below", are as they would be understood by a driver of the vehicle sifting thereon in an upright driving position, with the vehicle steered straight-ahead.

Embodiments of the present technology each have at least one of the above-mentioned objects and/or aspects, but do not necessarily have all of them. It should be understood that some aspects of the present technology that have resulted from attempting to attain the above-mentioned objects may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a family of side-by-side off-road vehicles, including vehicles 10, 510, 610. While the illustrated side-by-side off-road vehicles 10, 510, 610 are equipped with wheels, it is contemplated that the present technology could be applied to side-by-side off road vehicles having two or more of the wheels replaced by other types of ground engaging members (e.g., skis or track assemblies).

Figure 1:
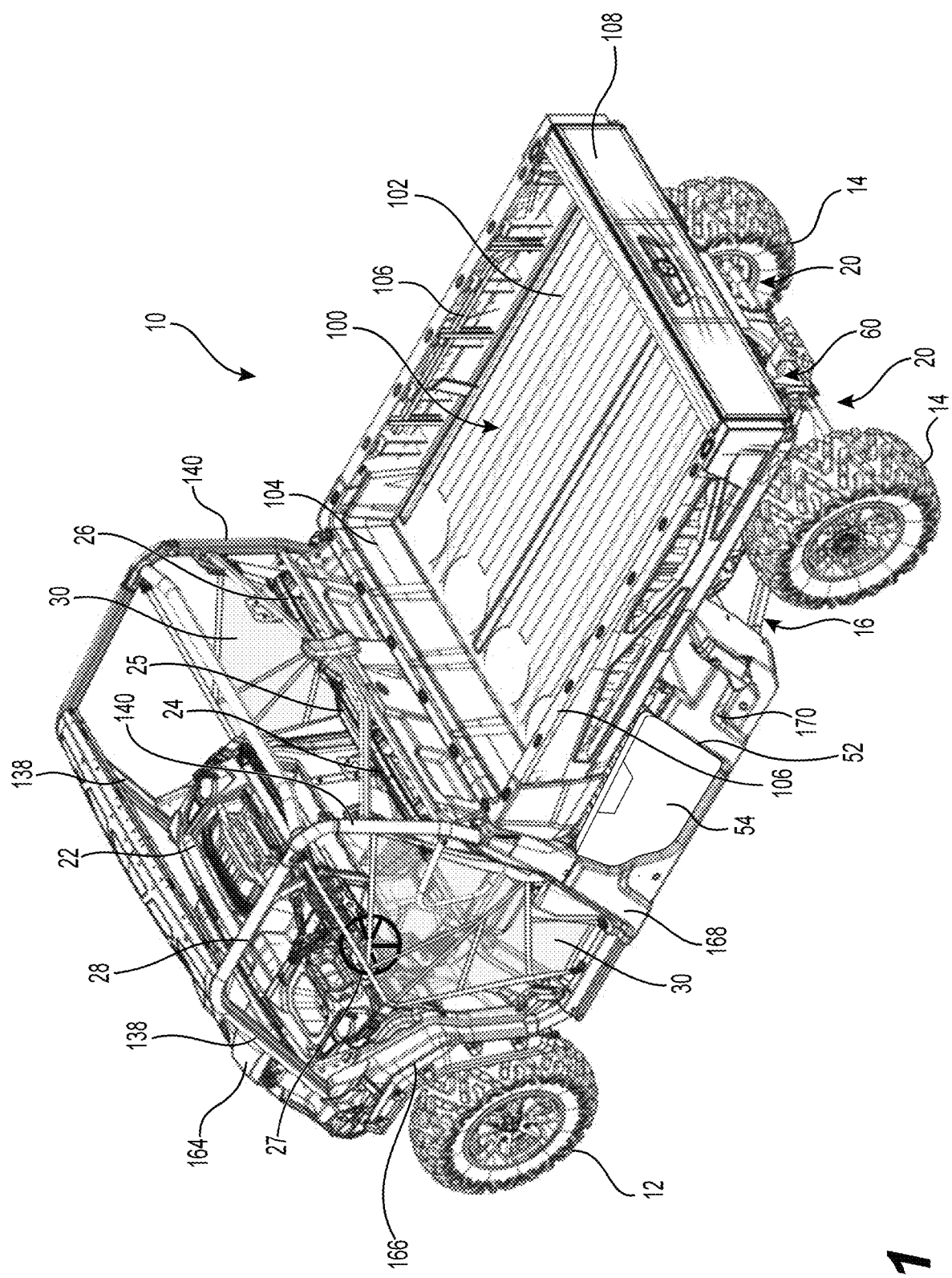
FIG. 1 is a perspective view taken from a rear, left side of a side-by-side off-road vehicle of a family of side-by-side off-road vehicles.
Figure 2:
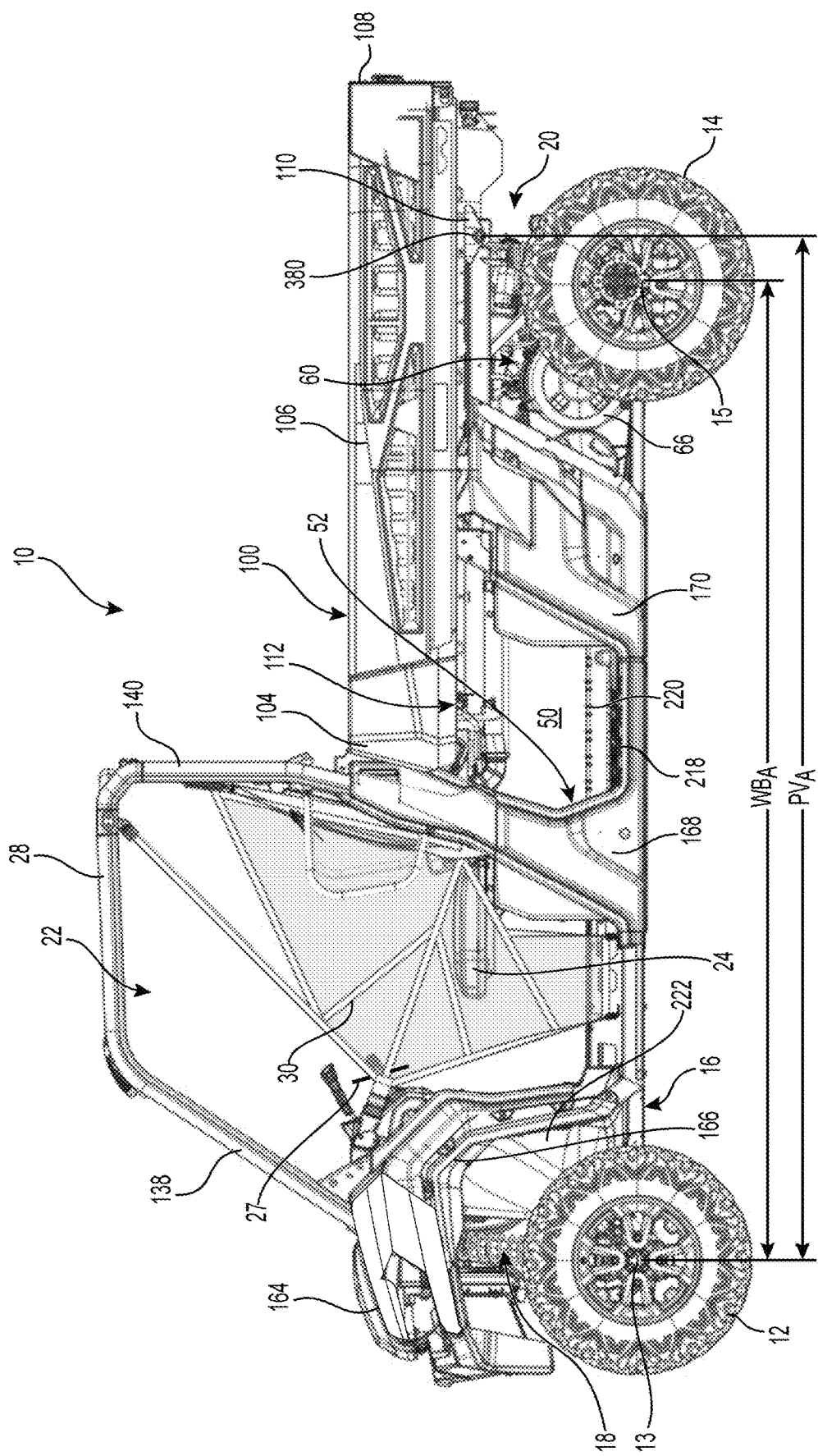
FIG. 2 is a left side elevation view of the vehicle of FIG. 1 with doors used for closing access apertures of a storage compartment of the vehicle removed.

The vehicle 10 will be described with reference to FIGS. 1 and 2. The vehicle 10 has left and right front wheels 12 and left and right rear wheels 14. As shown in FIG. 2, the vehicle 10 has a wheelbase length $WB_A$ measured longitudinally between the center 13 of the front wheels 12 and the center 15 of the rear wheels 14 (when the wheels 12, 14 are in a straight ahead orientation—i.e., not turning). The front and rear wheels 12, 14 are connected to a frame 16 of the vehicle 10 by front and rear suspension assemblies 18, 20 respectively. In the present embodiment, the front and rear suspension assemblies 18, 20 are of the types described in United States Patent Publication No. US 2017/0174027 A1, published Jun. 22, 2017, the entirety of which is incorporated herein by reference. It is contemplated that other types of suspensions assemblies could be used. As will be described in more detail below, the frame 16 includes two frame modules 250, 350 connected to one another to form part of the frame 16.

The vehicle 10 has a cockpit 22 inside which a driver seat 24, and two passenger seats 25, 26 are provided side-by-side such that the seats 24, 25, 26 form a "seat row" FSR. The passenger seat 25 is provided between the seats 24, 26. In the present embodiment, the driver seat 24 is on the left side of the vehicle 10 and the passenger seat 26 is on the right side of the vehicle 10, but it is contemplated that it could be the opposite. It is contemplated that the passenger seat 25 could be omitted. It is also contemplated that the individual driver and passenger seats 24, 25, 26 could be replaced by a bench seat spanning a majority of the width of the cockpit 22 which would define the driver and the passenger seats. Furthermore, the seats 24, 25, 26 could be any suitable type of seats (e.g., bucket seats).

A steering wheel 27 is disposed in front of the driver seat 24. The steering wheel 27 is operatively connected to the two front wheels 12 for steering the vehicle 10.

As will be described in greater detail below, a roll cage 28 is provided over the cockpit 22 and is connected to the frame 16. The roll cage 28 installed on the vehicle 10 is chosen amongst a family of roll cages in accordance with a size of the cockpit 22 of the vehicle 10. As will be described further below, the vehicles 510, 710 may have different roll cages installed thereon.

Figure 20:
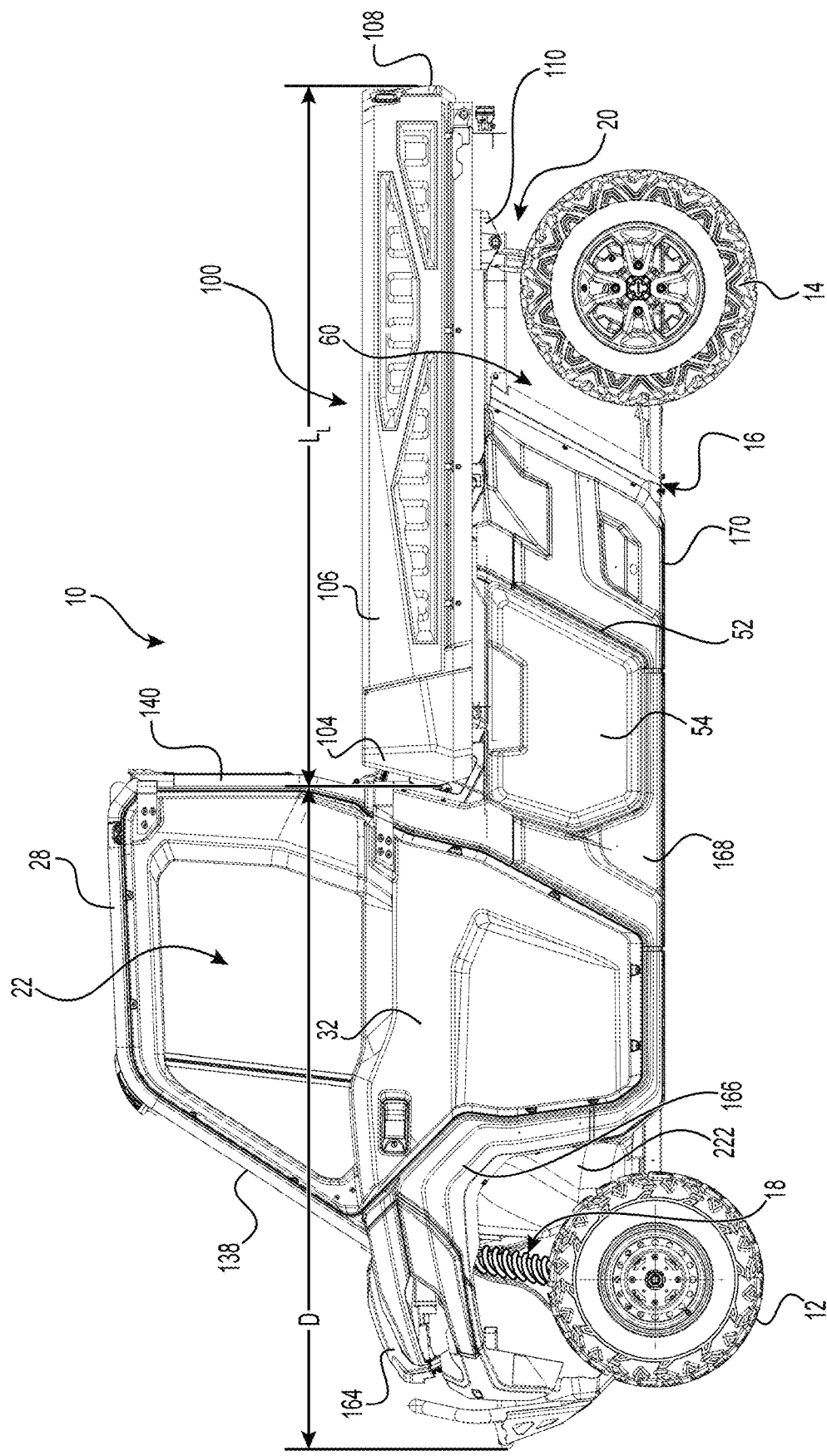
FIG. 20 is a left side elevation view of an alternative embodiment of the vehicle of FIG. 1.

The driver and passenger enter and exit the vehicle 10 from the sides thereof. Flexible lateral covers 30 are selectively provided across the opened sides of the cockpit 22. In an alternative embodiment shown in FIGS. 20 and 21, the flexible lateral covers 30 have been replaced by full doors 32. It is contemplated that instead of the full doors 32, the vehicle 10 could be provided with door panels that do not have windows. It is also contemplated that the vehicle 10 could not be provided with flexible lateral covers 30, doors 32 or door panels.

The vehicle 10 has a storage compartment 50 disposed rearward of the cockpit 22. The storage compartment 50 has left and right access apertures 52 (FIG. 2) defined in the left and right sides of the vehicle 10 respectively for providing access to the storage compartment 50. The access apertures 52 are selectively closed by doors 54, a left one of which is shown in FIG. 1. In the present embodiment, the left and right doors 54 are removable. It is contemplated that the doors 54 could be hinged to the frame 16 so as to pivot between opened and closed positions. It is contemplated that the doors 54 could be pivotable and removable. It is also contemplated that the doors 54 could be provided with key locks, or other types of locks, in order to prevent unauthorized access to the storage compartment 50. It is also contemplated that the doors 54 could be replaced by flexible lateral covers such as nets. The storage compartment 50 is disposed rearward of the front wheels 12 and forward of the rear wheels 14 such that the wheels 12, 14 do not interfere with the access apertures 52 and the removal of the doors 54. The storage compartment 50 will be described in more detail below.

A motor compartment 60 is disposed rearward of the storage compartment 50. As best seen in FIGS. 3 to 6, a motor 62 is disposed in and supported by the motor compartment 60. In the present embodiment, the motor 62 is an internal combustion engine, but other types of motors, such as an electric motor, are contemplated. A continuously variable transmission (CVT) 64 (shown in dotted lines in FIG. 5A) is provided in the motor compartment 60 on a left side of the motor 62. A CVT housing 66 houses the CVT 64. The CVT 64 operatively connects the motor 62 to a transaxle 68 (FIG. 5A) to transmit torque from the motor 62 to the transaxle 68. The transaxle 68 is operatively connected by half-shafts (not shown) to the two rear wheels 14 to drive the two rear wheels 14. As shown in FIG. 5B, the transaxle 68 has a transaxle output axis 69 about which the half-shafts connected thereto rotate. Driveshaft (not shown) operatively connect the transaxle 68 to a front differential 65 (FIG. 5B). The front differential 65 is operatively connected by half-shafts (not shown) to the two front wheels 12 to drive the two front wheels 12. As shown in FIG. 5B, the front differential 65 has a front differential output axis 67 about which the half-shafts connected thereto rotate. The vehicle 10 has a front-rear output distance $FR_A$ measured longitudinally between the front differential output axis 67 and the transaxle output axis 69 (i.e., the distance between the frontmost output axis and the rearmost output axis). It is contemplated that the transaxle 68 could be replaced by a transmission and differential that are separate from each other. It is contemplated that the CVT 64 could be replaced by an automatic or manual geared transmission or another type of transmission. It is contemplated that only the two front wheels 12 or the two rear wheels 14 could be driven by the motor 62 or that the vehicle 10 could selectively switch between driving two of the wheels 12, 14 and driving all four wheels 14. A muffler 70 is disposed in the motor compartment 60 rearward of the motor 62. The muffler 70 is fluidly connected to exhaust ports of the motor 62 to receive exhaust gas therefrom. A fuel tank 72 is provided in the motor compartment 60 on a right side of the motor 62. It is contemplated that the fuel tank 72 could be provided on the left side of the motor 62 and that the CVT 64 could be provided on the right side of the motor 62.

Figure 3:
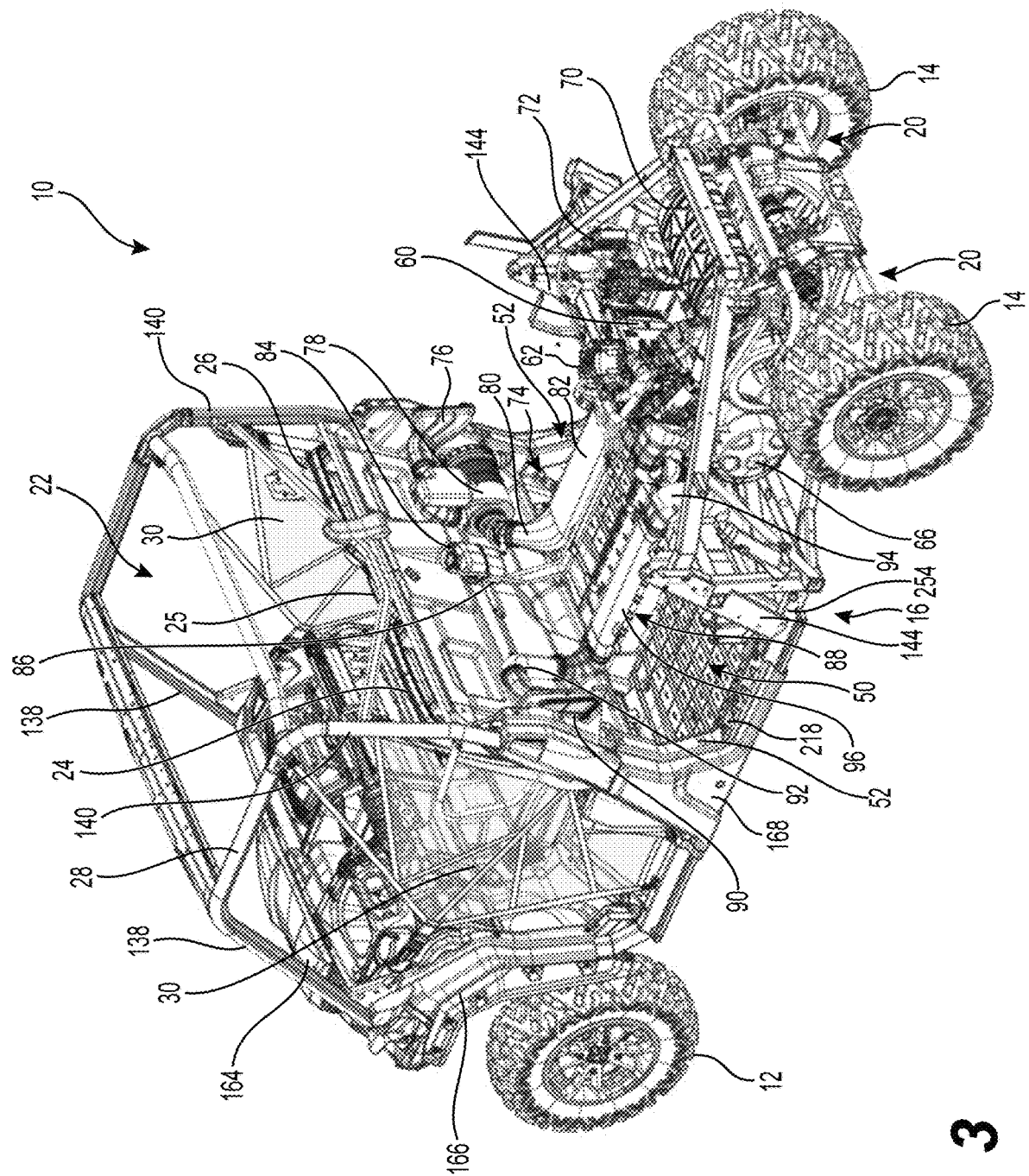
FIG. 3 is a perspective view taken from a rear, left side of the vehicle of FIG. 1, with the cargo bed, some body panels and some frame members removed.
Figure 4:
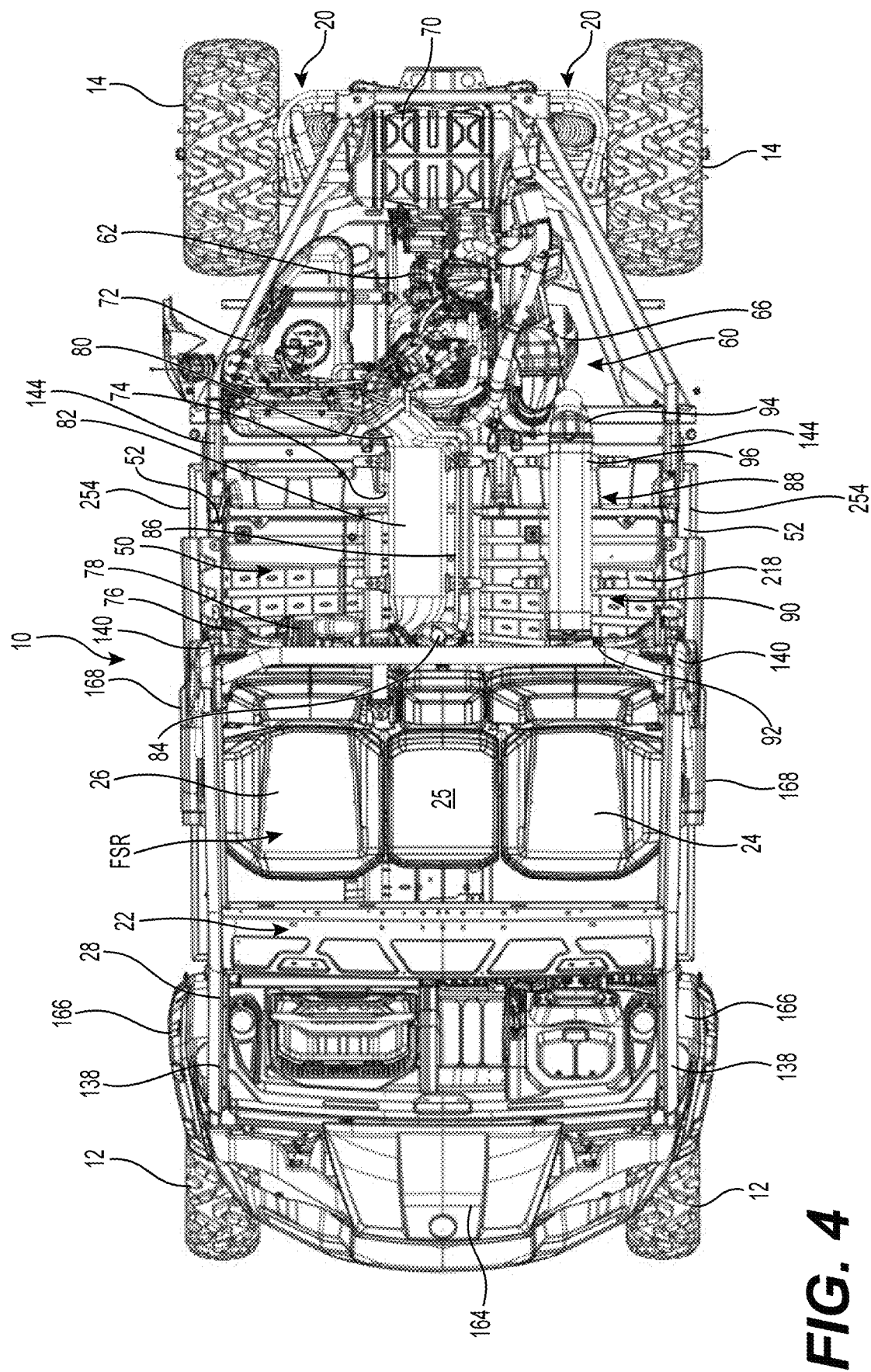
FIG. 4 is a top plan view of the vehicle components of FIG. 3.
Figure 5A:
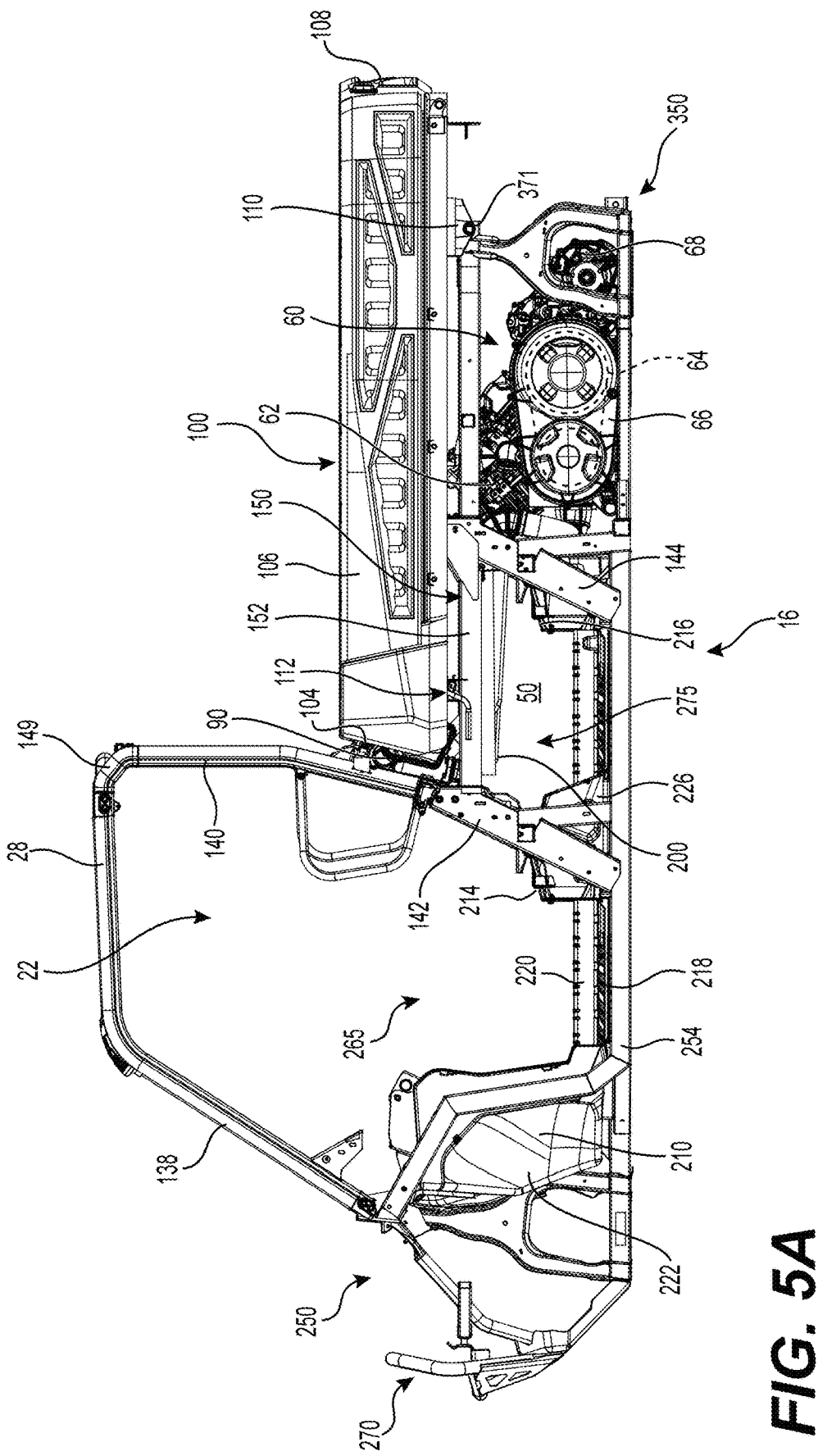
FIG. 5A is a left side elevation view of the frame, partitions, engine, continuously variable transmission, transaxle and cargo bed of the vehicle of FIG. 1 with the cargo bed in a lowered position.
Figure 5B:
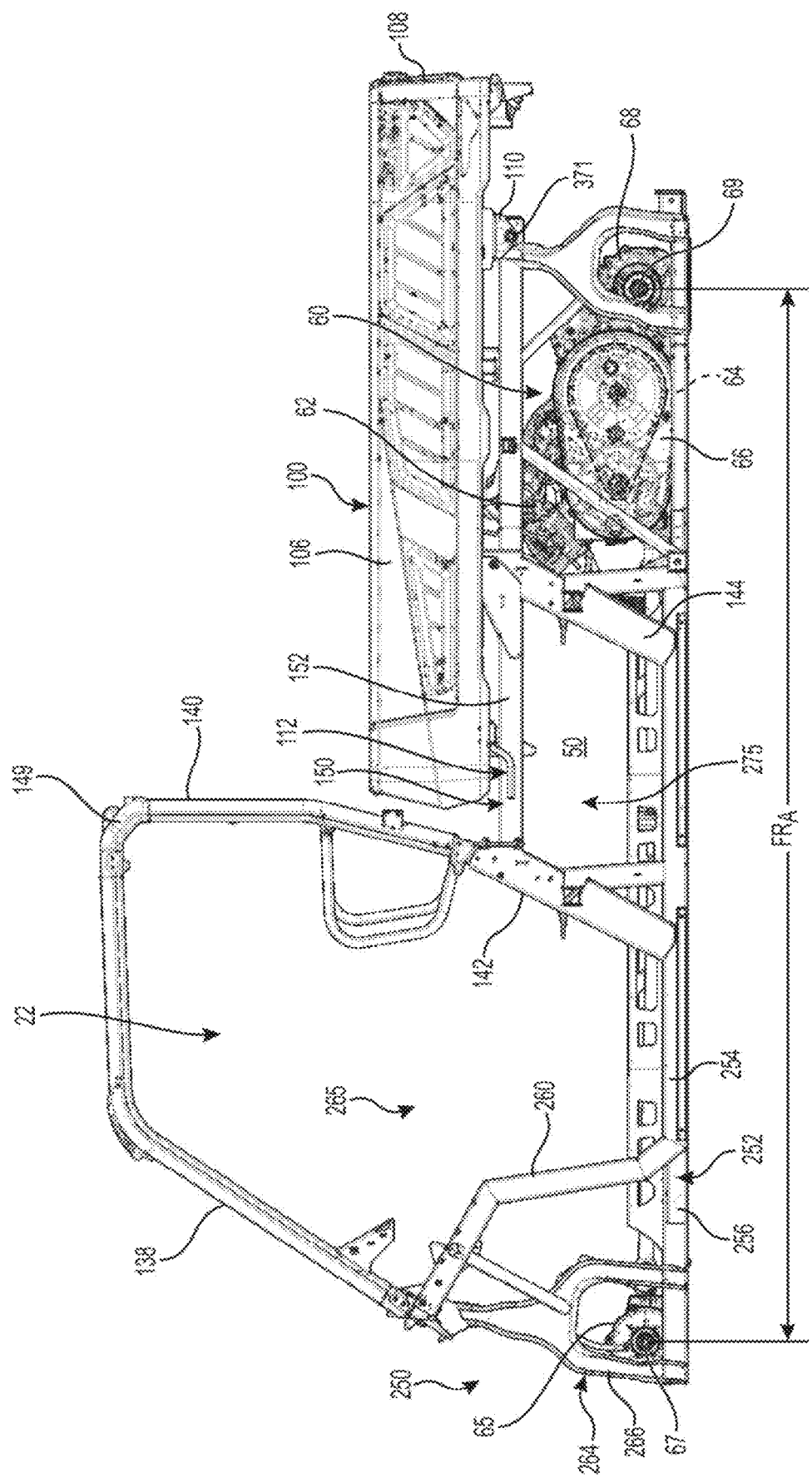
FIG. 5B is a left side elevation view of the vehicle components of FIG. 5A, with part of the frame and a front differential of the vehicle shown and the partitions of the vehicle removed for clarity.

As can be seen in FIGS. 3 and 4, an engine air intake conduit 74 is provided to supply air to the motor 62. The engine air intake conduit 74 includes an inlet 76, an air box 78 and a pipe 80. The inlet 76 and the air box 78 are disposed on a right side of the vehicle 10, rearward of the passenger seat 26, above the storage compartment 50. The air intake aperture defined by the inlet 76 faces rightward. The inlet 76 is connected to the air box 78 which contains an air filter (not shown). The air box 78 is connected to the pipe 80. From the air box 78, the pipe 80 extends leftward and downward, and then has a section 82 that extends horizontally and longitudinally rearward above the storage compartment 50. The pipe 80 is connected to a throttle body, which is connected to an air intake manifold, which is connected to the air intake port of the motor 62.

As can also be seen in FIGS. 3 and 4, a coolant bottle 84 disposed to the left of the air box 78, rearward of the passenger seat 25, above the storage compartment 50. A coolant line 86 communicates the coolant bottle 84 with the motor 62 to permit the flow of coolant therebetween.

As can also be seen in FIGS. 3 and 4, a CVT air intake conduit 88 is provided to supply air inside the CVT housing 66 to cool the CVT 64. The CVT air intake conduit 88 includes an inlet 90, pipes forming a gooseneck 92 and a pipe 94. The inlet 90 and the gooseneck 92 are disposed on a left side of the vehicle 10, rearward of the driver seat 24, above the storage compartment 50. The air intake aperture defined by the inlet 90 faces leftward. The inlet 90 is connected to the gooseneck 92 which is connected to the pipe 94. The pipe 94 has a section 96 that extends horizontally and longitudinally rearward above the storage compartment 50. The pipe 94 is connected to the CVT housing 66.

Figure 25:
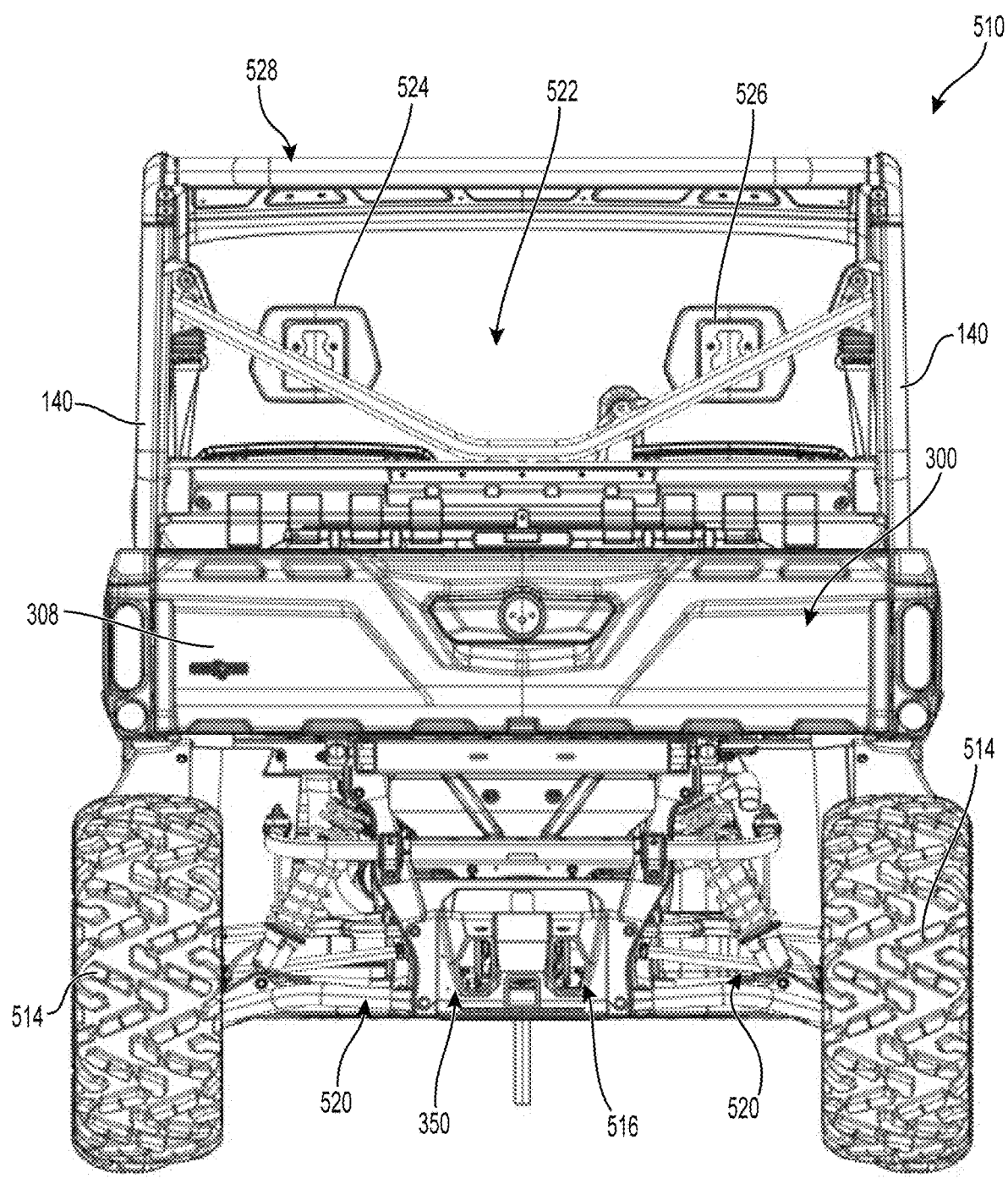
FIG. 25 is a rear elevation view of the vehicle of FIG. 22.
Figure 26:
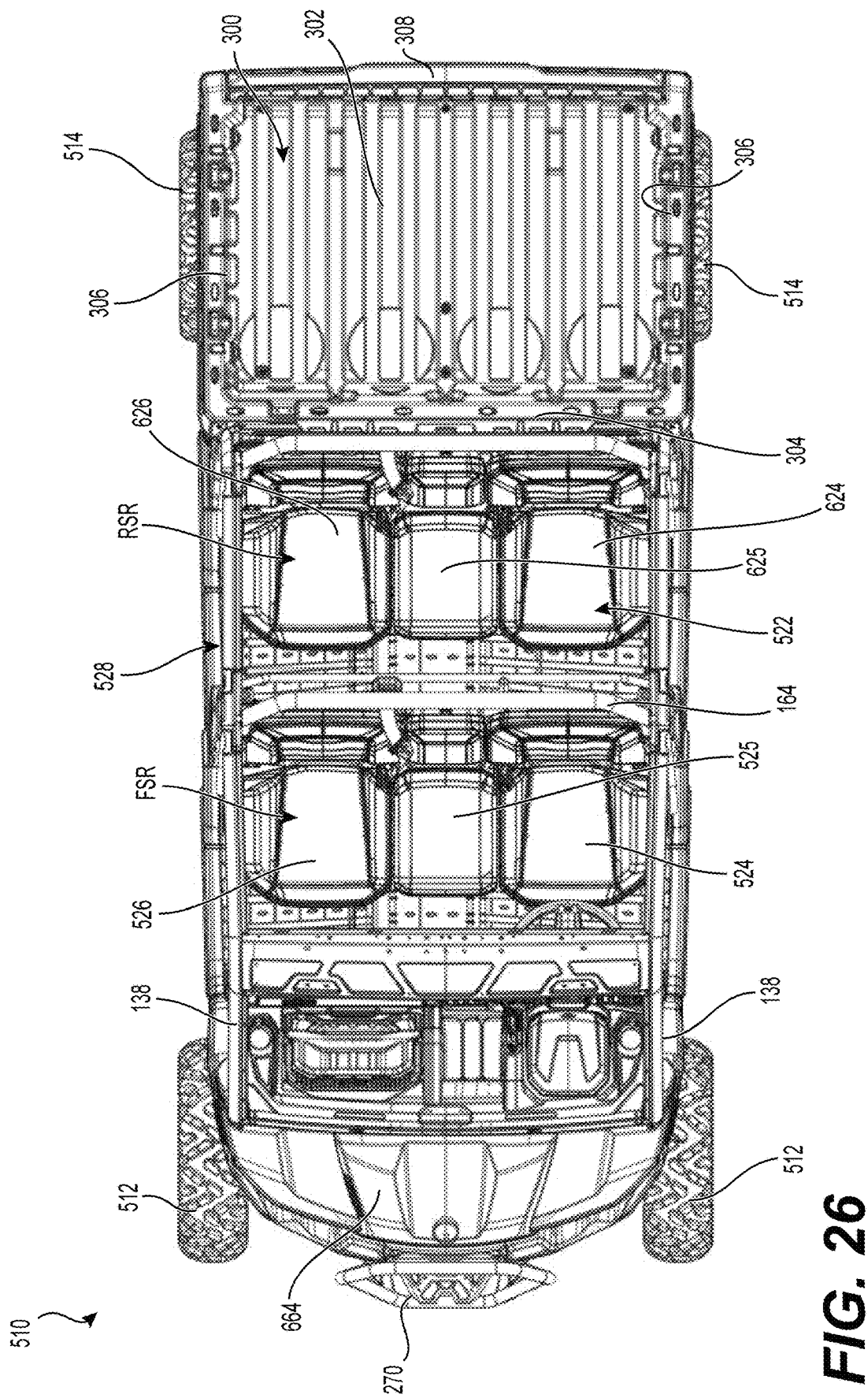
FIG. 26 is a top plan view of the vehicle of FIG. 22.

With reference to FIGS. 1, 2, 5A, 5B and 6, the vehicle 10 has a cargo bed. The cargo bed of the vehicle 10 is chosen from a group of cargo beds designed to fit one or another of the vehicles 10, 510, 710. Notably, the group of cargo beds includes cargo beds of two sizes: a long cargo bed 100 and a short cargo bed 300. The long cargo bed 100 has a length $L_L$ (FIG. 20) that is greater than a length $L_S$ of the short cargo bed (see FIG. 25). The vehicle 10 is equipped with the long cargo bed 100.

Figure 5C:
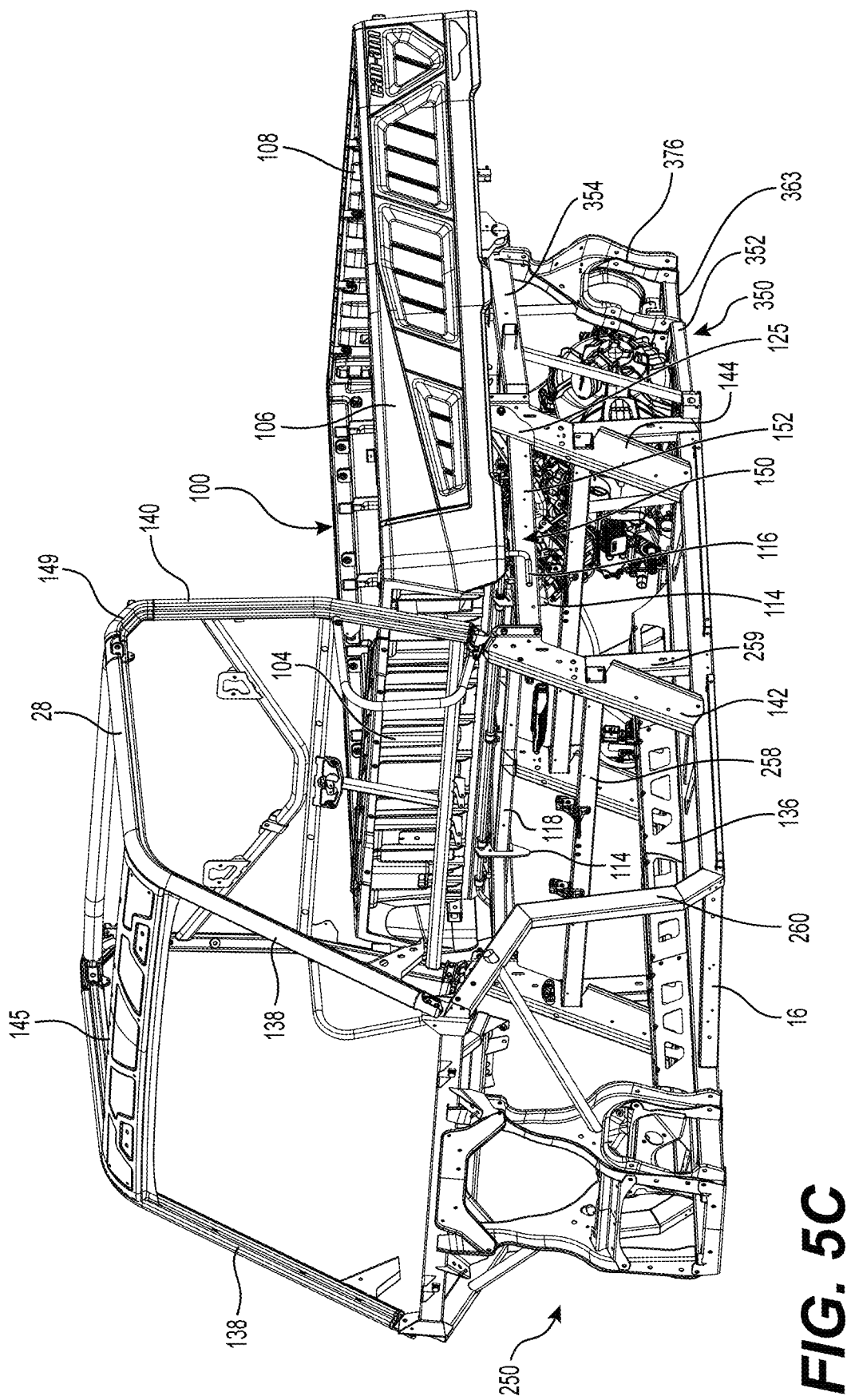
FIG. 5C is a perspective view taken from a front, left side of the vehicle components of FIG. 5B with the front differential and associated driveshaft removed for clarity.
Figure 6:
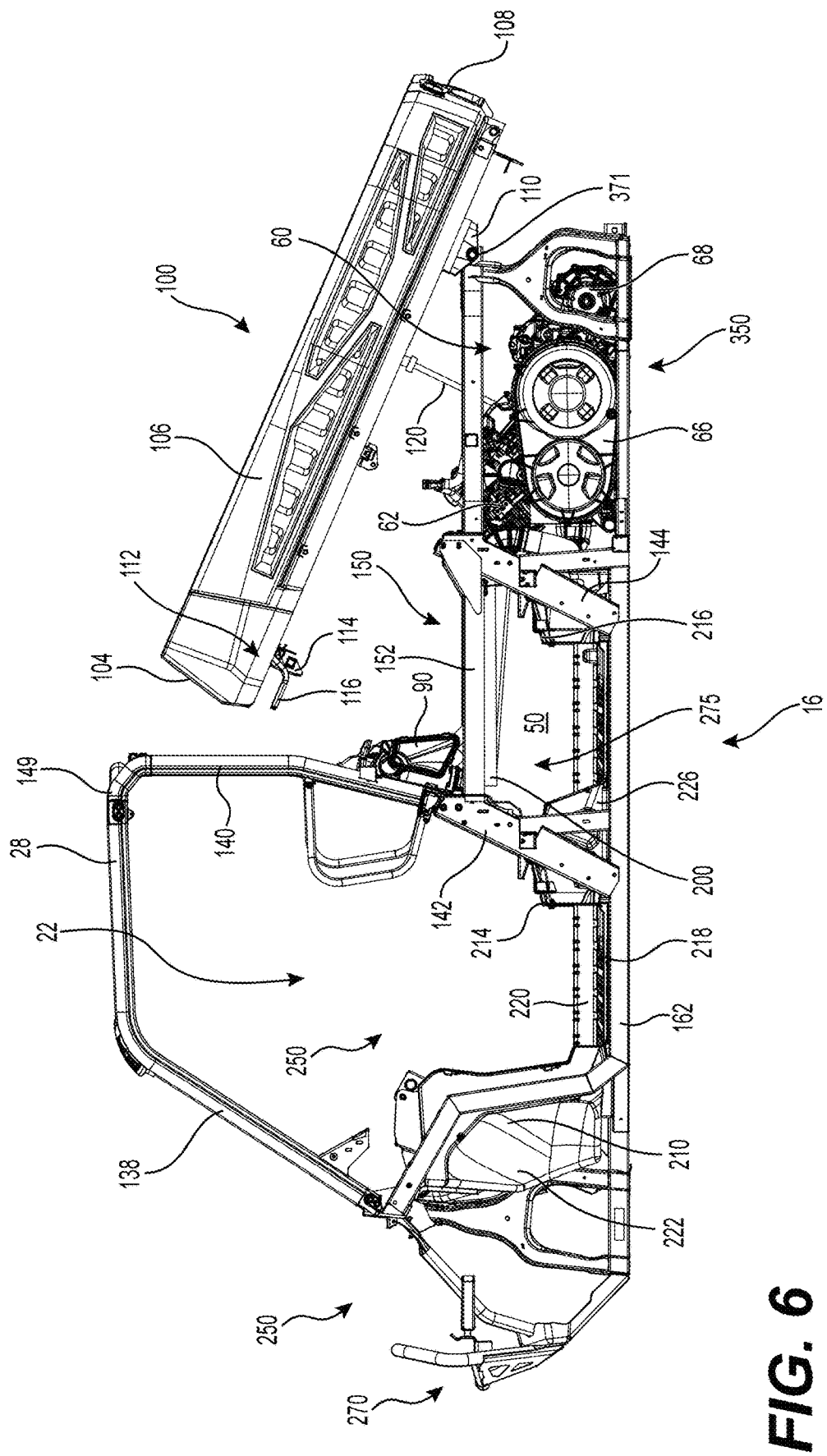
FIG. 6 is a left side elevation view of the vehicle components of FIG. 5A with the cargo bed in a raised position.

The cargo bed 100 has a floor 102, a front wall 104, left and right side walls 106 and a tailgate 108. It is contemplated that one or more of the front wall 104, the left and right side walls 106 and the tailgate 108 could be selectively removable. It is also contemplated that one or more of the front wall 104, the left and right side walls 106 and the tailgate 108 could be omitted. It is also contemplated that the tailgate 108 could be replaced by a rear wall, which could be selectively removable. It is also contemplated that the cargo bed 100 could have a movable or removable top. Brackets 110 are connected to the bottom of the cargo bed 100 near a rear thereof and pivotally connect the cargo bed 100 to the rear of the frame 16, as will be described in greater detail below. As such, the cargo bed 100 can pivot between a lowered position shown in FIGS. 1, 2 and 5 and a raised position shown in FIG. 6. As best seen in FIG. 5, the cargo bed 100 is sufficiently long such that, when the cargo bed 100 is in the lowered position, it extends over the motor compartment 60 and the storage compartment 50. In the present embodiment, the length $L_L$ of the cargo bed 100 (i.e. the horizontal distance from its front-most point to its rearmost point with reference to FIG. 20) is greater than the distance D measured from the front-most point of the vehicle 10 to the front-most point of the cargo bed 100 (i.e. the horizontal distance with reference to FIG. 20) when the cargo bed 100 is in the lowered position. It is contemplated that when the cargo bed 100 is in the lowered position, it could extend over only a portion of the motor compartment 60 and/or a portion of the storage compartment 50. With reference to FIG. 6, a lock 112 is connected to the bottom of the cargo bed 100 near a front thereof. The lock 112 includes a pair of spring-biased hooks 114 and a release handle 116. When the cargo bed 100 is pivoted down in the lowered position, each hook 114 engages a laterally-extending frame member 118 (FIGS. 5C, 14) of the frame 16, thus locking the cargo bed 100 in the lowered position. In the lowered position of the cargo bed 100, the lock 112 is above the storage compartment 50. To pivot the cargo bed 100 to the raised position, a user first actuates the release handle 116 thereby causing the hook 114 to release the frame member 118. The cargo bed 100 can then be pivoted to the raised position. A gas cylinder 120 (FIG. 6) connected between the frame 16 and the bottom of the cargo bed 100 helps to maintain the cargo bed 100 in the raised position. In the present embodiment, the cargo bed 100 is pivoted manually between its lowered and raised positions, but it is contemplated that it could be pivoted by an actuator such as an electric or hydraulic actuator.

While the lengths $L_L$, $L_S$ are shown as being measured from respective outer surfaces of the cargo beds 100, 300 (in the case of the long cargo bed 100, from the outside of the front wall 104 to the outside of the tailgate 108), it is to be understood that for each of the lengths $L_L$, $L_S$, there is an associated inner length of each of the cargo beds 100, 300. Thus, the lengths $L_L$, $L_S$ may alternatively refer to the inner lengths of the cargo beds 100, 300 (in the case of the long cargo bed 100, from the inside of the front wall 104 to the inside of the tailgate 108).

Turning now to FIGS. 7 to 15, the frame 16 will be described in more detail. In this embodiment, the frame 16 includes two frame modules 250, 350 connected to one another to form part of the frame 16. Notably, the frame 16 includes a front frame module 250 and a rear frame module 350 connected to and disposed rearwardly of the front frame module 250. The front and rear frame modules 250, 350 will be described in greater detail below.

Figure 7:
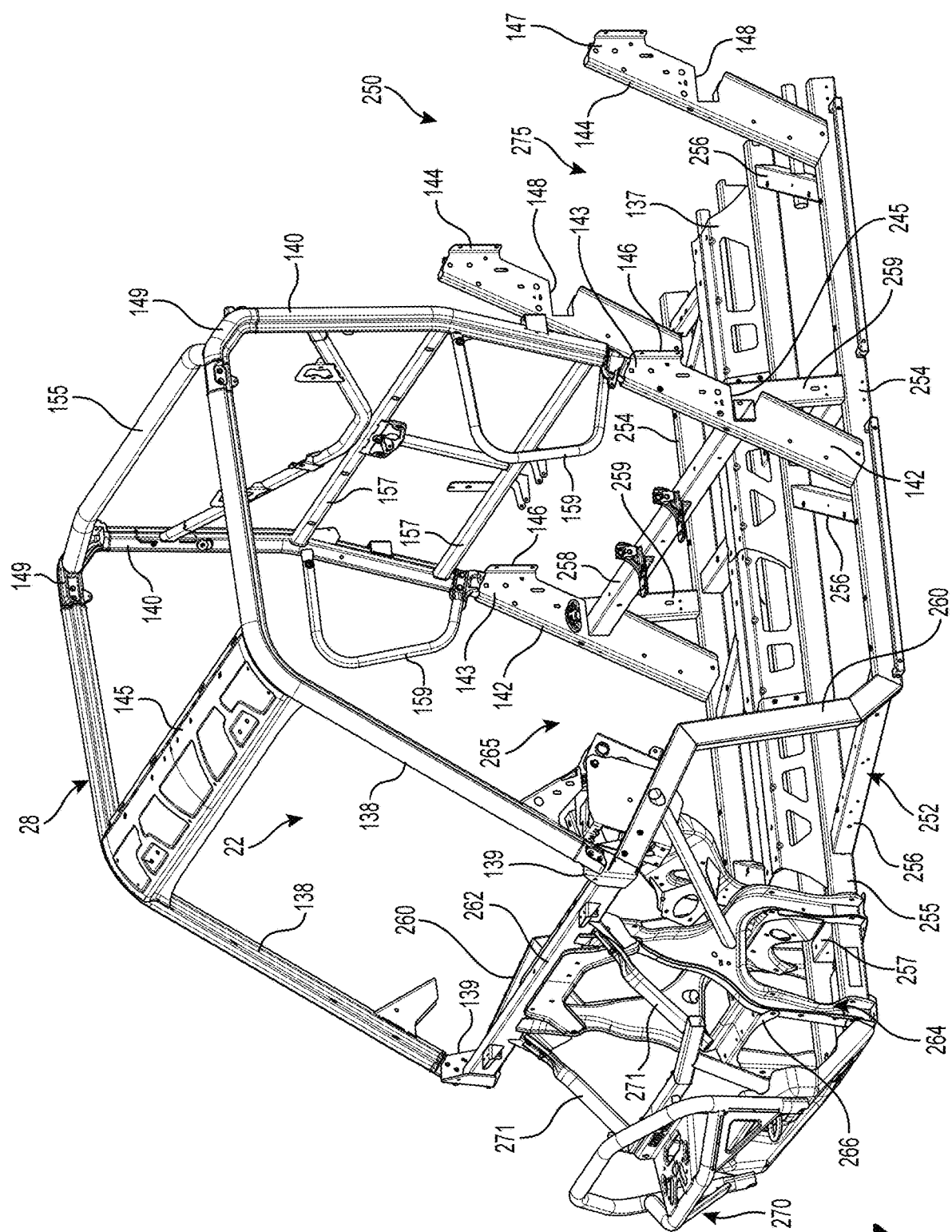
FIG. 7 is a perspective view taken from a front, left side of a front frame module of the frame of the vehicle of FIG. 1, with a roll cage connected thereto.
Figure 8:
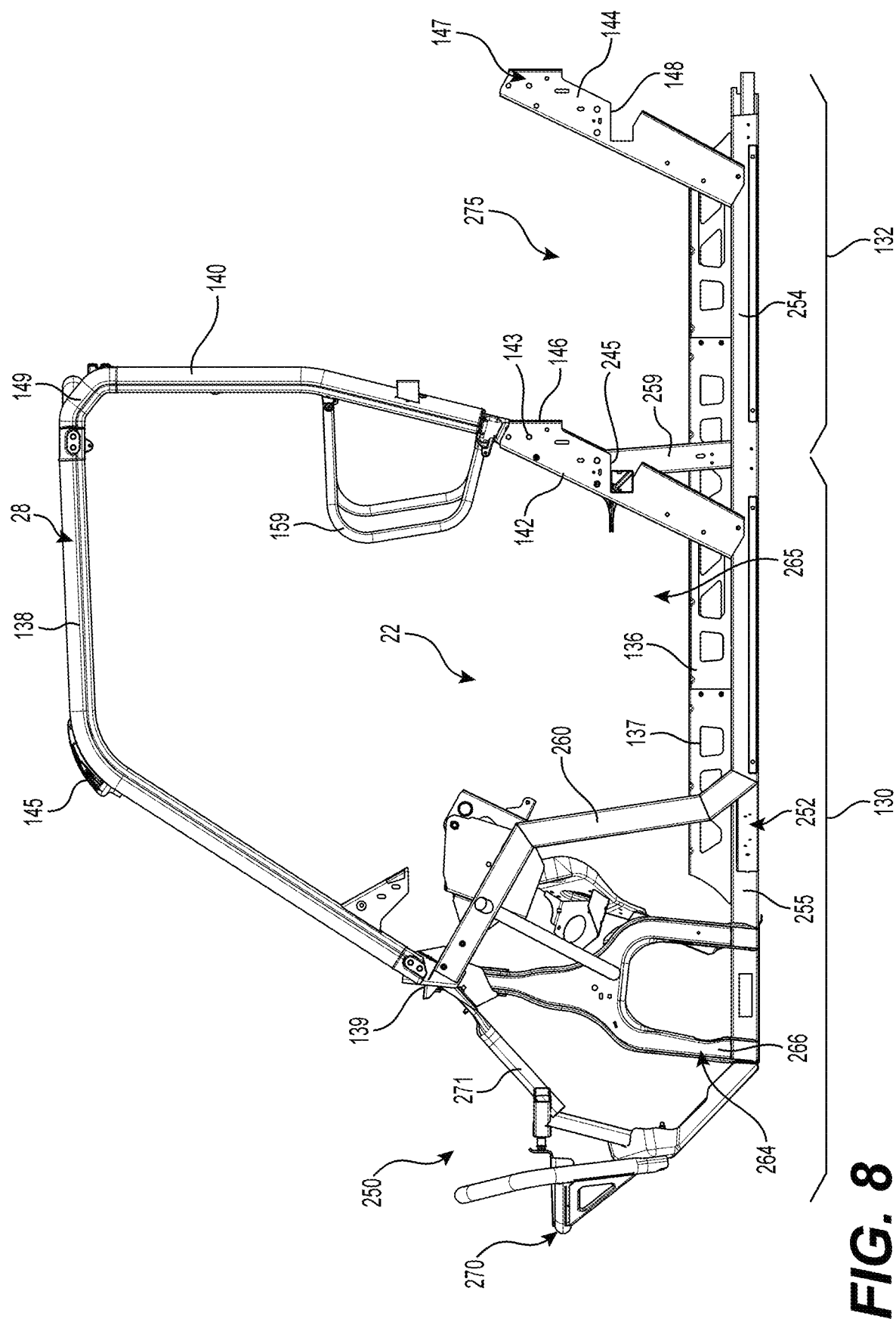
FIG. 8 is a left side elevation view of the front frame module of FIG. 7.
Figure 9:
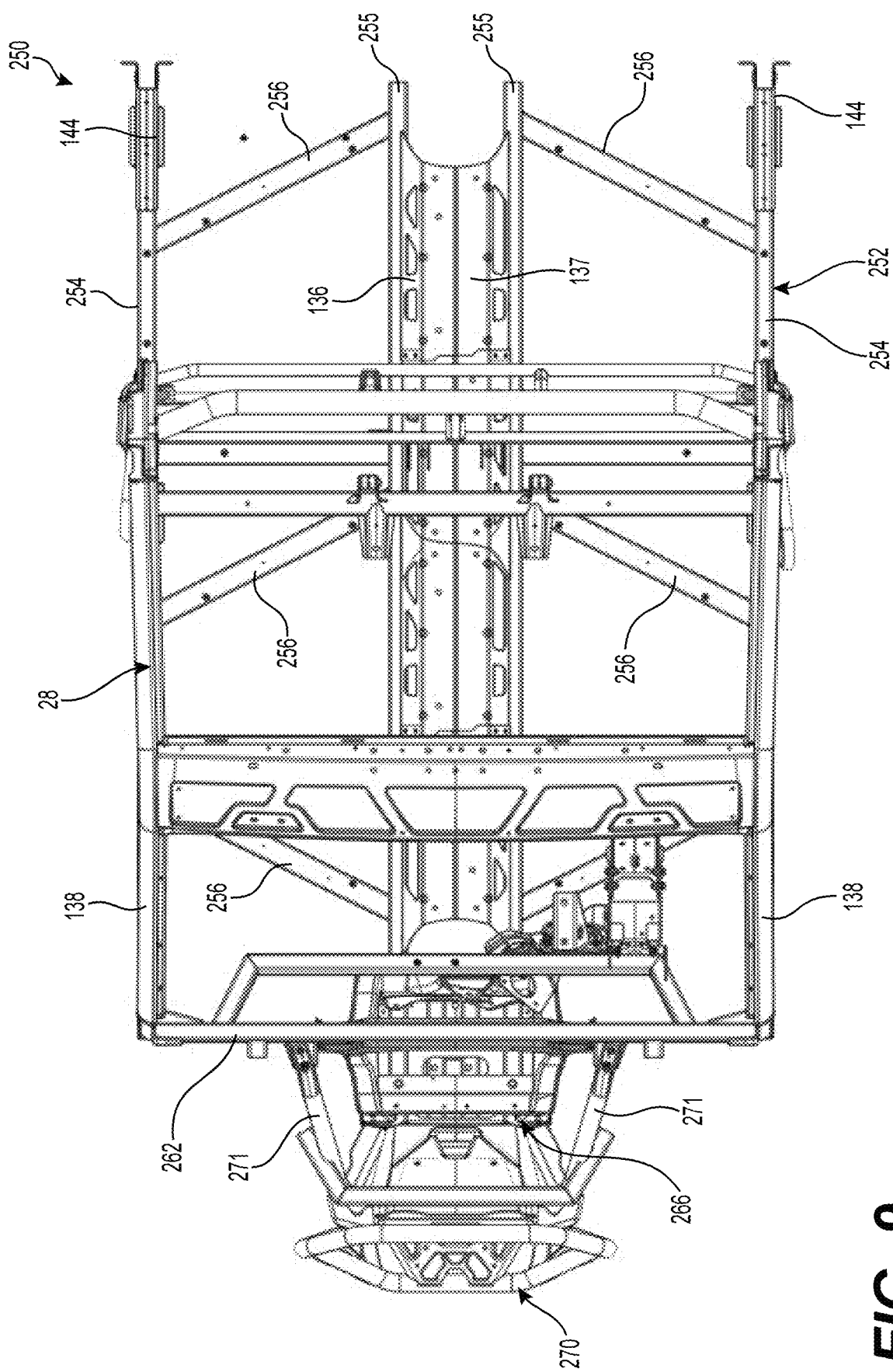
FIG. 9 is a top plan view of the front frame module of FIG. 7.

FIGS. 7 to 9 show the front frame module 250 of the frame 16. As shown in FIG. 8, the front frame module 250 has a first section 130 and a second section 132 disposed rearward of the first section 130. The first section 130 of the front frame module 250 defines part of the cockpit 22. In the present embodiment, some components of the frame 16 are part of both sections 130, 132 of the front frame module 250. For example, the frame 16 has a tunnel 136 that extends along the bottom of the first and second sections 130, 132. The driveshaft (not shown) connecting the transaxle 68 to the front differential 65 extend inside the tunnel 136.

Figure 15:
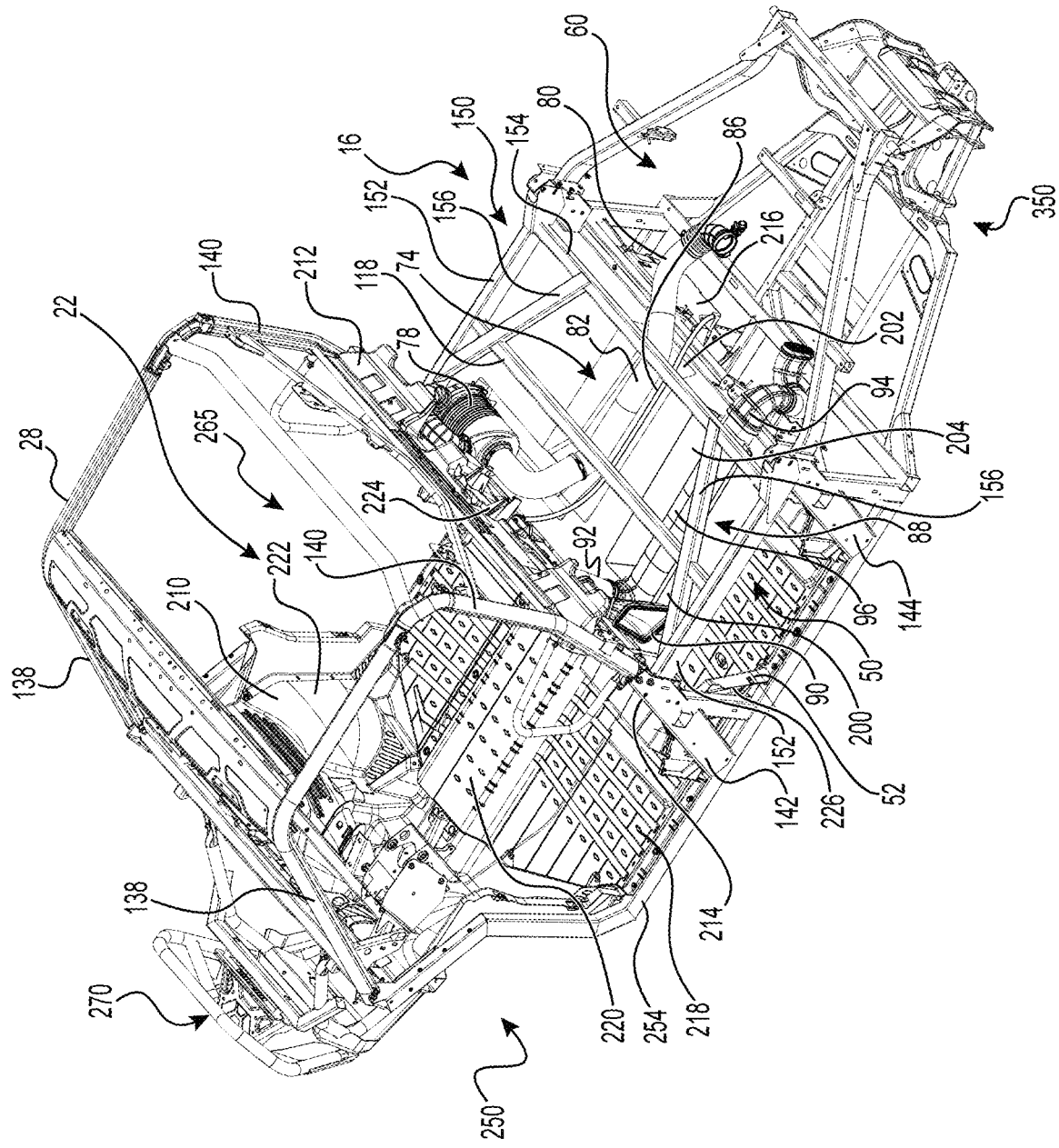
FIG. 15 is a perspective view taken from a rear, left side of the frame, air intake conduits, a floor, top panel and partitions of the vehicle of FIG. 1.

The front frame module 250 has a lower frame structure 252 which supports a floor 218 (FIG. 15). The lower frame structure 252 extends across both sections 130, 132 of the front frame module 250. The lower frame structure 252 includes a plurality of horizontal members, including two parallel longitudinally-extending frame members 254 defining the lateral ends of the lower frame structure 252, two central longitudinally-extending frame members 255 parallel to the longitudinally-extending frame members 254 (and disposed laterally between the frame members 254), and laterally-extending frame members 256 that interconnect the longitudinally-extending frame members 254 to the longitudinally-extending frame members 255. The tunnel 136 is formed by the longitudinally-extending frame members 255 and a top tunnel cover 137 connected to the two longitudinally-extending frame members 255. The laterally-extending frame members 256 connect the longitudinally-extending frame members 254 to the tunnel 136. Connecting members 257 (one of which is shown in FIG. 7) extend laterally and are connected between the longitudinally-extending frame members 255.

The front frame module 250 also has two rearwardly and vertically extending frame members 142 and two rearwardly and vertically extending frame members 144 connected to the lower frame structure 252. The frame members 144 are disposed rearward of the frame members 142 and therefore the frame members 142, 144 will be referred to as front vertically-extending frame members 142 and rear vertically-extending frame members 144 respectively. The front and rear vertically-extending frame members 142, 144 extend vertically from the longitudinally-extending frame members 254 of the lower frame structure 252. Notably, one of each of the front and rear vertically-extending frame members 142, 144 is connected to a corresponding one of the longitudinally-extending frame members 254. A laterally-extending frame member 258 interconnects the front vertically-extending frame members 142 at a position vertically higher than the lower frame structure 252. In addition, as the front vertically-extending frame members 142 are inclined at an angle, a vertical support 259 is connected between each of the front vertically-extending frame members 142 and a corresponding one of the longitudinally-extending frame members 254. As will be described in greater detail below, when the frame 16 is assembled, the rear vertically-extending frame members 144 are connected to the rear frame module 350.

At a front portion thereof, the front frame module 250 has left and right frontwardly and vertically extending frame members 260 which are interconnected at their top ends by a laterally-extending upper frame member 262. The laterally-extending upper frame member 262 generally defines a front end of the cockpit 22 of the vehicle 10. The front frame module 250 also has a front suspension mounting structure 264 disposed forward of the cockpit 22 for connecting the front suspension assemblies 18 to the frame 16. The front suspension mounting structure 264 is a portion of the front frame module 250 that has the smallest width for accommodating the front wheels 12. The front suspension mounting structure 264 includes two generally inverted Y-shaped members 266, each of which is connected to a corresponding central longitudinally-extending frame member 255 forwardly of the top tunnel cover 137. At their top ends, the inverted Y-shaped members 266 are also connected to the laterally-extending upper frame member 262.

Between the front vertically-extending frame members 142 and the frontwardly and vertically extending frame members 260, the front frame module 250 defines a seat row space 265 of the cockpit 22 adapted for accommodating the seat row FSR of the vehicle 10. That is, the seat row FSR is installed in the seat row space 265.

At its frontmost end, the front frame module 250 has a bumper structure 270 which is connected to the central longitudinally-extending frame members 255 at a lower end, and to the laterally-extending upper frame member 262 at an upper end via connecting members 271 which extend downwardly and frontwardly from the laterally-extending upper frame member 262.

The roll cage 28 is connected to the first section 130 of the front frame module 250 to extend over the seat row FSR. The roll cage 28 has front left and right legs 138 and rear left and right legs 140. The front legs 138 are connected to the first section 130 at a front of the cockpit 22 to left and right roll cage mounts 139 defined at the ends of the laterally-extending upper frame member 262. Each front leg 138 has a first portion that extends upwardly and rearwardly from the bottom end of the front leg 138, an elbow formed at a top end of the first portion, and a second portion that extends rearwardly from the elbow to an upper end of the front leg 138. As such, the front legs 138 form top left and top right sides of the roll cage 28. The rear legs 140 are connected to the first section 130 at a rear of the cockpit 22, in particular to left and right roll cage mounts 143 defined at the top ends of the front vertically-extending frame members 142 (located longitudinally rearward of the roll cage mounts 139). The roll cage mounts 143 include a plurality of openings extending laterally across the front vertically-extending frame members 142. A front upper lateral member 145 interconnects the front legs 138 at a top portion thereof. A rear upper lateral member 155 interconnects the rear legs 140 to one another at a top portion thereof. Rear lower lateral members 157 interconnect the rear legs 140 to one another at a lower portion thereof. A shoulderbar 159 is connected to each of the rear legs 140. The front and rear legs 138, 140 are connected to one another via two connectors 149. Notably, each connector 149 is connected to one of each of the front and rear legs 138, 140.

As will be described in greater detail below, the rear vertically-extending frame members 144 define mounts 147 (FIGS. 7, 8) at their top ends for mounting a different one of the roll cages. The mounts 147 are located longitudinally rearward of the roll cage mounts 143 and are configured similarly to the roll cage mounts 143.

The second section 132 of the front frame module 350 defines in part a configurable space 275. More specifically, the configurable space 275 is defined in part between the front vertically-extending frame members 142, the rear vertically-extending frame members 144 and the lower frame structure 252. As such, the configurable space 275 is disposed rearward of the front seat row space 265. As will be seen below, the frame 16 can be selectively adapted to use the configurable space 275 to different ends.

Figure 10:
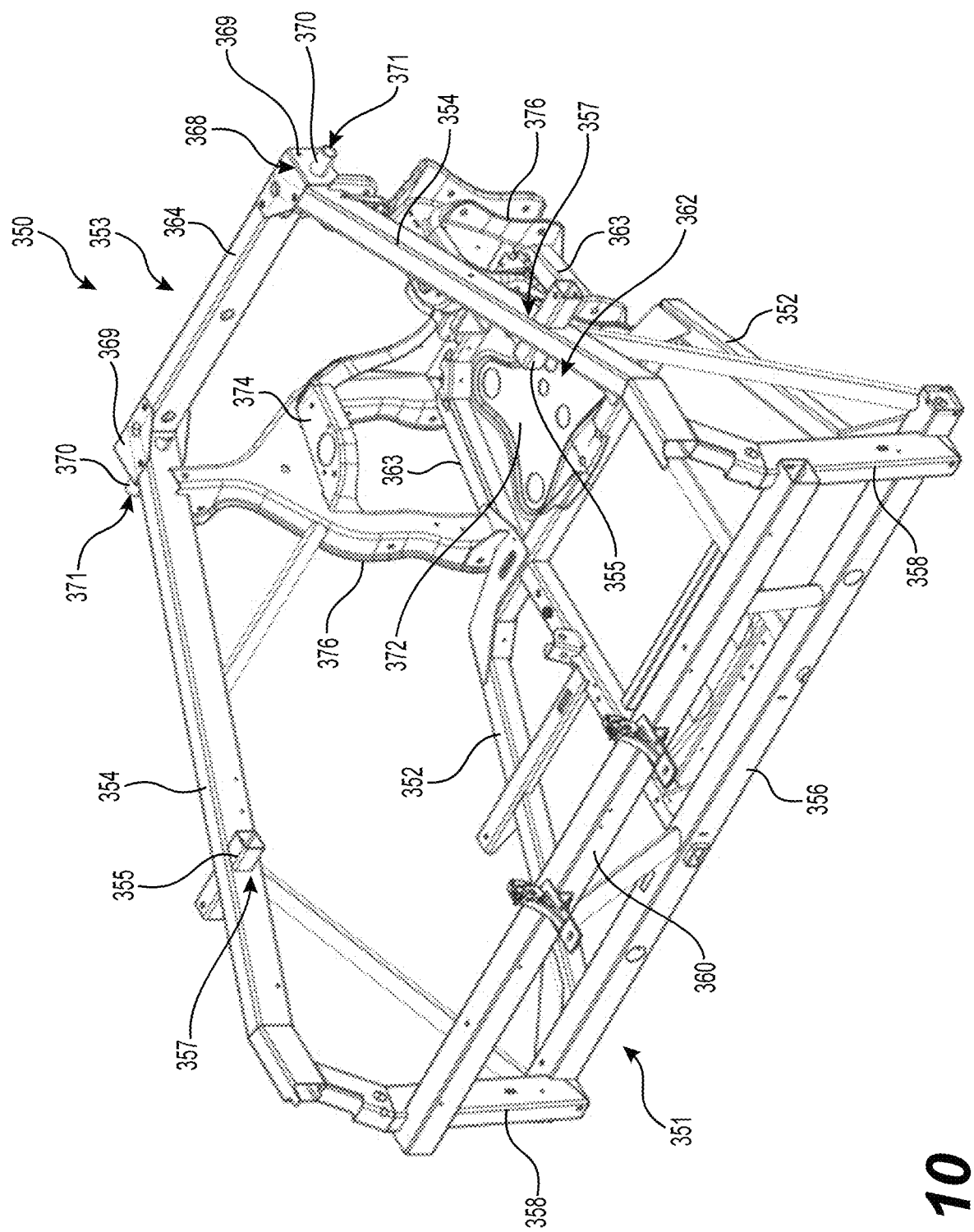
FIG. 10 is a perspective view taken from a front, left side of a rear frame module of the vehicle of FIG. 1.
Figure 11:
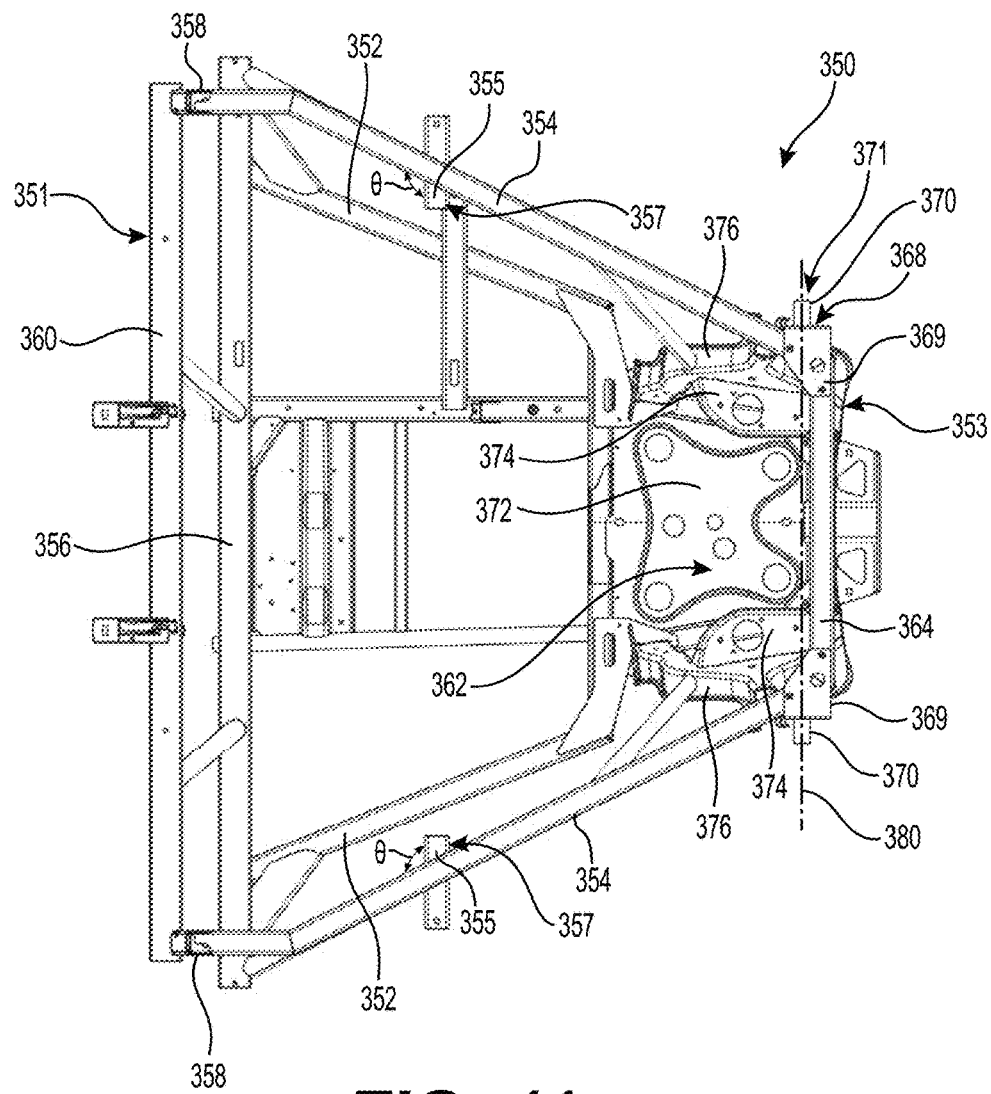
FIG. 11 is a top plan view of the rear frame module of FIG. 10.
Figure 12:
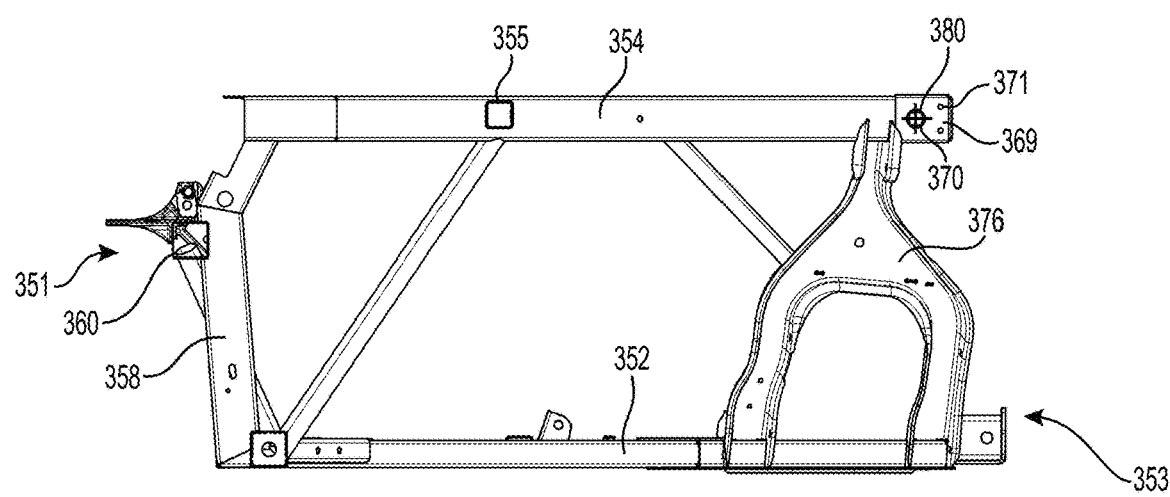
FIG. 12 is a left side elevation view of the rear frame module of FIG. 10.

FIGS. 10 to 12 show the rear frame module 350 of the frame 16. The rear frame module 350 defines part of the motor compartment 60 for supporting the motor 62. The rear frame module 350 has a front end 351 and a rear end 353. A width of the rear frame module 350 decreases from the front end 351 to the rear end 353. The rear frame module 350 has left and right lower longitudinally-extending frame members 352 and left and right upper longitudinally-extending frame members 354, each of which extends horizontally at an angle to the longitudinal direction. As shown in FIGS. 10 and 11, the rear frame module 350 has left and right laterally-extending retaining members 355 which are connected to and, in this embodiment, extend through respective ones of the longitudinally-extending frame members 354. A portion of each of the retaining members 355 extends laterally inwardly from and is supported by a respective longitudinally-extending frame member 354. As shown in FIG. 11, each of the longitudinally-extending frame members 354 forms an angle θ relative to a corresponding laterally-extending retaining member 355. In this embodiment, the angle θ is approximately equal to 120°. Moreover, in this embodiment, a distance between the inner ends of the retaining members 355 is approximately equal to a distance between the hooks 114 of the cargo bed 100. As will be explained in greater detail below, in the vehicles 510, 710, the retaining members 355 are used for engaging the hooks 114, 314 of a lock 112, 312 connected to a corresponding cargo bed such as to retain the cargo bed in place in its lowered position. As such, the retaining members 355 and the longitudinally-extending frame members 354 can be referred to as a lock-engaging frame subassembly 357 which supports and engages the lock 112, 312. The longitudinally-extending frame members 352, 354 are interconnected at their front ends by left and right vertical members 358. Parallel lower and upper laterally-extending frame member 356, 360 extend between and connect the vertical members 358 at the front end 351 of the rear frame module 350. The upper laterally-extending frame member 360 is configured to engage a recess 148 (FIGS. 7, 8) defined in each of the rear vertically-extending frame members 144 of the front frame module 350. A rear laterally-extending frame member 364 connects the upper longitudinally-extending frame members 354 to one another at their rear ends.

The rear frame module 350 also has a rear suspension mounting structure 362 for connecting the rear suspension assemblies 20 to the frame 16. The rear suspension mounting structure 362 includes two inverted Y-shaped mounts 376 disposed laterally opposite from one another. The inverted Y-shaped mounts 376 are connected at a lower end thereof to the lower longitudinally-extending members 352 (via connecting members 363) and, at an upper end thereof, to the upper longitudinally-extending members 354. A bottom mounting plate 372 extends between the inverted Y-shaped mounts 376 and a pair of upper mounting flanges 374 extend inwardly form the inverted Y-shaped mounts 376 for connecting other components (e.g., the transaxle 68, the muffler 70, etc.) to the rear frame module 350.

The motor 62, the transaxle 68, the muffler 70 and the fuel tank 72 are connected to the rear frame module 350 of the frame 16. The motor 62, the CVT 64, the CVT housing 66, the transaxle 68, the muffler 70 and the fuel tank 72 are disposed, at least in part, rearward of the rear vertically-extending frame members 144.

At its top portion, the rear frame module 350 has a cargo bed support structure 368 for supporting the cargo bed 100.

More specifically, the cargo bed support structure 368 includes left and right corner members 369 connected to the ends of the rear laterally-extending frame member 364. Each of the corner members 369 has an axle 370 extending laterally outwardly therefrom. The axles 370 are coaxial with one another. Together, the axles 370 define in part a cargo bed pivot 371 for pivotably mounting the cargo bed 100 to the rear frame module 350. As such, the cargo bed 100 is pivotable about a cargo bed pivot axis 380 (FIGS. 11, 12) defined by the cargo bed pivot 371. More specifically, the brackets 110 connected to the bottom of the cargo bed 100 are pivotally connected to the cargo bed pivot 371 to allow the cargo bed 100 to pivot about the cargo bed pivot axis 380. As shown in FIG. 2, the vehicle 10 has a longitudinal cargo pivot distance $PV_A$ measured between the center 13 of the front wheels 12 and the cargo bed pivot axis 380 (when the front wheels 12 are in a straight ahead orientation—i.e., not turning).

Once the front and rear frame modules 250, 350 are connected to one another, another structure of the frame 16 is connected to the font frame module 250 in accordance with a desired use of the configurable space 275. In this example, the vehicle 10 uses the configurable space 275 as the storage compartment 50 to store cargo therein as described above. Thus, in this embodiment, a storage compartment structure 150 is installed on the front frame module 250 such that the configurable space 275 defines at least in part the storage compartment 50 extending rearwardly of the seat row FSR. As such, in this embodiment, the second section 132 of the front frame module 250 defines in part the storage compartment 50.

Figure 13:
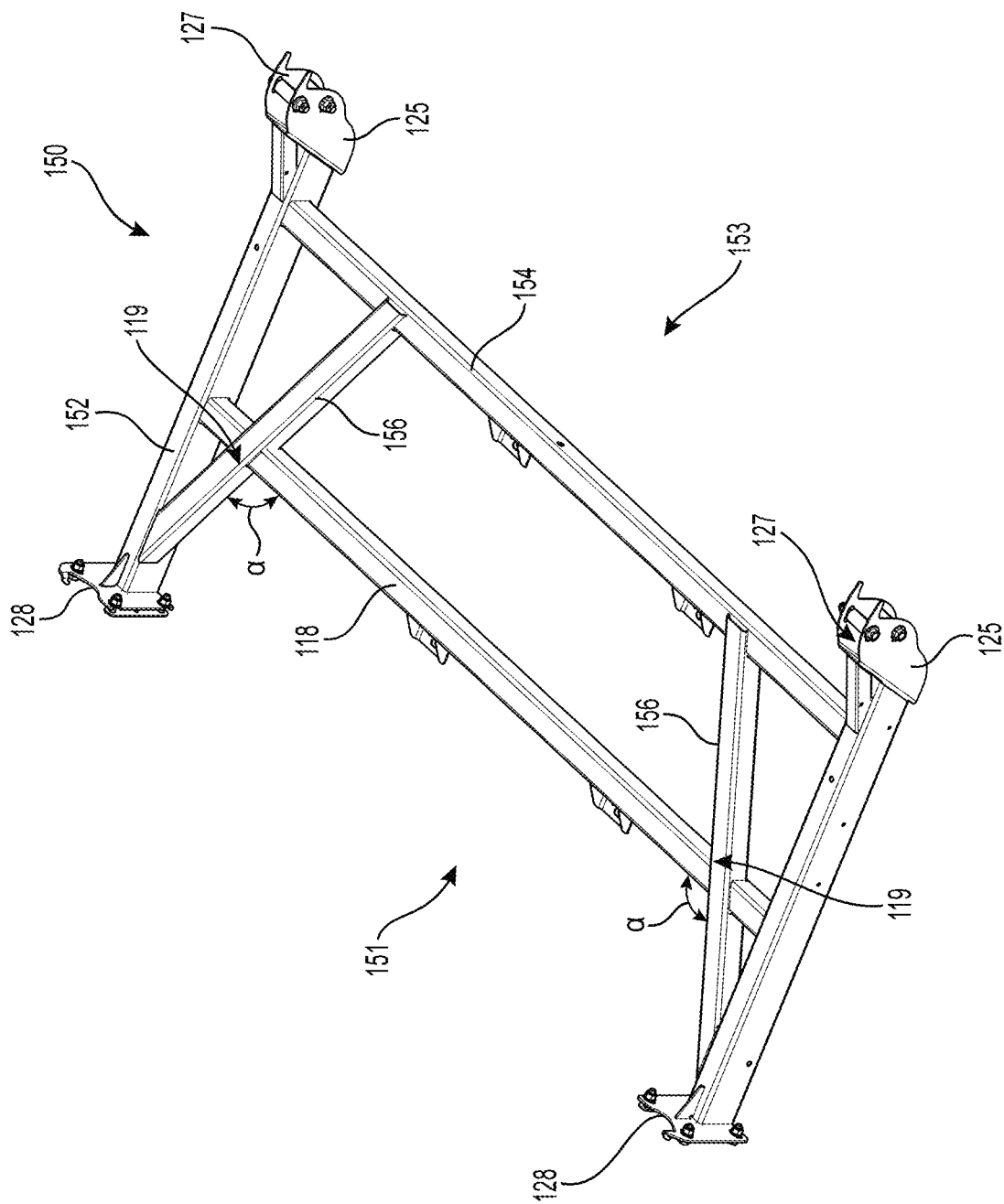
FIG. 13 is a perspective view taken from a rear, left side of a storage compartment structure of the frame of the vehicle of FIG. 1.

As can be seen in FIG. 13, the storage compartment structure 150 has a front side 151 and a rear side 153. The storage compartment structure 150 comprises left and right longitudinally-extending frame members 152 and laterally-extending frame members 118, 154 connected between the longitudinally-extending frame members 152. The frame member 118 is disposed forwardly of the frame member 154. Frame members 156 extend diagonally and are connected to the laterally-extending frame members 118, 154 as well as to respective front ends of the longitudinally-extending frame members 152 and thus support the laterally-extending frame members 118, 154. More specifically, each of the diagonal frame members 156 extends inwardly from a front end of a corresponding one of the longitudinally-extending frame members 152 to the laterally-extending frame member 154. A middle portion of each diagonal frame member 156, between the ends thereof, is connected to and supports the laterally-extending frame member 118. As the laterally-extending frame member 118 is engaged by the lock 112 when the cargo bed 100 is in the lowered position, the laterally-extending frame member 118 and the diagonal members 156 can be referred to as a lock-engaging frame subassembly 119 which supports and engages the lock 112. Each of the diagonal frame members 156 forms an angle α relative to the laterally-extending frame member 118. As will be explained in greater detail below, the angle α is approximately the same as the angle θ defined between the longitudinally-extending frame members 354 and the laterally-extending retaining members 355 of the rear frame module 350. Thus, in this embodiment, the angle α is approximately equal to 120°. On the front side 151, connecting flanges 128 are provided at the front ends of the longitudinally-extending frame members 152. On the rear side 153, connecting brackets 125 are provided at the rear ends of the longitudinally-extending frame members 152. The connecting flanges 128 are configured to be connected to corresponding flanges 146 provided at the upper ends of the front vertically-extending frame members 142 of the front frame module 250. Notably, fasteners 158 (FIG. 14) are used to fasten the connecting flanges 128 to the flanges 146 of the front vertically-extending frame members 142. The connecting brackets 125 are configured to be connected to the mounts 147 defined at the top ends of the rear vertically-extending frame members 144. More specifically, each connecting bracket 125 defines a recess 127 for inserting therein an upper portion, including the mount 147, of a corresponding one of the rear vertically-extending frame members 144 such that the rear vertically-extending frame member 144 is straddled by the connecting bracket 125 (see FIGS. 14, 15). Fasteners are then inserted through openings provided in the connecting bracket 125 and corresponding openings defined by the mount 147.

Figure 14:
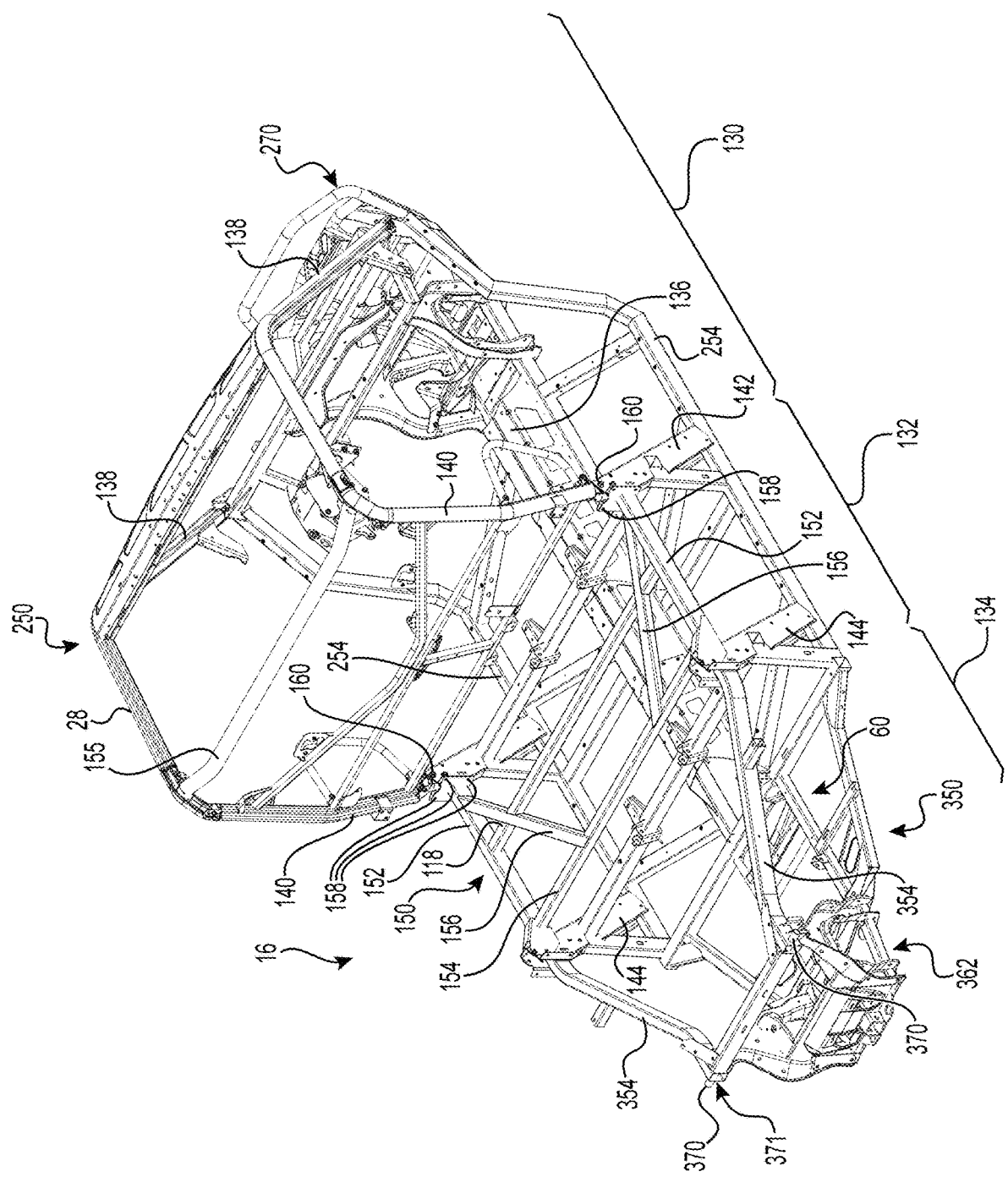
FIG. 14 is a perspective view taken from a rear, right side of the frame of the vehicle of FIG. 1.

The assembled frame 16 of the vehicle 10 is shown in FIGS. 14 and 15. As can be seen, the storage compartment structure 150 is connected between the front and rear vertically-extending fame members 142, 144 and extends over the configurable space 275. As such, the configurable space 275 defines in part a top of the storage compartment 50. As shown in FIG. 5, when the cargo bed 100 is in its lowered position, the cargo bed 100 extends over the storage compartment structure 150 (and thus over the configurable space 275). The front of each longitudinally-extending frame member 152 is fastened by the fasteners 158 to its corresponding frame member 142 which, as can be seen in FIG. 14, are vertically lower than fasteners 160 used to fasten the rear legs 140 of the roll cage 28 to the front vertically-extending frame members 142. Given their positions relative to the assembled frame 16, the longitudinally-extending frame members 152 may alternatively be referred to as upper left and right central frame members.

As can be seen from the assembled frame 16 of the vehicle 10 in FIGS. 14 and 15, in this embodiment, the first and second sections 130, 132 of the front frame module 250 respectively form a front frame section and a central frame section of the frame 16 and may thus be referred to as such. Meanwhile, as shown in FIG. 14, the rear frame module 350 forms a third section 134 of the frame 16 disposed rearward of the sections 130, 132 and which may thus be referred to as a rear frame section of the frame 16.

Furthermore, as shown in FIGS. 3, 4 and 6, the inlet 76 of the engine air intake conduit 74 and the inlet 90 of the CVT air intake conduit 88 are located rearward of the cockpit 22 and frontward of the rear frame module 350.

As mentioned above, besides allowing storage of cargo within the storage compartment 50, due to its relatively low height (i.e., approximately equal to a height of the rear frame module 350), the storage compartment structure 150 also allows equipping the vehicle 10 with the long cargo bed 100 (rather than the short cargo bed 300) which extends above the storage compartment structure 150 in the lowered position. Notably, in the lowered position, the long cargo bed 100 extends forwardly of the mounts 147 defined by the rear vertically-extending frame members 144. Thus, the storage compartment structure 150 may alternatively be referred to as a "cargo bed support structure extension" in that it extends the structure of the frame 16 on which the cargo bed 100 is supported (in addition to the rear frame module 350). In fact, it is contemplated that, in some embodiments, the storage compartment structure 150 may not be used to define the storage compartment 50 at all but rather solely to extend the support structure of the frame 16 on which the cargo bed 100 can be supported.

The right access aperture 52 of the storage compartment 50 is disposed longitudinally between the right vertically-extending frame members 142, 144 and vertically between the right longitudinally-extending frame member 152 and the right longitudinally-extending frame member 254. The right longitudinally-extending frame member 254 extends longitudinally along the bottom right sides of the first and second sections 130, 132 of the front frame module 250. Similarly, the left access aperture 52 of the storage compartment 50 is disposed longitudinally between the left vertically-extending frame members 142, 144 and vertically between the left longitudinally-extending frame member 152 and the left longitudinally-extending frame member 254. The left longitudinally-extending frame member 254 extends longitudinally along the bottom left sides of the first and second sections 130, 132 of the front frame module 250.

With reference to FIGS. 1, 2, 20 and 21, a number of body panels are mounted to the frame 16. These include a hood 164, left and right front fenders 166, left and right side panels 168 and left and right side panels 170. The side panels 168 cover the front vertically-extending frame members 142 and portions of the longitudinally-extending frame members 254 disposed below the access apertures 52 of the storage compartment 50. The side panels 170 cover the rear vertically-extending frame members 144 and part of the motor compartment 60. The right access aperture 52 of the storage compartment 50 is defined at its front and bottom by the right side panel 168, at its rear by the right side panel 170 and at its top by the right longitudinally-extending frame member 152. The left access aperture 52 of the storage compartment 50 is defined at its front and bottom by the left side panel 168, at its rear by the left side panel 170 and at its top by the left longitudinally-extending frame member 152. The side panels 168, 170 also define the structures for receiving the doors 54.

Figure 16:
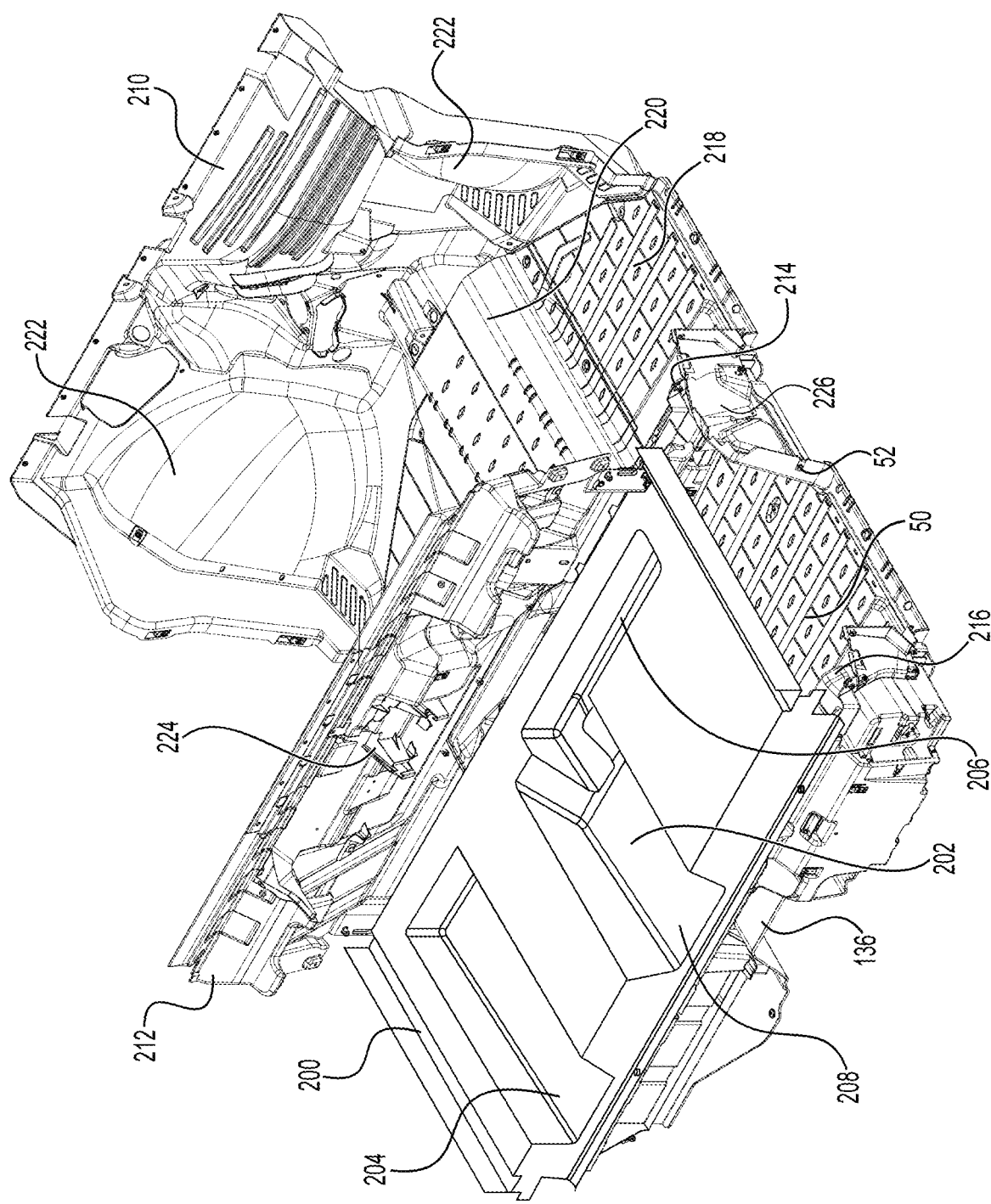
FIG. 16 is a perspective view taken from a rear, right side of the floor, top panel and partitions of FIG. 15.

With reference to FIGS. 15 to 18, in this embodiment, a top panel 200 defines a top of the storage compartment 50 and protects the contents thereof. The storage compartment structure 150 extends over the top panel 200. It is contemplated that the top panel 200 could be provided over the storage compartment structure 150. It is also contemplated that the top panel 200 could be omitted. As best seen in FIG. 16, the top panel 200 defines two recesses 202, 204. As can be seen in FIG. 15, part of the engine air intake conduit 74 is received in the recess 202 and part of the CVT air intake conduit 88 is received in the recess 202. More specifically, a laterally extending portion 206 of the recess 202 receives a lower part of the air box 78 and a longitudinally extending portion 208 of the recess 202 receives the section 82 of the pipe 80. The longitudinally extending portion 208 of the recess 202 also receives part of the coolant line 86. As can be seen, the section 82 of the pipe 80 and the coolant line 86 extend under the storage compartment structure 150 so as to be vertically between the storage compartment structure 150 and the top panel 200. The section 82 of the pipe 80 is therefore vertically between the storage compartment 50 and the storage compartment structure 150. The recess 204 receives the section 96 of the pipe 94. As can be seen, the section 96 of the pipe 94 extends under the storage compartment structure 150 so as to be vertically between the storage compartment structure 150 and the top panel 200. The section 96 of the pipe 94 is therefore vertically between the storage compartment 50 and the storage compartment structure 150. It is contemplated that the top panel 200 could be made of multiple parts.

With reference to FIGS. 16 to 19, the vehicle 10 also has a front partition 210, an upper central partition 212, a lower central partition 214, a rear partition 216 and the floor 218. The top panel 200 extends between the upper central partition 212 and the rear partition 216. At its front, the top panel 200 is connected to the rear side of the upper central partition 212. At its rear, the top panel 200 is connected to the frame 16.

The floor 218 is disposed over the lower frame structure 252 of the frame 16 in the first and second sections 130, 132 of the front frame module 250. As such, the floor 218 defines the floor (bottom) of the storage compartment 50 and the floor of the cockpit 22. The storage compartment structure 150 and the portion of the floor 218 defining the floor of the storage compartment 50 (i.e., the storage compartment floor) thus partly define the storage compartment 50 therebetween. The floor 218 also defines a tunnel 220 that receives the tunnel 136 of the frame 16 therein. It is contemplated that the floor 218 could be two separate pieces: one to form the bottom of the storage compartment 50, one to form the floor of the cockpit 22. It is also contemplated that the floor 218 could be made of more than two pieces.

The front partition 210 is disposed in the cockpit 22 at the front of the floor 218 and is connected to the first section 130 of the front frame module 250. The front partition 210 defines the front of the cockpit 22. The front partition 210 also defines part of the wheel wells 222 of the front wheels 12. It is contemplated that the front partition 210 could be made of multiple parts.

Figure 17:
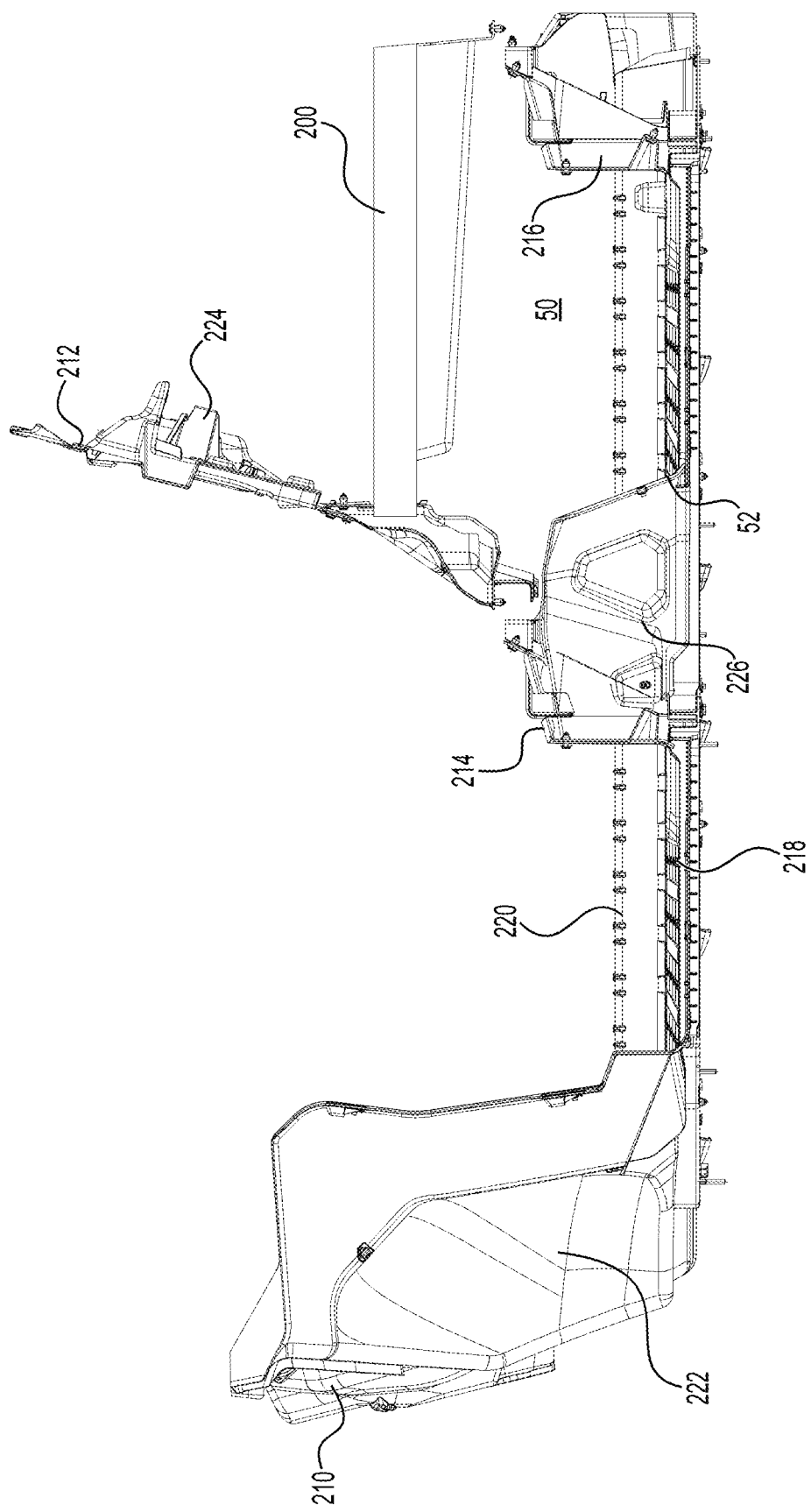
FIG. 17 is a left side elevation view of the vehicle components of FIG. 16.

The upper central partition 212 is disposed between the cockpit 22 and the storage compartment 50. More specifically, the upper central partition 212 is disposed behind the seats 24, 25, 26. As best seen in FIG. 17, part of the upper central partition 212 extends above the top panel 200 and another part of the upper central partition 212 extends below the top panel 200. The part of the upper central partition 212 that extends above the top panel 200 provides various features for connecting components of the engine air intake conduit 74 and of the CVT air intake conduit 88 to the back of the upper central partition 212. More specifically, as can be seen in FIG. 3, the inlet 76, the air box 78, the inlet 90 and the gooseneck 92 are connected to the back of the upper central partition 212. The upper central partition 212 also defines a bracket 224 for receiving the coolant bottle 84. As can be seen in FIG. 1, when the cargo bed 100 is in the lowered position, the inlet 76, the air box 78, the coolant bottle 84, the inlet 90 and the gooseneck 92 are between the upper central partition 212 and the front wall 104 of the cargo bed 100 so as to be mostly hidden from view. With reference to FIG. 17, the part of the upper central partition 212 that extends below the top panel 200 defines an upper part of the front of the storage compartment 50. It is contemplated that the upper central partition 212 could be made of multiple parts.

Figure 18:
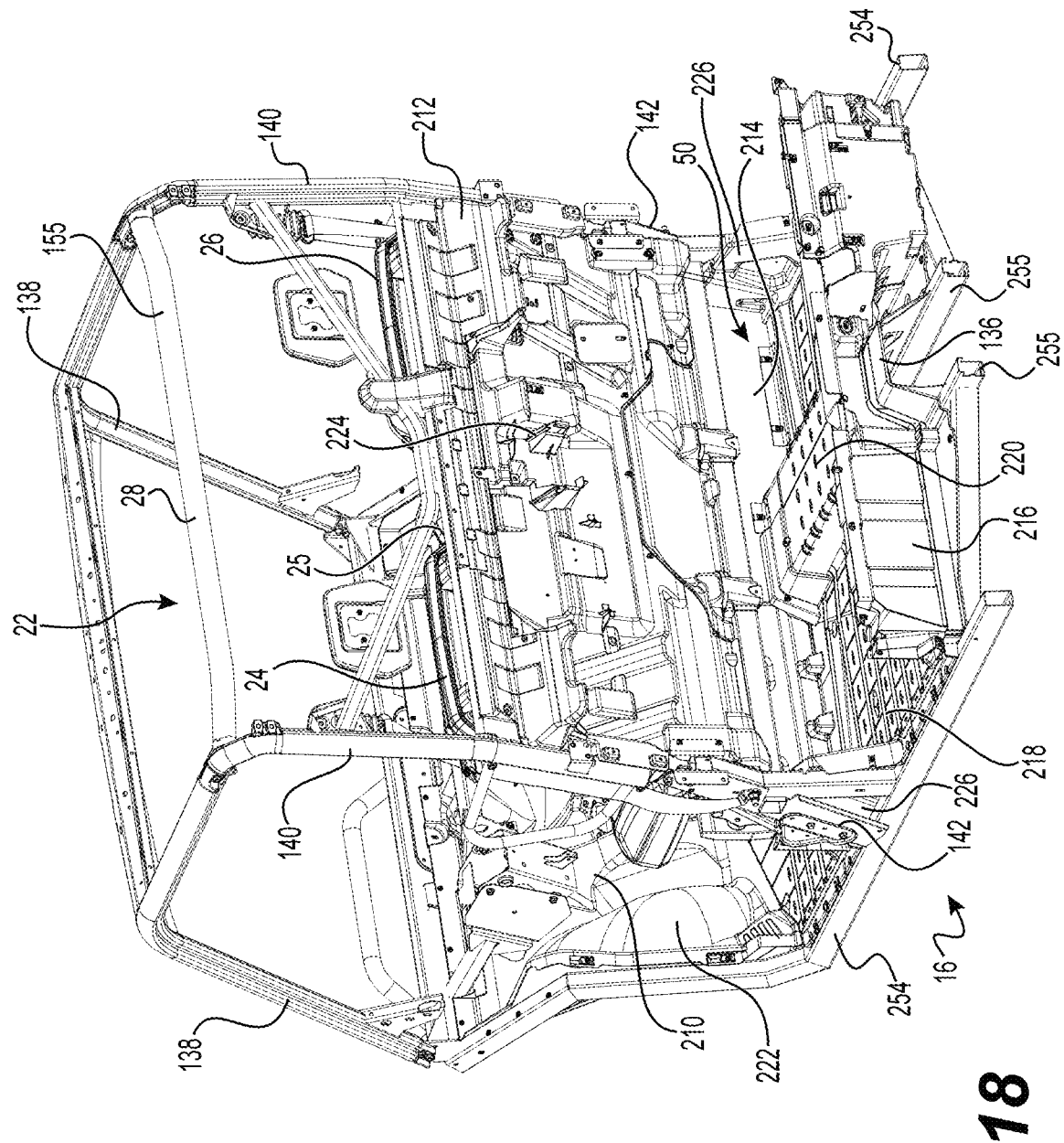
FIG. 18 is a perspective view taken from a rear, left side of the seats, the floor, the partitions and part of the frame of the vehicle of FIG. 1.
Figure 19:
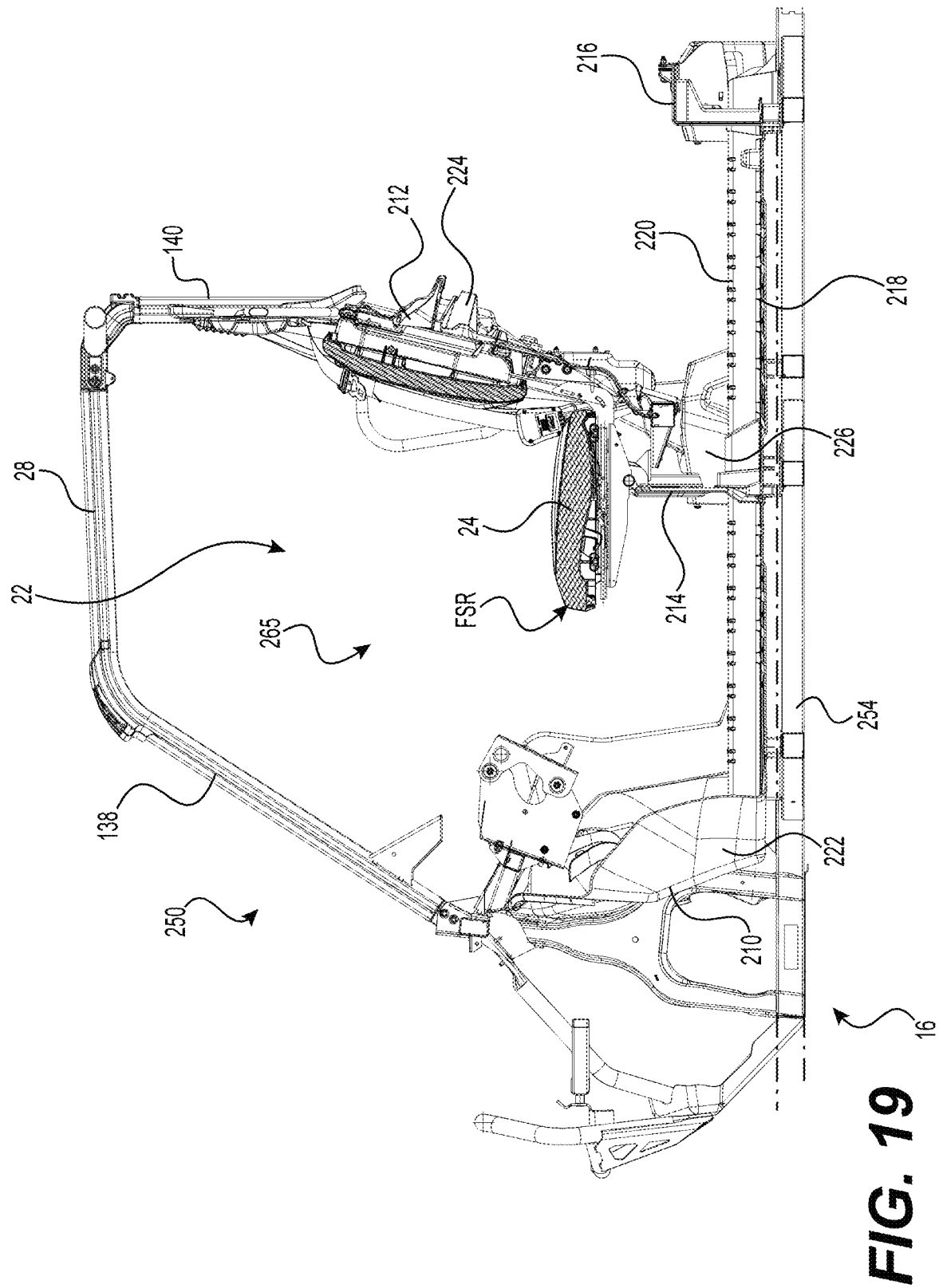
FIG. 19 is a longitudinal cross-section of the vehicle components of FIG. 18 taken through a center of the driver seat.

With references to FIGS. 16 to 19, the lower central partition 214 is disposed under the seats 24, 25, 26. The lower central partition 214 has a generally horizontal portion that extends forward from a bottom of the upper central partition 212 so as to extend under the seats 24, 25, 26. The lower central partition 214 also has a generally vertical portion that extends downward from a front of the generally horizontal portion of the lower central partition 214 to the floor 218. This generally vertical portion of the lower central partition 214 defines a lower part of the front storage compartment 50. As a result, and as best seen in FIG. 18, a portion of the storage compartment 50 extends and is disposed under the seats 24, 25, 26 and is closer to the front of the vehicle 10 than the doors 54. The sides of the portion of the storage compartment 50 defined under the seats 24, 25, 26 are closed by panels 226. It is contemplated that the lower central partition 214 could be shaped differently such that the storage compartment 50 extends under only one or two of the seats 24, 25, 26 or could not extend under the seats 24, 25, 26. It is contemplated that the lower central partition 214 could be made of multiple parts. It is also contemplated that the upper and lower central partitions 212, 214 could be integrally formed.

The rear partition 216 is disposed between the storage compartment 50 and the motor compartment 60 at the rear end of the floor 218. The rear partition 216 defines part of the rear of the storage compartment 50. The motor 62, the CVT 64, the CVT housing 66, the transaxle 68, the muffler 70 and the fuel tank 72 are disposed rearward of the rear partition 216.

Figure 21:
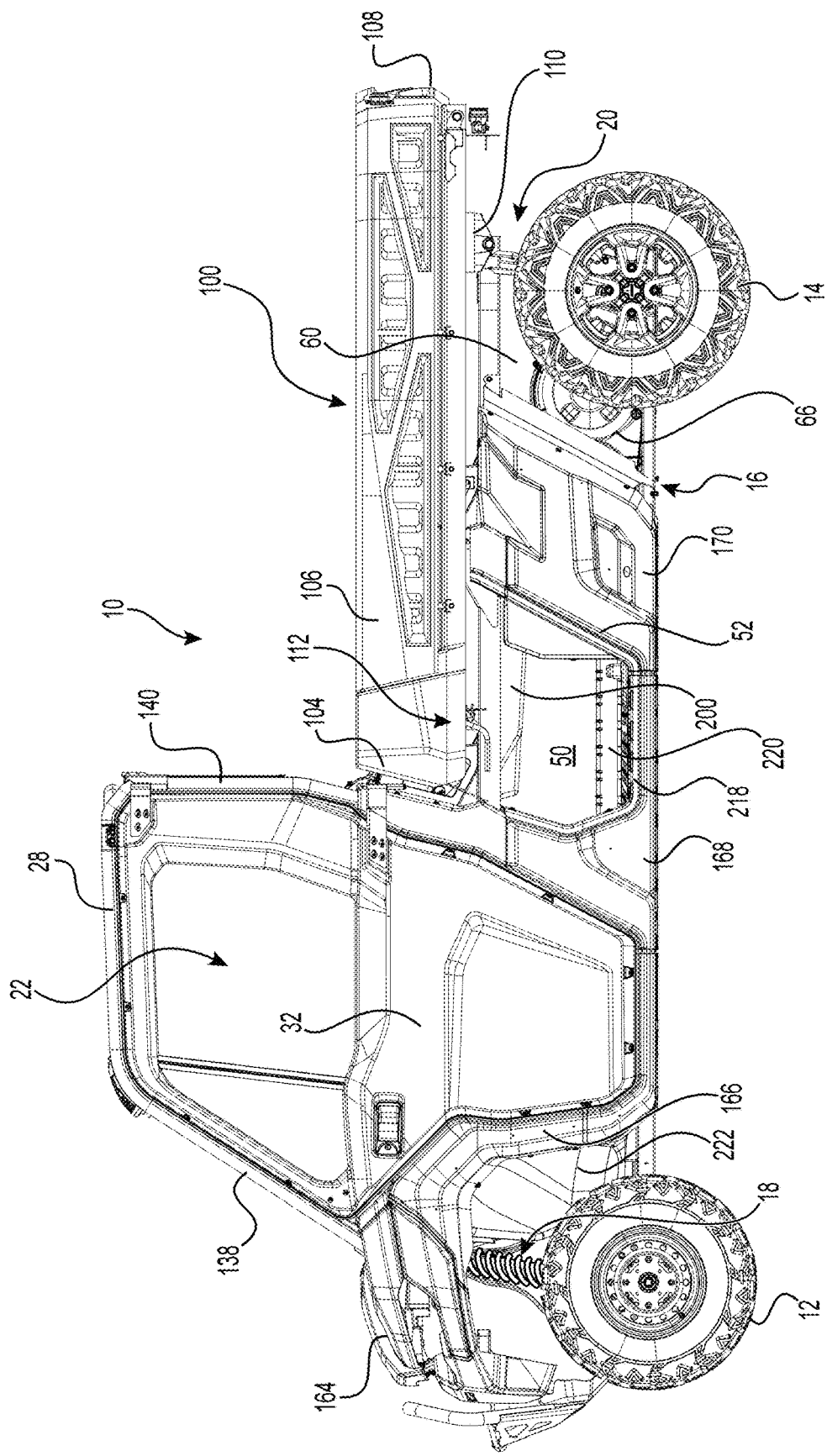
FIG. 21 is a left side elevation view of the side-by-side off-road vehicle of FIG. 20 with doors used for closing access apertures of a storage compartment of the vehicle removed.
Figure 22:
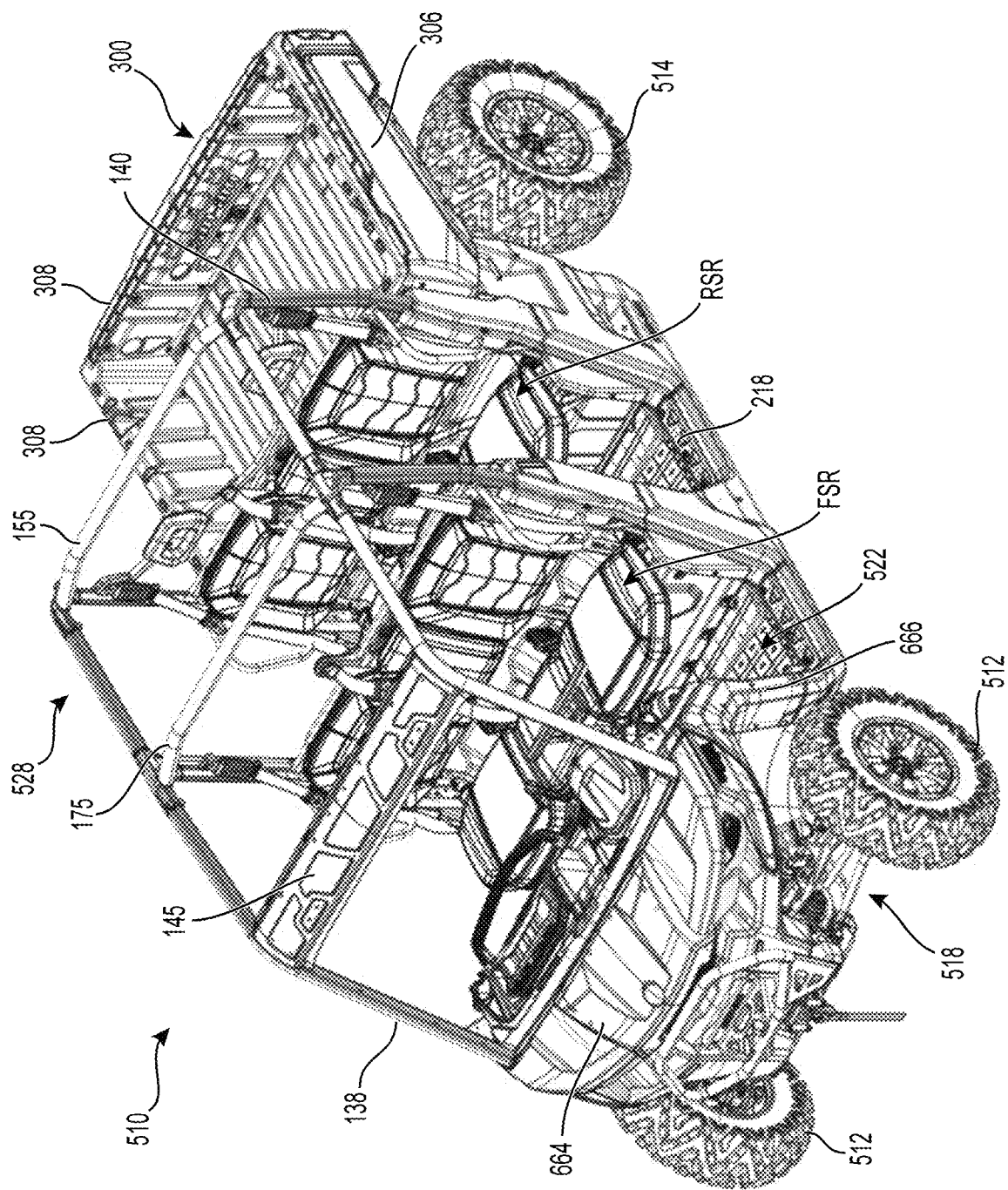
FIG. 22 is a perspective view taken from a front, left side of another side-by-side off-road vehicle of the family of side-by-side off-road vehicles.

As can be seen in FIGS. 2, 5A, 6, 15 to 17 and 21, the storage space defined by the storage compartment 50 extends continuously from one access aperture 52 to the other access aperture 52. As such, and as can be seen in FIGS. 2 and 21, when the doors 54 are removed, one can see right through the vehicle 10. The storage compartment 50 occupies almost the entire width of the vehicle 10, more specifically the entire width of the vehicle 10 minus the thickness of the doors 54, and is more than half as long as it is wide along the floor 218. This permits a substantial amount of cargo and/or cargo of substantial size to be stored in the storage compartment 50. The top panel 200, the partitions 210, 212, 214, 216 and the floor 218 separate the storage space to separate stored cargo from any other components of the vehicle 10. As such, cargo stored in the storage compartment 50 cannot accidentally damage or be accidentally damaged by other components of the vehicle 10.

As described above, the vehicle 10 is assembled in part by connecting the front and rear frame modules 250, 350 and by adapting the frame 16 with the storage compartment structure 150 (which, given its position along the frame 16, can also be referred to as the upper central frame structure 150) to use the configurable space 275 to implement the storage compartment 50.

As mentioned above, the family of vehicles to which the vehicle 10 belongs also includes the vehicle 510, illustrated in FIGS. 22 to 26. As will be seen below, while the vehicle 510 is assembled by using the same front and rear frame modules 250, 350 that are used to assemble the vehicle 10, the frame of the vehicle 510 is then adapted differently such as to use the configurable space 275 for a different purpose.

The vehicle 510 uses many of the same components as the vehicle 510 and thus like components have been identified with like reference numerals. It will be understood that variants of these components may be used for the vehicle 510 (e.g., a different motor, a different CVT, different seats, different wheels, etc.) instead of the same exact components as in the vehicle 10. The vehicle 510 has a frame 516 to which front and rear suspension assemblies 518, 520 are connected. Front and rear wheels 512, 514 are mounted to the front and rear suspension assemblies 518, 520. The vehicle 510 has a wheelbase length $WB_B$ measured longitudinally between the center 513 of the front wheels 512 and the center 515 of the rear wheels 514 (when the wheels 512, 514 are in a straight ahead orientation—i.e., not turning).

Figure 27A:
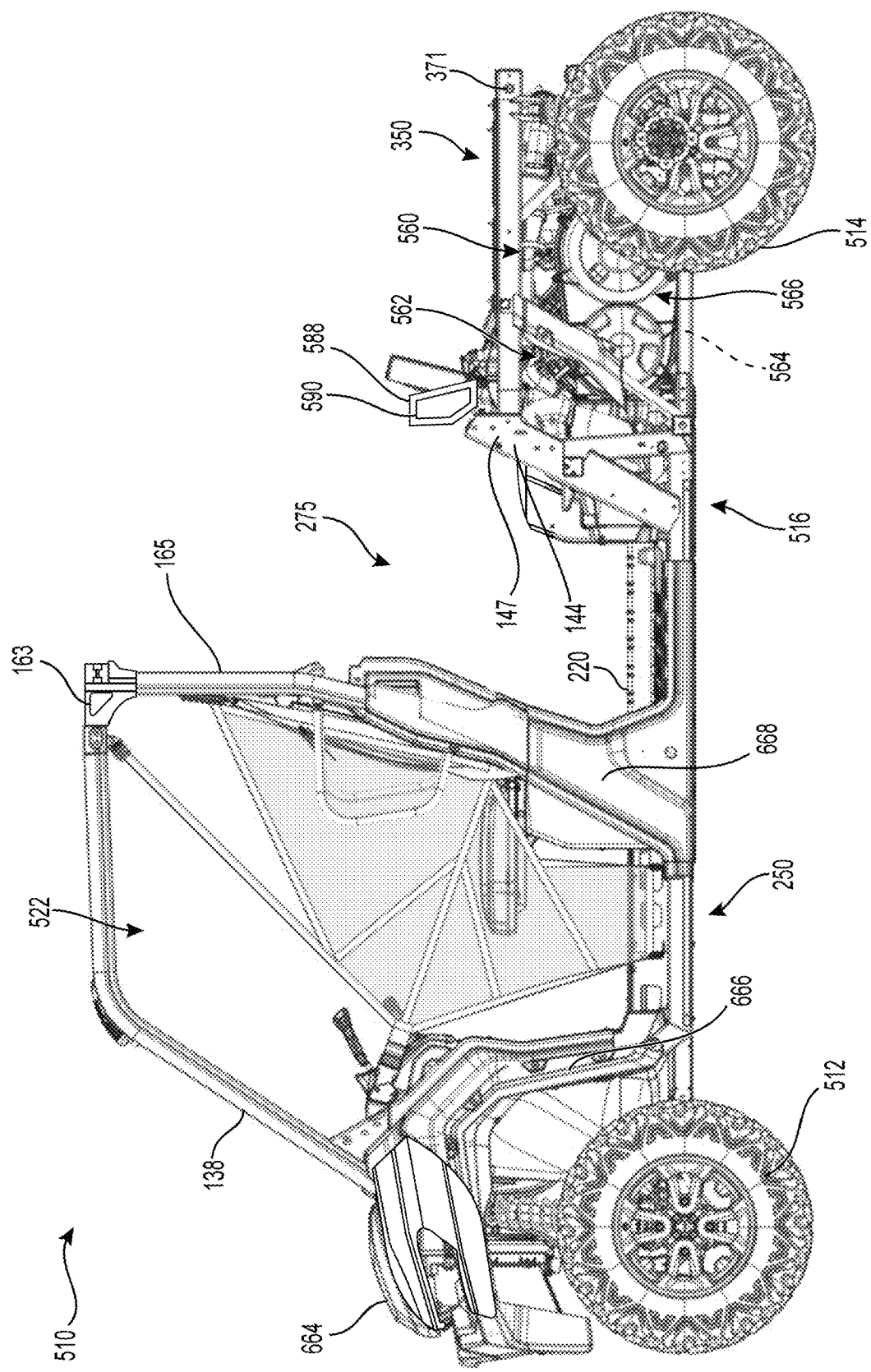
FIG. 27A is a left side elevation view of the vehicle of FIG. 22, with the cargo bed, some body panels and a rear seat row removed.
Figure 27B:
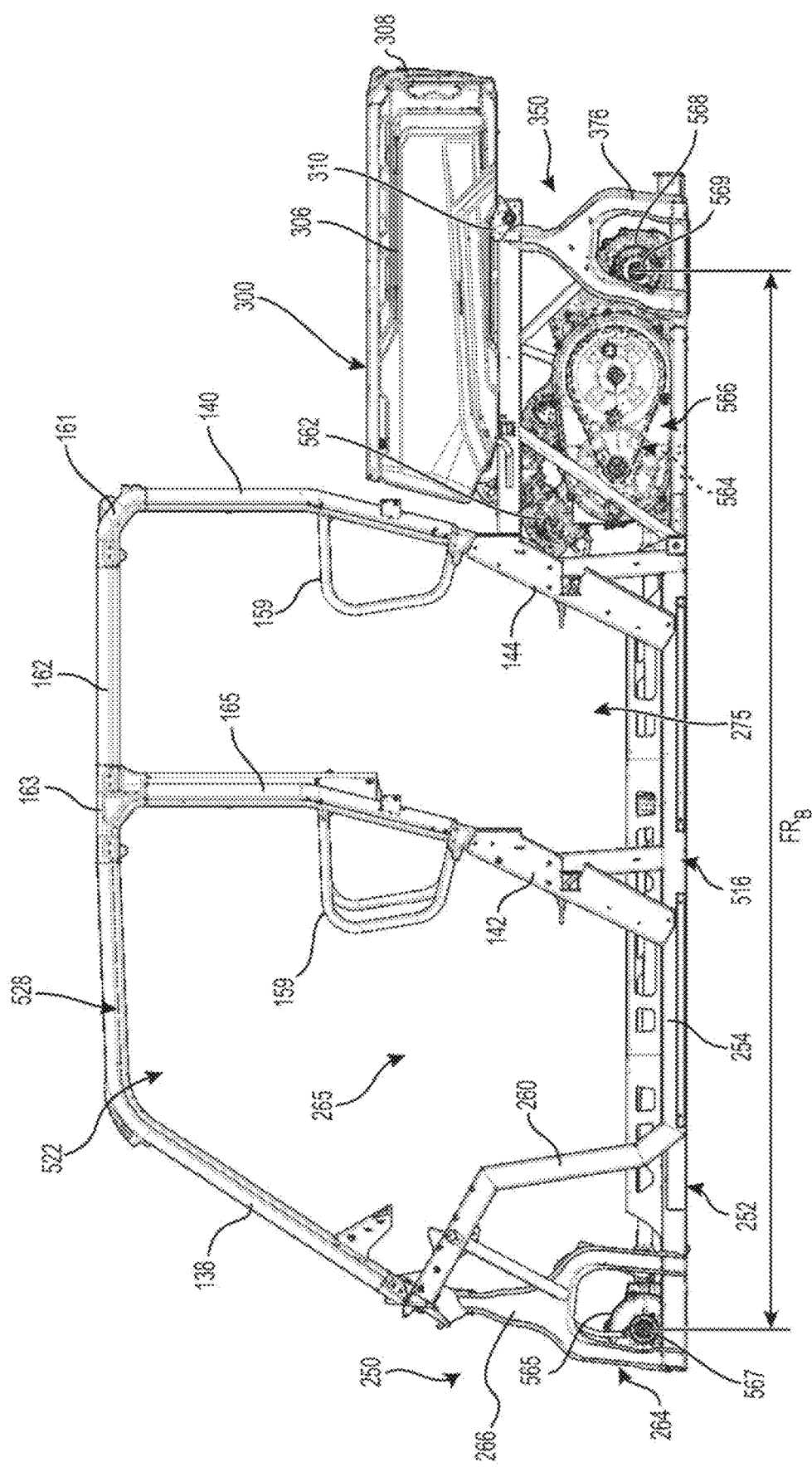
FIG. 27B is a left side elevation view of part of a frame, an engine, a transaxle, a front differential, and a cargo bed of the vehicle of FIG. 22.

The frame 516 of the vehicle 510 is formed in part by connecting the front frame module 250 and the rear frame module 350 which were described above. The motor 562 is disposed in the motor compartment 60 defined by the rear frame module 350. With reference to FIGS. 27A and 27B, the CVT 564, the transaxle 568, the muffler (not shown) and the fuel tank (not shown) are mounted to the rear frame module 350 in the same manner described above with reference to the vehicle 10. As shown in FIG. 27B, the front differential 565 is mounted to the front frame module 250. The vehicle 510 has a front-rear output distance $FR_B$ measured longitudinally between a front differential output axis 567 of the front differential 565 and a transaxle output axis 569 of the transaxle 568 (i.e., the distance between the frontmost output axis and the rearmost output axis).

In contrast with the frame 16 of the vehicle 10, the frame 516 of the vehicle 510 is not provided with the storage compartment structure 150. Rather, the configurable space 275 defined by the front frame module 250 is used as an additional seat row space in order to install another seat row RSR disposed rearward of the seat row FSR. As such, the seat row FSR may be referred to as a "front seat row" and the seat row RSR may be referred to as a "rear seat row". In this embodiment, the rear seat row RSR includes a left rear seat 624, a right rear seat 626, and a center rear seat 625 disposed between the seats 624, 626. Thus, in the vehicle 510, the configurable space 275 is part of the cockpit 522 such that the cockpit 522 extends along a greater length of the vehicle 510 compared to the vehicle 10.

Figure 29:
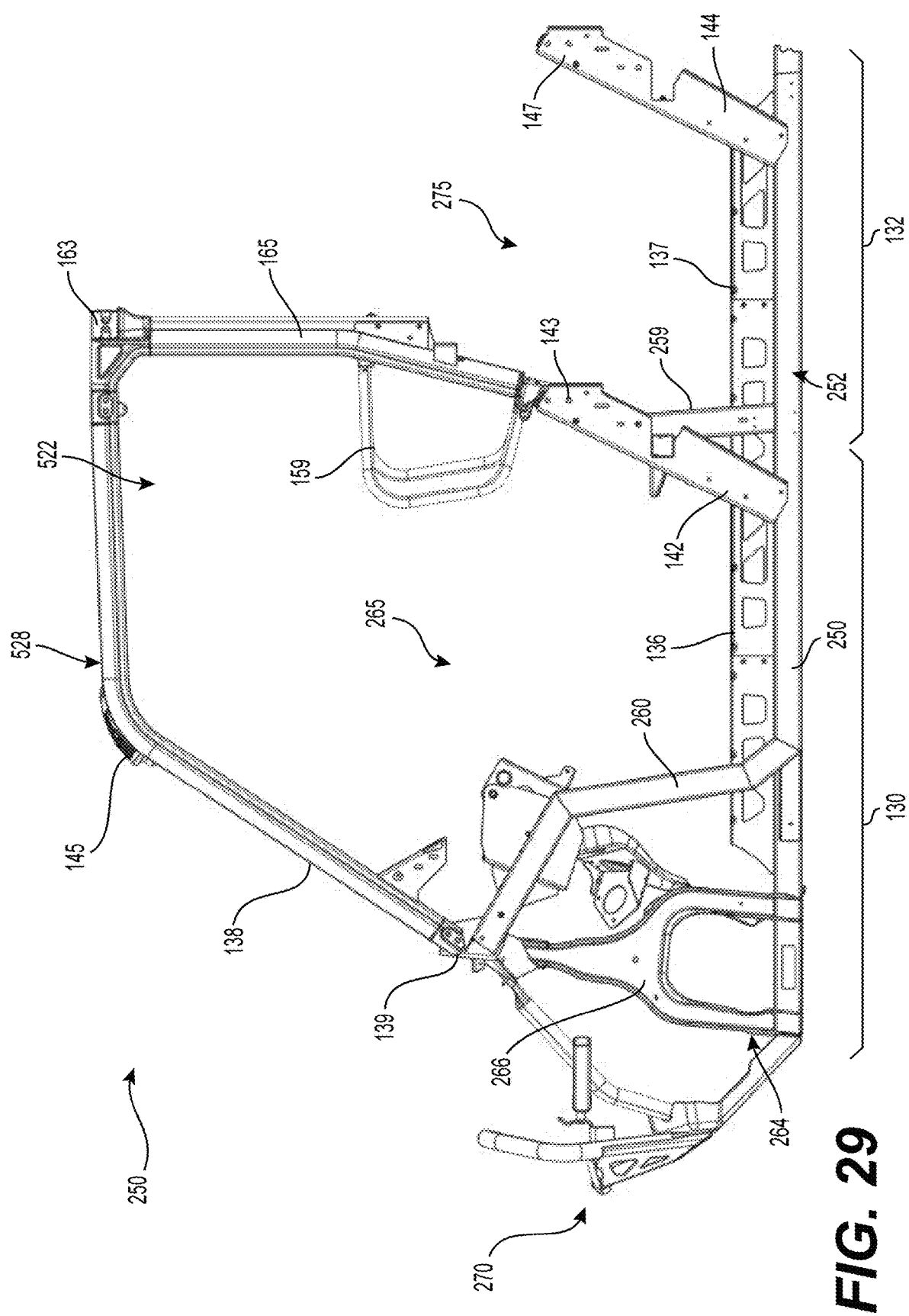
FIG. 29 is a left side elevation view of the front frame module of FIG. 28.
Figure 31:
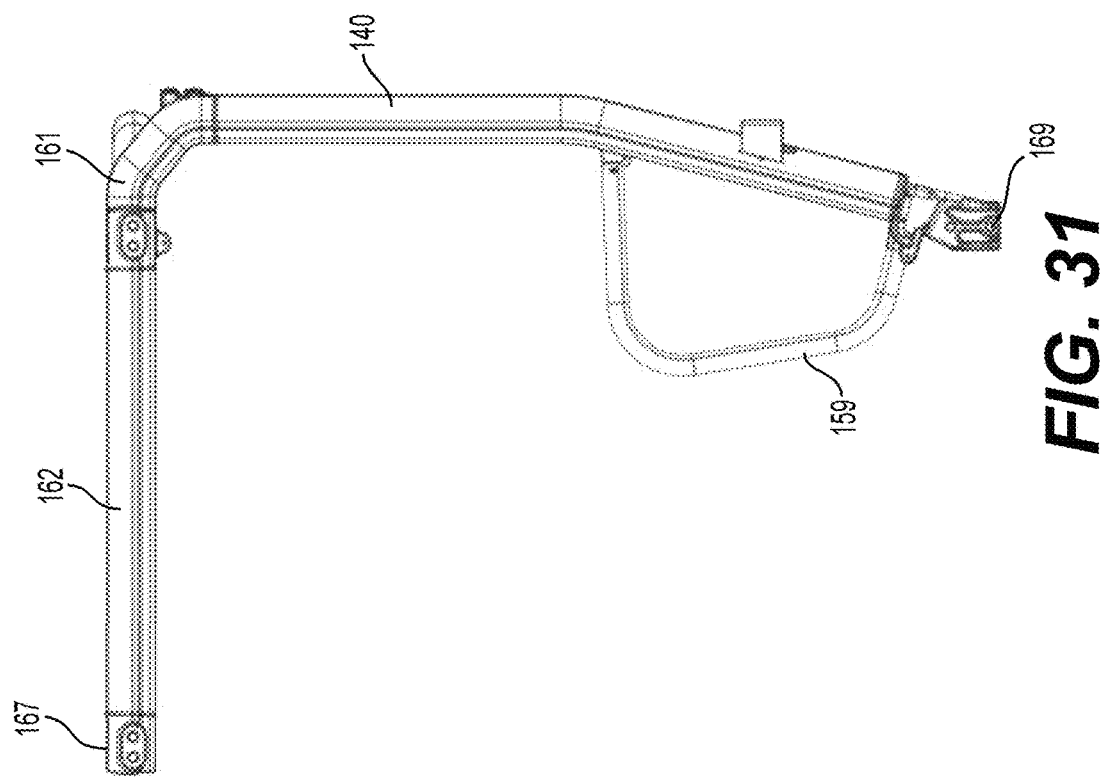
FIG. 31 is a left side elevation of the rear part of the roll cage of FIG. 30.
Figure 30:
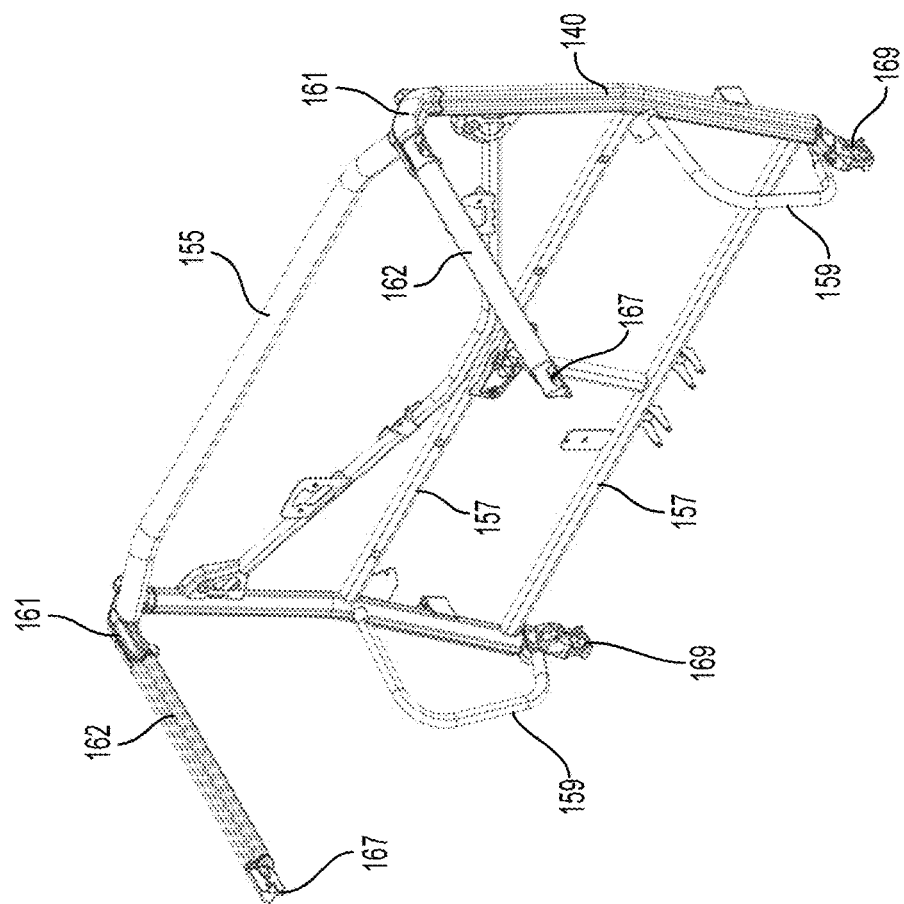
FIG. 30 is a perspective view taken from a front, left side of a rear part of the roll cage of the vehicle of FIG. 22.

In order to protect passengers seated in the rear seat row RSR, a different roll cage amongst the family of roll cages is installed on the vehicle 510. Notably, a roll cage 528 is connected to the frame 516 to extend over the front seat row FSR and the rear seat row RSR. The roll cage 528 has a length that is greater than a length of the roll cage 28 of the vehicle 10. The roll cage 528 may thus be referred to as "long roll cage" and the roll cage 28 may be referred to as a "short roll cage". The long roll cage 528 has many of the same components used in the short roll cage 28. For instance, the long roll cage 528 has the same front legs 138 and rear legs 140 as the short roll cage 28. FIG. 29 shows the front frame module 250 mounted with components of the long roll cage 528 that extend over the front seat row space 265 (and thus the front seat row FSR). The front legs 138 are connected to the roll cage mounts 139 in the same manner as described above with respect to the vehicle 10. However, instead of the rear legs 140 being connected to the roll cage mounts 143, intermediate legs 165 are connected to the roll cage mounts 143 for supporting the roll cage 528 longitudinally between the front and rear legs 138, 140. The rear legs 140 are connected to the rear vertically-extending frame members 144. More specifically, lower connectors 169 of the rear legs 140 are connected to the mounts 147 defined at the top ends of the rear vertically-extending frame members 144. The mounts 147 may thus be referred to as "roll cage mounts". The roll cage mounts 147 can thus be used to connect the rear legs 140 or to connect the storage compartment structure 150. As shown in FIGS. 30 and 31, each of the rear legs 140 is connected, via a roll cage connector 161, to a corresponding longitudinally-extending roll cage member 162. The front legs 138, the intermediate legs 165 and the longitudinally-extending roll cage members 162 are connected at front roll cage connectors 163 (FIG. 29). Notably the longitudinally-extending roll cage members 162 have connecting end portions 167 for connecting to the front roll cage connectors 163. As such, the front legs 138, rear legs 140 and intermediate legs 165 are all connected to one another to form the roll cage 528. A laterally-extending roll cage member 175 extends between the laterally opposite connectors 163.

As shown in FIG. 27A, a CVT air intake conduit 588 is provided to supply air inside the CVT housing 566 to cool the CVT 564. The CVT air intake conduit 588 includes an inlet 590 in fluid communication with the CVT housing 566 via a gooseneck and a pipe (not shown—similar to the gooseneck 92 and pipe 94 of the vehicle 10). The inlet 590 is disposed on a left side of the vehicle 510, rearward of the left rear passenger seat 624 of the rear seat row RSR. The air intake aperture defined by the inlet 590 faces leftward.

An engine air intake conduit (not shown) is also provided for supplying air to the motor 562. The engine air intake conduit is similar to the engine air intake conduit 74 of the vehicle 10 except that, similarly to the CVT air intake conduit 588, the inlet of the engine air intake conduit of the vehicle 510 is disposed rearward of the rear seat row RSR, specifically the right rear passenger seat 626.

Figure 23:
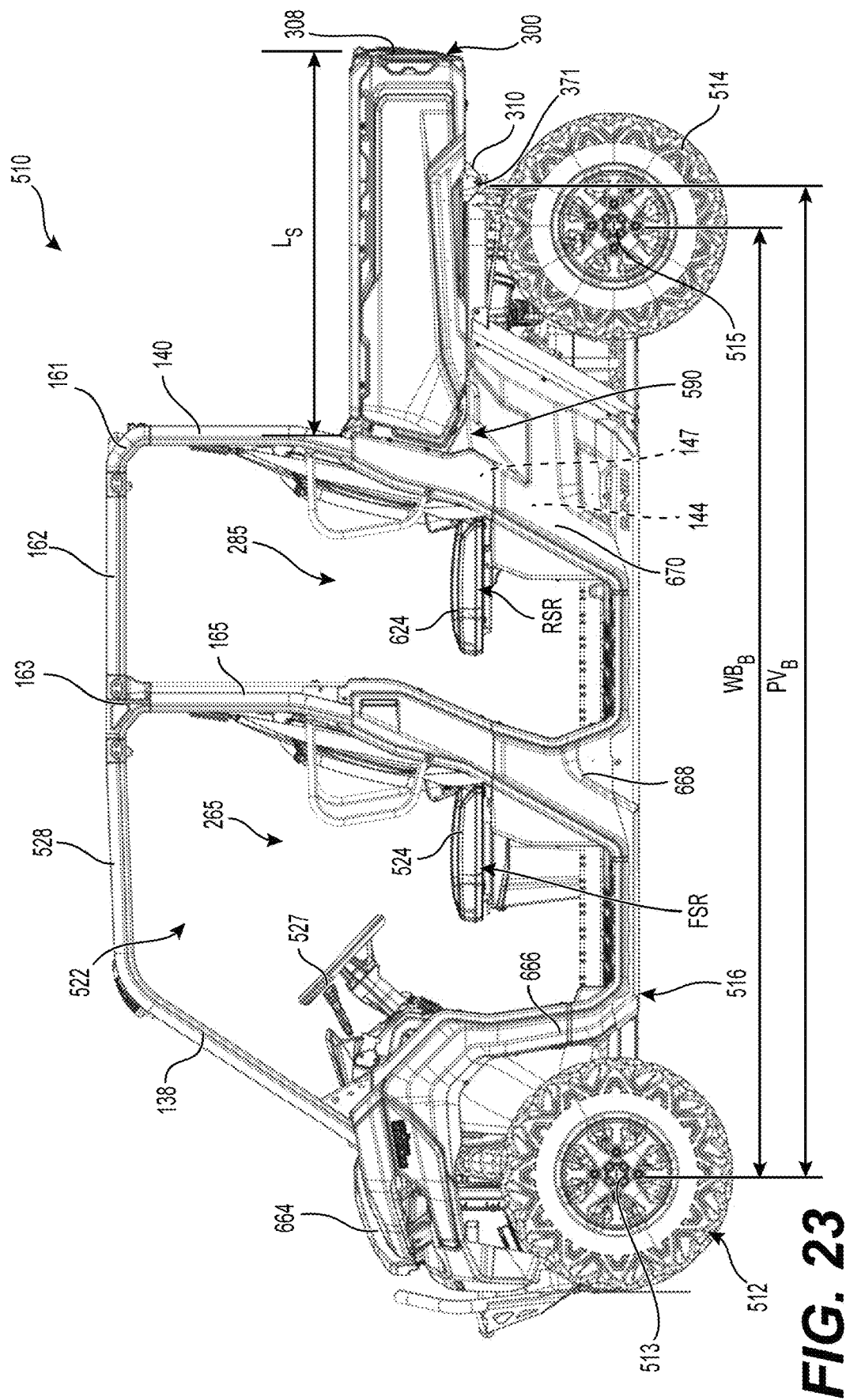
FIG. 23 is a left side elevation view of the vehicle of FIG. 22.
Figure 24:
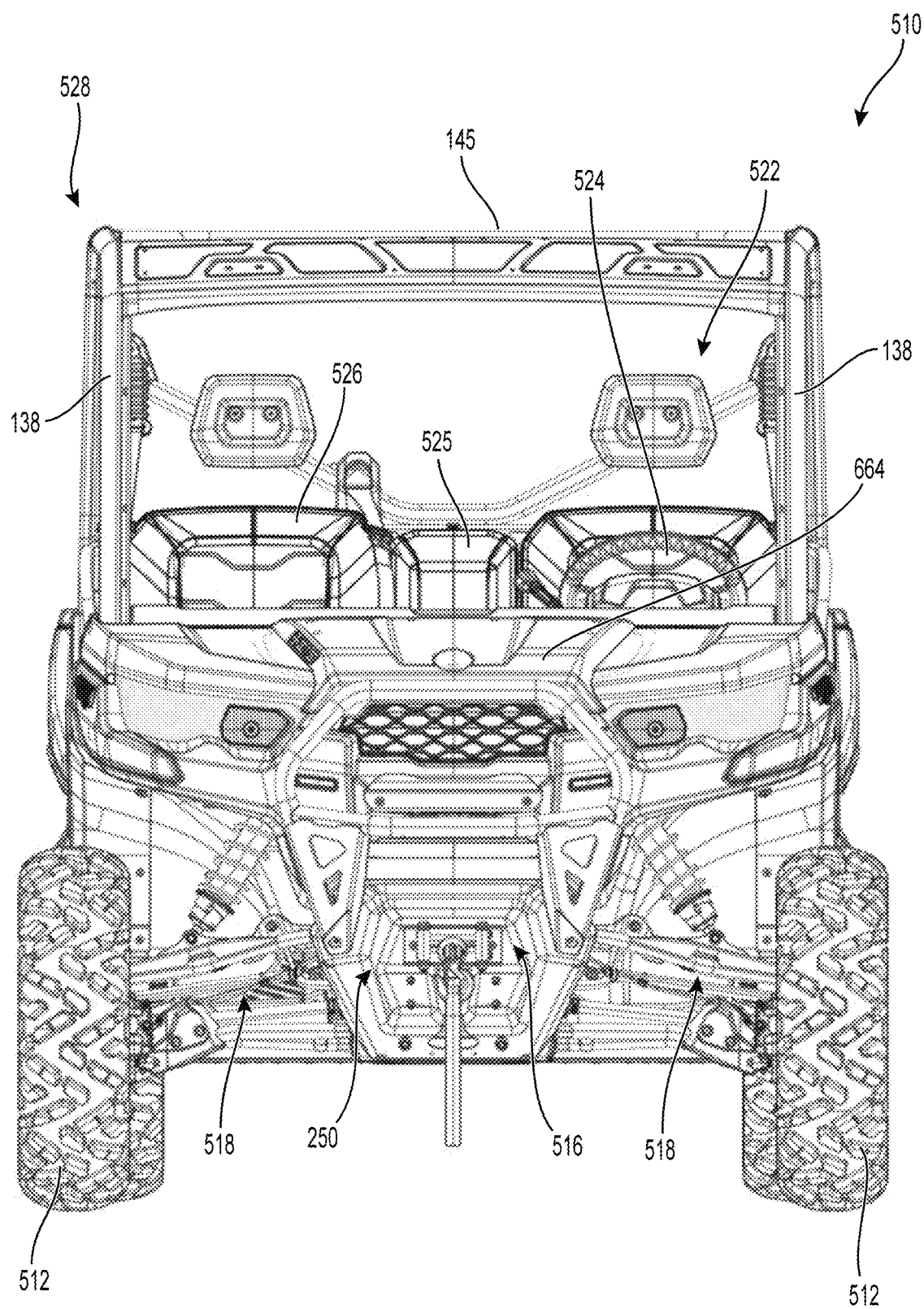
FIG. 24 is a front elevation view of the vehicle of FIG. 22.
Figure 27C:
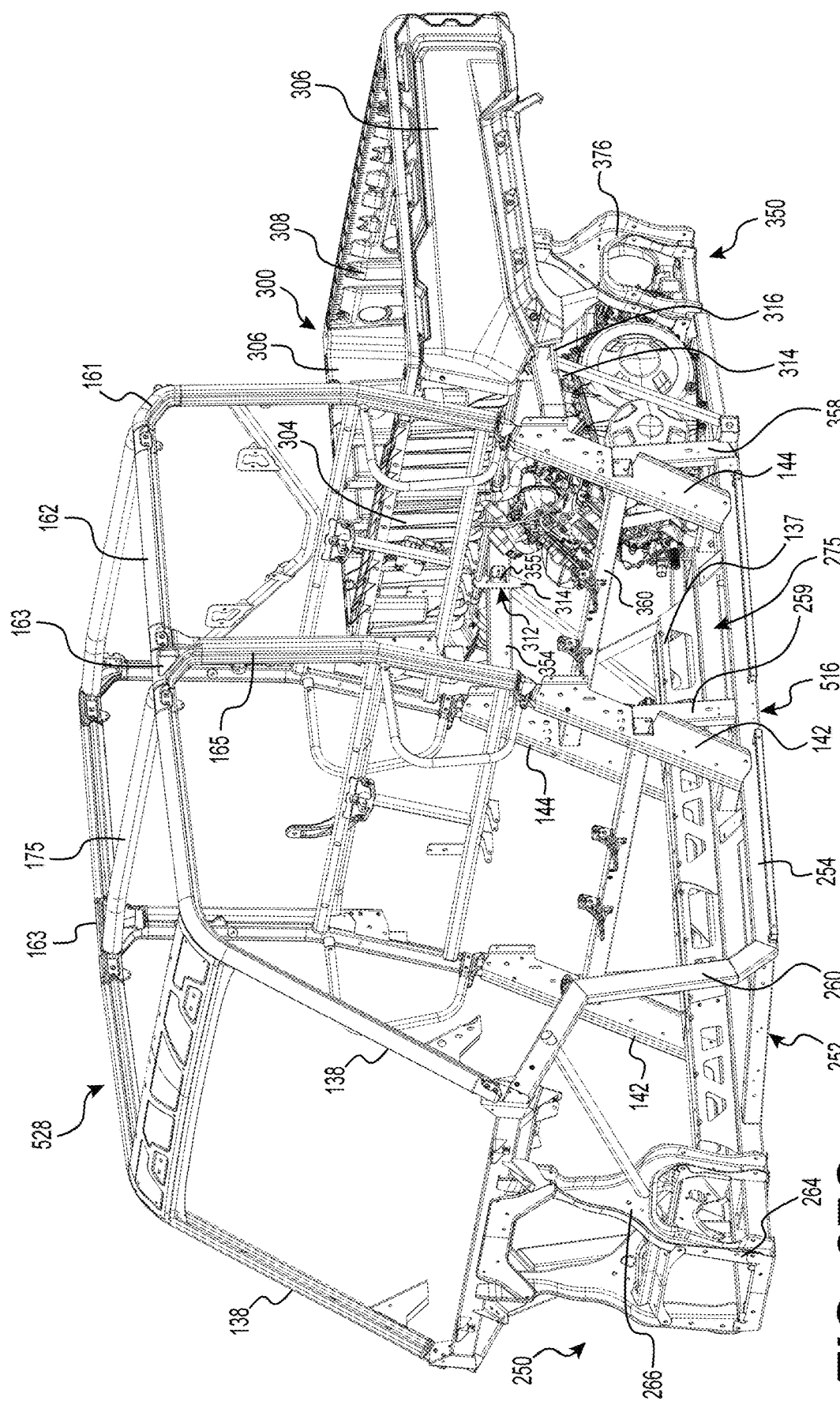
FIG. 27C is a perspective view taken from a front, left side of the vehicle components of FIG. 27B.
Figure 28:
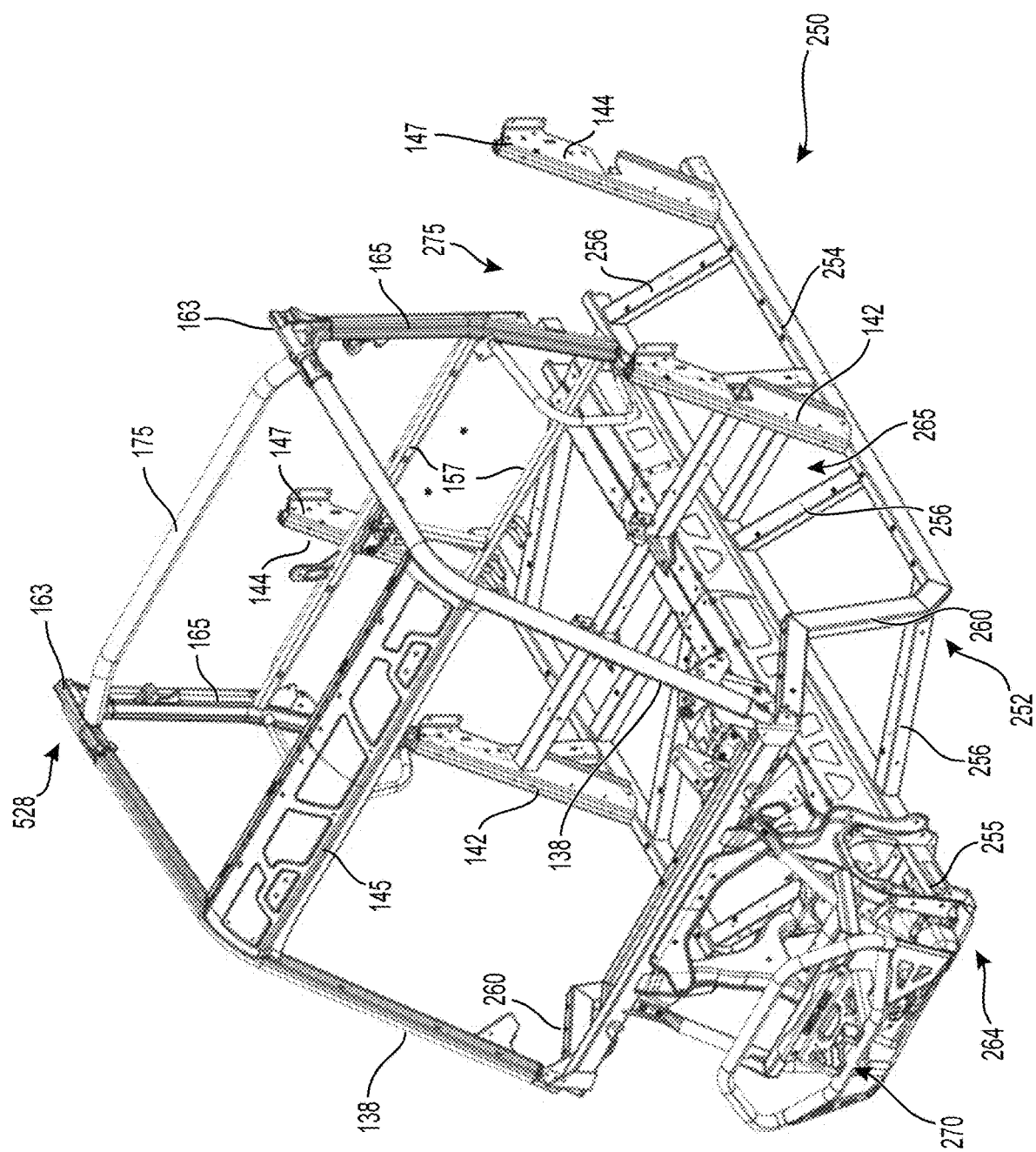
FIG. 28 is a perspective view taken from a front, left side of the front frame module of the vehicle of FIG. 22, with part of a roll cage connected thereto.

Since the cockpit 522 is longer than the cockpit of the vehicle 10 due to the rear seat row RSR, the vehicle 510 does not have the space required for installing the long cargo bed 100. Instead, the vehicle 510 is equipped with the short cargo bed 300. The short cargo bed 300 is similar in many aspects to the long cargo bed 100 except that the length $L_S$ (FIG. 23) of the short cargo bed 300 is less than the length $L_L$ of the long cargo bed 100. The short cargo bed 300 has a floor 302, a front wall 304, left and right side walls 306 and a tailgate 308. It is contemplated that one or more of the front wall 304, the left and right side walls 306 and the tailgate 308 could be selectively removable. It is also contemplated that one or more of the front wall 304, the left and right side walls 306 and the tailgate 308 could be omitted. It is also contemplated that the tailgate 308 could be replaced by a rear wall, which could be selectively removable. It is also contemplated that the short cargo bed 300 could have a movable or removable top. Brackets 310 are connected to the bottom of the short cargo bed 300 near a rear thereof and pivotally connect the short cargo bed 300 to the rear frame module 350. Notably, the short cargo bed 300 is pivotally mounted to the cargo bed pivot 371 defined by the axles 370. As such, similarly to the long cargo bed 100, the short cargo bed 300 can pivot about the cargo bed pivot axis 380 between a lowered position and a raised position. As best seen in FIG. 23, when the short cargo bed 300 is in the lowered position, the short cargo bed 300 extends over the motor compartment 60 but not over the configurable space 275. Moreover, the short cargo bed 300 is disposed rearwardly of the roll cage mounts 147 (both in the lowered and raised positions). A lock 312 (FIG. 27C) similar to that described with respect to the long cargo bed 100 is provided to lock the short cargo bed 300 in place in the lowered position. Notably, the lock 312 includes a pair of spring-biased hooks 314 and a release handle 316. Instead of engaging the storage compartment structure 150 for locking, the hooks 314 of the lock 312 engage the laterally-extending retaining members 355 of the rear frame module 350. Thus, the distance between the hooks 314 and the cargo bed pivot axis 380 is approximately the same as the distance between the laterally-extending retaining members 355 and the cargo bed pivot axis 380. To pivot the short cargo bed 300 to the raised position, a user first actuates a release handle (not shown) thereby causing a hook of the locking system to release the member of the rear frame module 350. The short cargo bed 300 can then be pivoted to the raised position. A gas cylinder (not shown) connected between the frame 516 and the bottom of the cargo bed 300 helps to maintain the cargo bed 300 in the raised position. In the present embodiment, the cargo bed 300 is pivoted manually between its lowered and raised positions, but it is contemplated that it could be pivoted by an actuator such as an electric or hydraulic actuator.

The vehicle 510 is assembled, similarly to the vehicle 10, in part by connecting the front frame module 250 and the rear frame module 350. However, instead of using the configurable space 275 for the storage compartment 50 and to extend the space available for the cargo bed, in the vehicle 510 the configurable space 275 is used as a seat row space 285 to accommodate the rear seat row RSR. Consequently, the vehicle 510 is equipped with the short cargo bed 300 instead of the long cargo bed 100. Despite these functional differences, the wheelbase length $WB_B$ of the vehicle 510 is approximately the same as the wheelbase length $WB_A$ of the vehicle 10. That is, the difference between the wheelbase lengths $WB_A$, $WB_B$ is solely due to manufacturing tolerances (i.e., ±0.1%). Similarly, a longitudinal cargo pivot distance $PV_B$ of the vehicle 510 measured between the center 513 of the front wheels 512 and the cargo bed pivot axis 380 (when the front wheels 12 are in a straight ahead orientation—i.e., not turning) is approximately the same as the longitudinal pivot distance $PV_A$ of the vehicle 10. That is, the difference between the longitudinal pivot distances $PV_A$, $PV_B$ is solely due to manufacturing tolerances (i.e., ±0.1%). Similarly, the front-rear output distance $FR_B$ of the vehicle 510 is approximately the same as the front-rear output distance $FR_A$ of the vehicle 10. That is, the difference between the front-rear output distances $FR_A$, $FR_B$ is solely due to manufacturing tolerances (i.e., ±0.1%).

Given the longer cockpit 522, the vehicle 510 may have different and/or additional partitions than those described with reference to the vehicle 10. Moreover, in the vehicle 510, the portion of the floor 218 extending between the front and rear vertically-extending frame members 142, 144 now acts as a cockpit floor (rather than as storage compartment floor). The vehicle 510 also has body panels, including a hood 664, left and right front fenders 666, left and right side panels 668 and left and right side panels 670. In this embodiment, the hood 664, front fenders 666 and side panels 668, 670 are the same as those used for the vehicle 10 (the hood 164, the front fenders 166, and the side panels 168, 170). It is contemplated that, in other embodiments, the body panels of the vehicle 510 could be different from those used for the vehicle 10.

Figure 32:
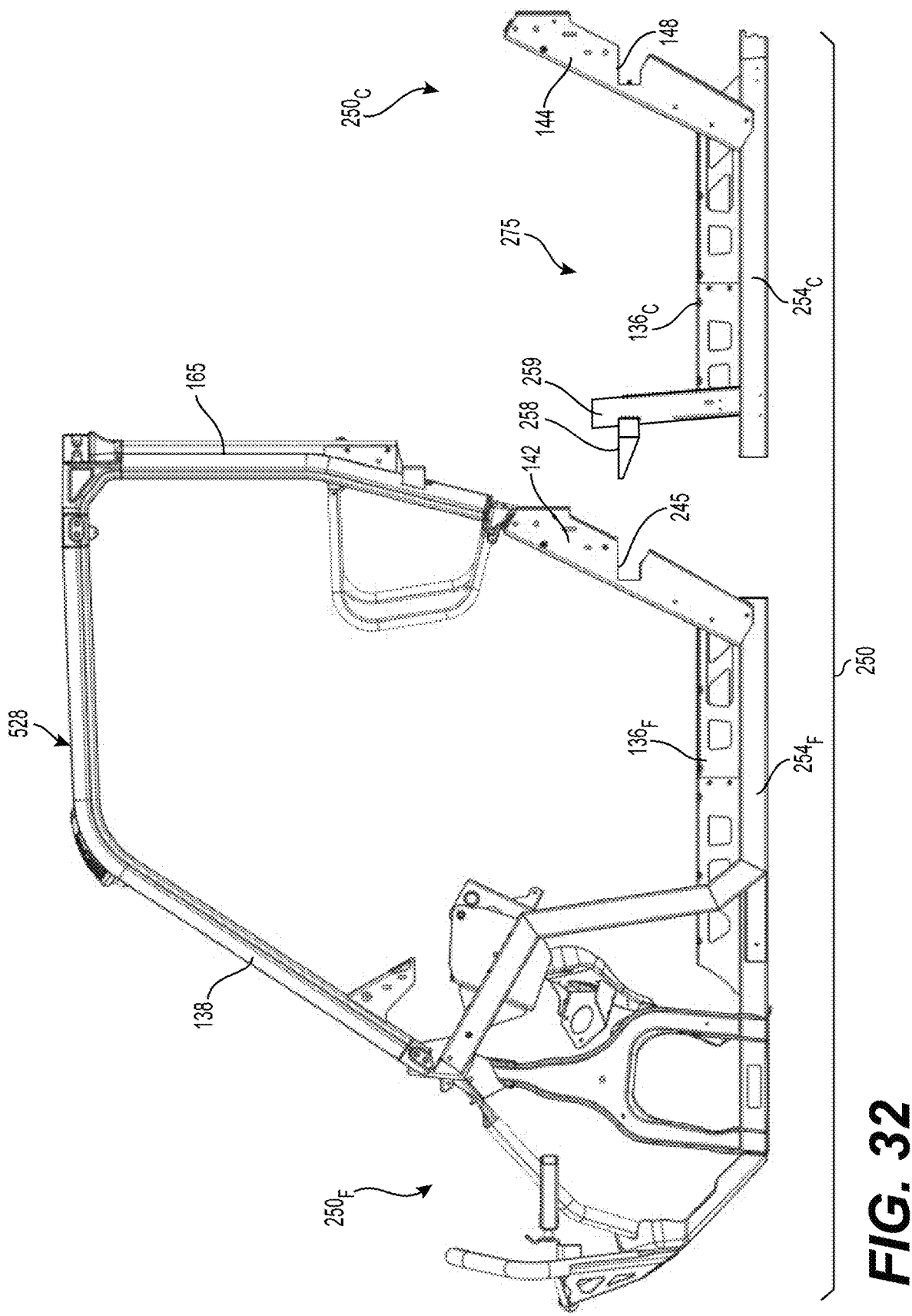
FIG. 32 is a left side elevation view of the front frame module of FIG. 28 in accordance with an embodiment in which the front frame module includes two sub-modules.
Figure 33:
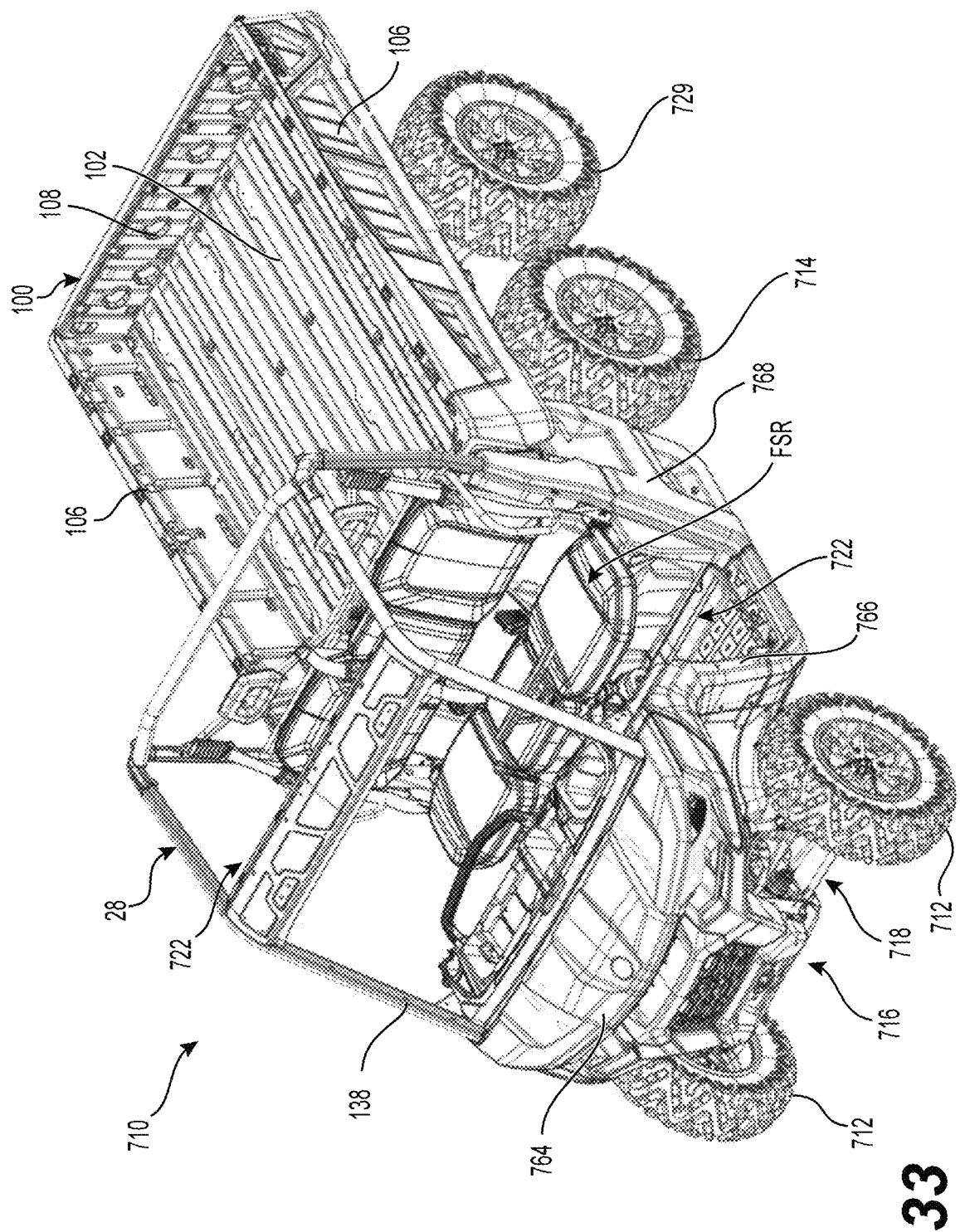
FIG. 33 is a perspective view taken from a front, left side of another side-by-side off-road vehicle of the family of side-by-side off-road vehicles.

In some embodiments, the front frame module 250 used to assemble the vehicles 10, 510 may be subdivided in sub-modules that are connected to one another. For instance, as shown in FIG. 32, in some embodiments, the front frame module 250 has a front sub-module $250_F$ and a central sub-module $250_C$ connected to and disposed rearward of the front sub-module $250_F$. The front sub-module $250_F$ includes the first section 130 while the central sub-module $250_C$ includes the second section 132. Thus, the front sub-module $250_F$ includes the front suspension mounting structure 264 and the front vertically-extending frame members 142, while the central sub-module $250_C$ includes the rear vertically-extending frame members 144 and defines the configurable space 275. In this embodiment, the longitudinally-extending frame members 254 of the lower frame structure 252 include front longitudinally-extending frame members $254_F$ and central longitudinally-extending frame members $254_C$ which are connected to one another when the front and central sub-modules $250_F$, $250_C$ are connected. Similarly, the longitudinally-extending frame members 255 of the lower frame structure 252 include front and central longitudinally-extending frame members (not shown) which are connected to one another. The tunnel 136 is subdivided in two pieces $136_F$, $136_C$ which are connected to one another. In such an embodiment, when the vehicle 510 is assembled, the rear seat row RSR is thus installed within the configurable space 275 defined by the central sub-module 250$_C$. Moreover, when the vehicle 10 is assembled, the long cargo bed 100 extends longitudinally, in the lowered position, over the configurable space 275 (e.g., at least a rear portion thereof) defined by the central sub-module 250$_C$.

It is to be understood that the present technology does not imply any particular construction of the frame modules of the vehicles. That is, the specific construction of the modules of the frame 16 of the vehicle 10 and the frame 516 of the vehicle 510 may be configured in other ways in other embodiments. Rather, the present technology provides that the frame of each vehicle of the family of vehicles shares common frame modules with the frame of other vehicles of the family.

The vehicle 710 will now be described with reference to FIGS. 33 to 37C. The vehicle 710 uses many of the same components as the vehicle 10 and thus like components have been identified with like reference numerals. It will be understood that variants of these components may be used for the vehicle 710 (e.g., a different motor, a different CVT, different seats, different wheels, etc.) instead of the same exact components as in the vehicle 10.

Figure 34:
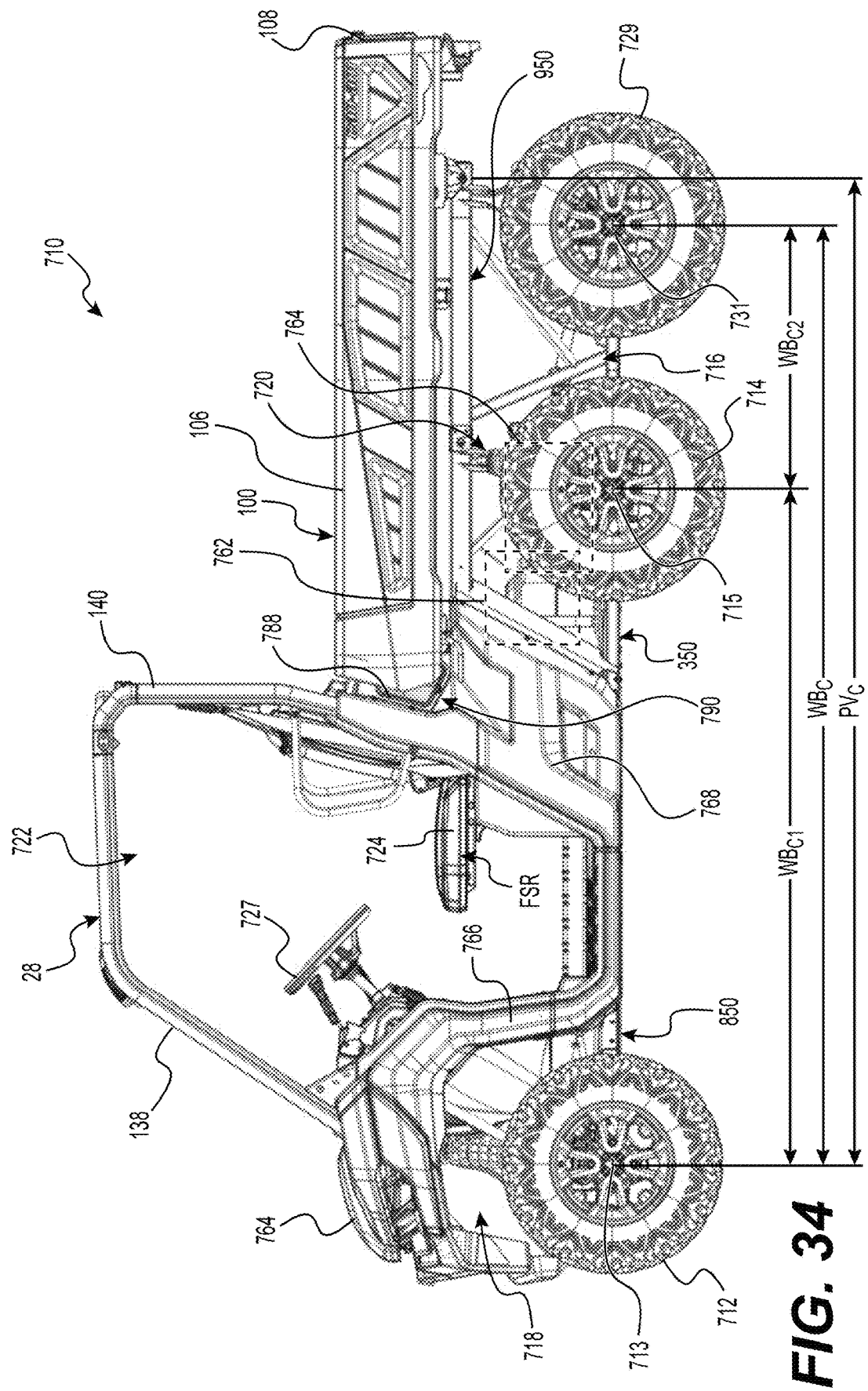
FIG. 34 is a left side elevation view of the vehicle of FIG. 33.
Figure 35:
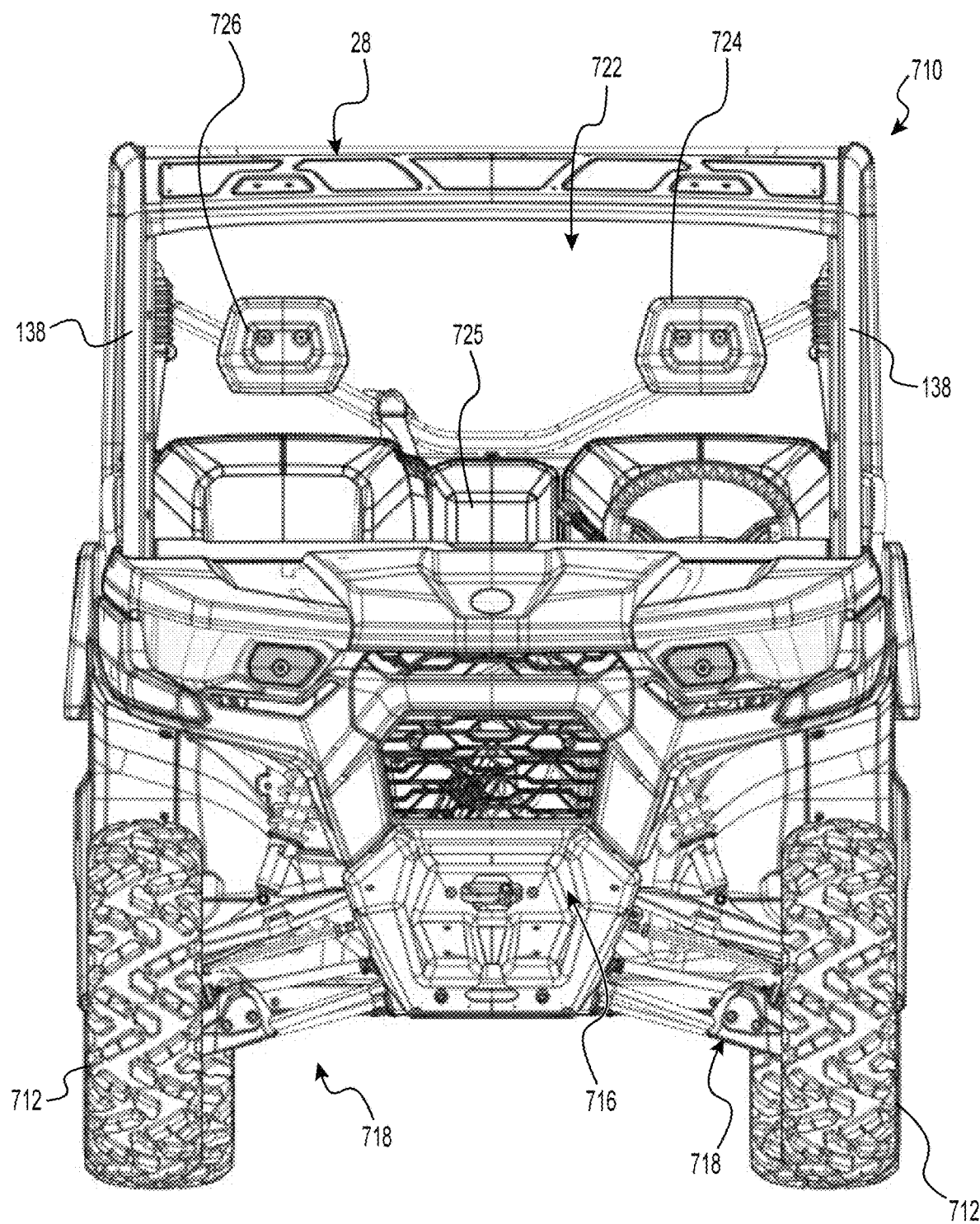
FIG. 35 is a front elevation view of the vehicle of FIG. 33.
Figure 36:
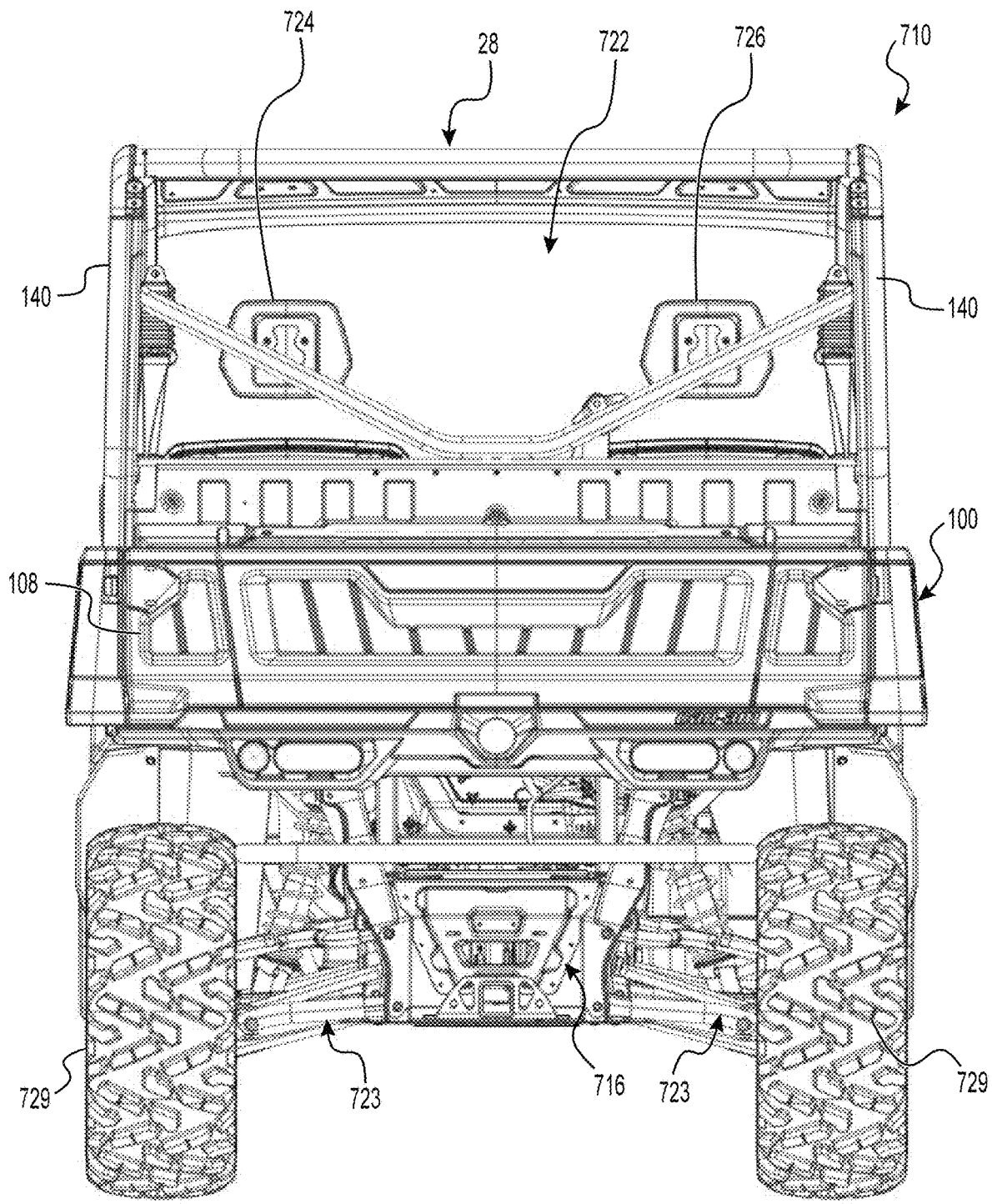
FIG. 36 is a rear elevation view of the vehicle of FIG. 33.

As shown in FIGS. 34 to 36, the vehicle 710 has a frame 716 to which left and right front suspension assemblies 718, left and right rear suspension assemblies 720, and left and right additional rear suspension assemblies 723 are connected. Left and right front wheels 712 are mounted to the front suspension assemblies 718, left and right rear wheels 714 are mounted to the rear suspension assemblies 720, and left and right additional rear wheels 729 are mounted to the additional rear suspension assemblies 723. The vehicle 710 is a six-wheeled vehicle including dual rear axles (i.e., having two sets of rear wheels) which may provide additional traction when driving the vehicle 710. As shown in FIG. 34, the vehicle 710 has a wheelbase length WB$_C$ measured longitudinally between the center 713 of the front wheels 712 and the center 731 of the additional rear wheels 729 (when the wheels 712, 714, 729 are in a straight ahead orientation—i.e., not turning).

As shown in FIG. 34, the frame 716 of the vehicle 710 is assembled by using the same rear frame module 350 that is used to assemble the vehicles 10, 510. However, other frame modules 850, 950 are also connected to the rear frame module 350 to assemble the vehicle 710. Notably, an alternative front frame module 850 (FIG. 38) defining a cockpit 722 of the vehicle 710 and an additional rear frame module 950 (FIG. 41) are connected to the rear frame module 350 in order to form the frame 716 of the vehicle 710. The additional rear frame module 950 is rearward of the rear frame module 350. Thus, the rear frame module 350 may alternatively be referred to as a "central" frame module in the context of the vehicle 710 (and the suspension assemblies 720 and wheels 714 can be referred to as central suspension assemblies 720 and central wheels 714).

Figure 38:
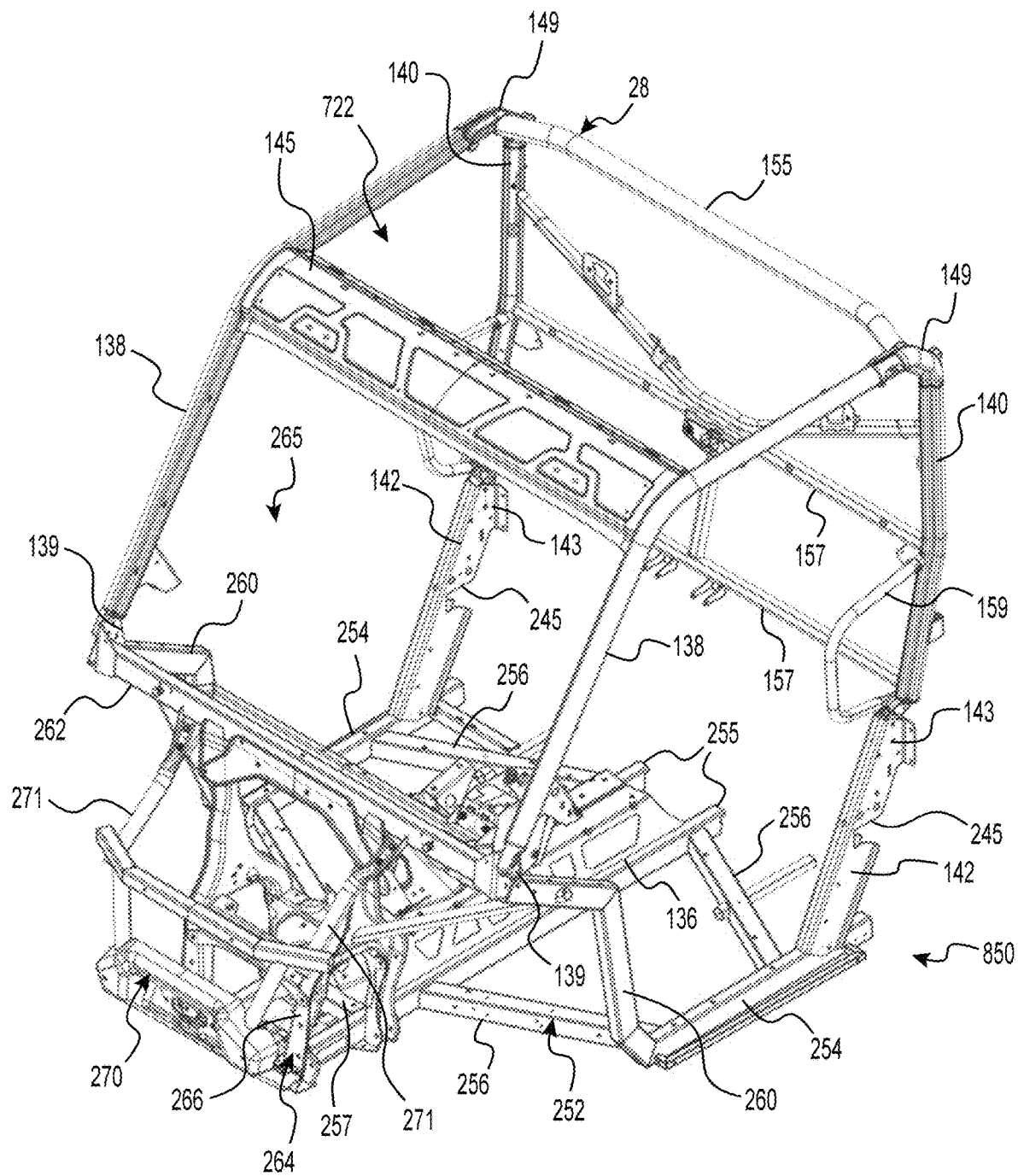
FIG. 38 is a perspective view taken from a front, left side of an alternative front frame module of a frame of the vehicle of FIG. 33.
Figure 39:
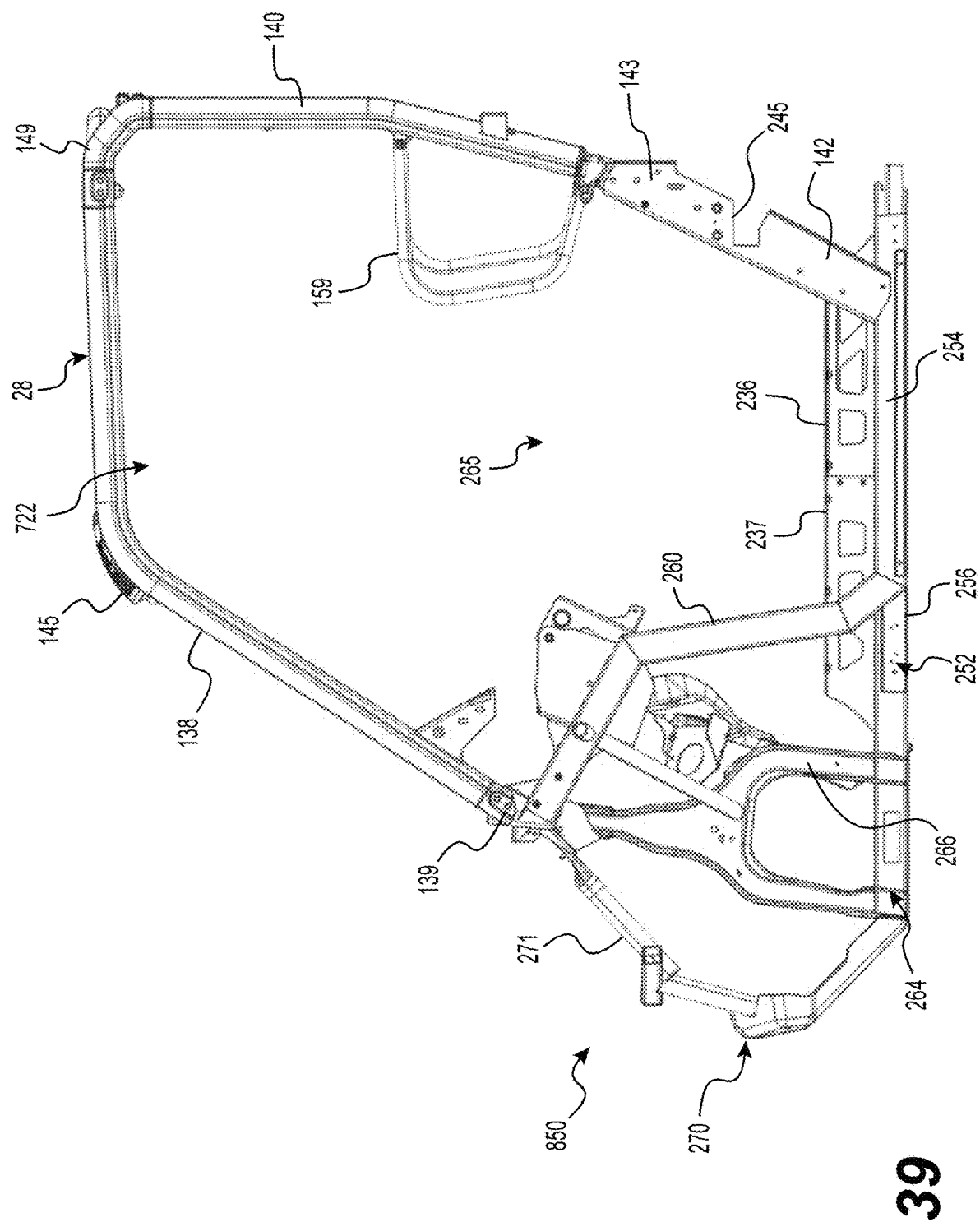
FIG. 39 is a left side elevation view of the alternative front frame module of FIG. 38.
Figure 40:
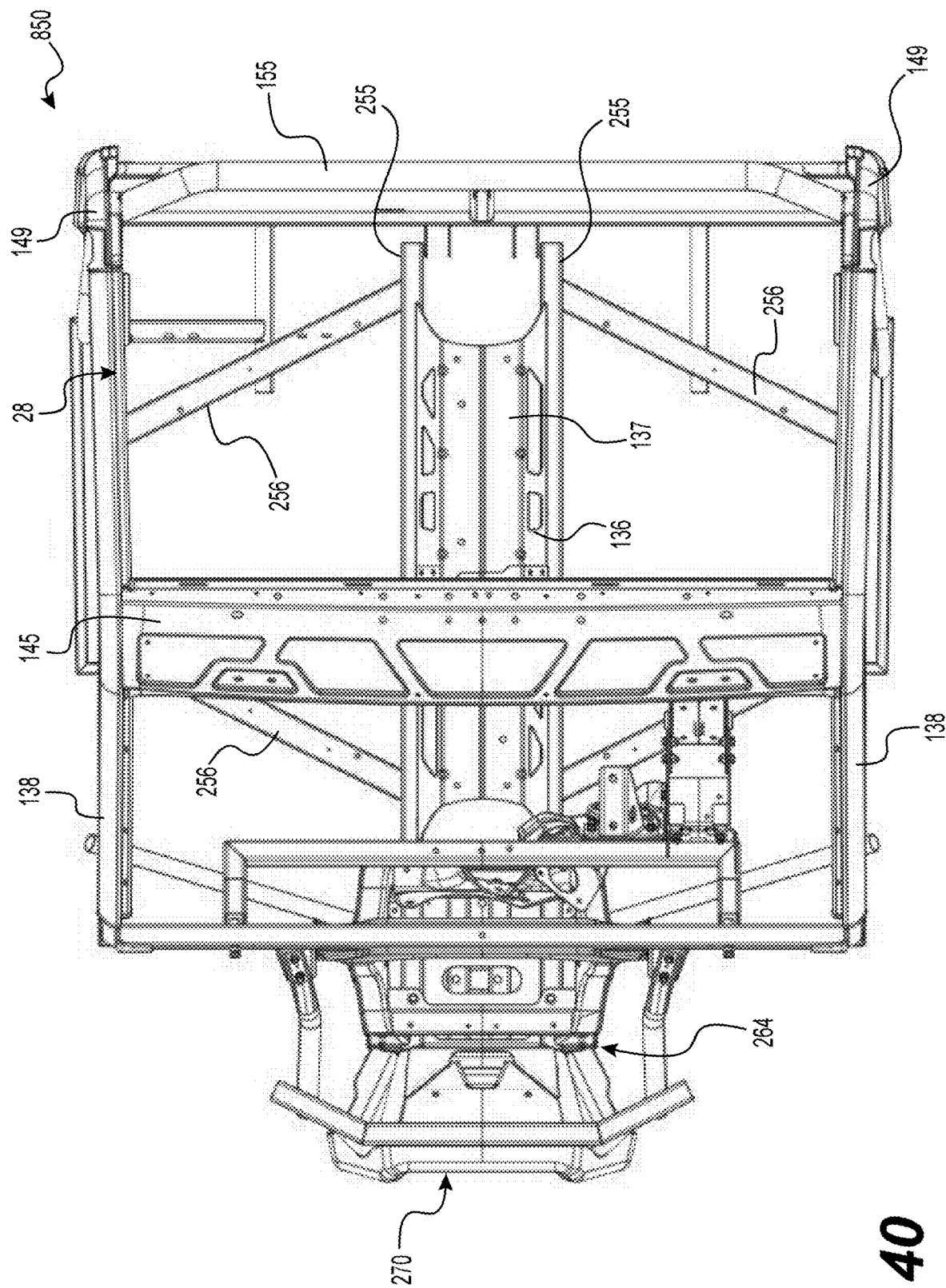
FIG. 40 is a top plan view of the alternative front frame module of FIG. 38.

As shown in FIGS. 38 to 40, the alternative front frame module 850 is similar to the first section 130 of the front frame module 250 described above and thus similar to the sub-module 250$_F$. Therefore, like components to that of the front frame module 250 have been identified with like reference numerals and will not be described here again. The recess 245 (FIGS. 38, 39) defined in each of the vertically-extending frame members 142 is configured for receiving therein the upper laterally-extending frame member 360 of the rear frame module 350. As such, when the frame 716 is assembled, the vertically-extending frame members 142 of the alternative front frame module 850 are supported by the vertical members 358 of the rear frame module 350 which are connected to the upper laterally-extending frame member 360. To connect the alternative front frame module 850 to the rear frame module 350, the vertical members 358 are fastened to the vertically-extending frame members 142.

Figure 37A:
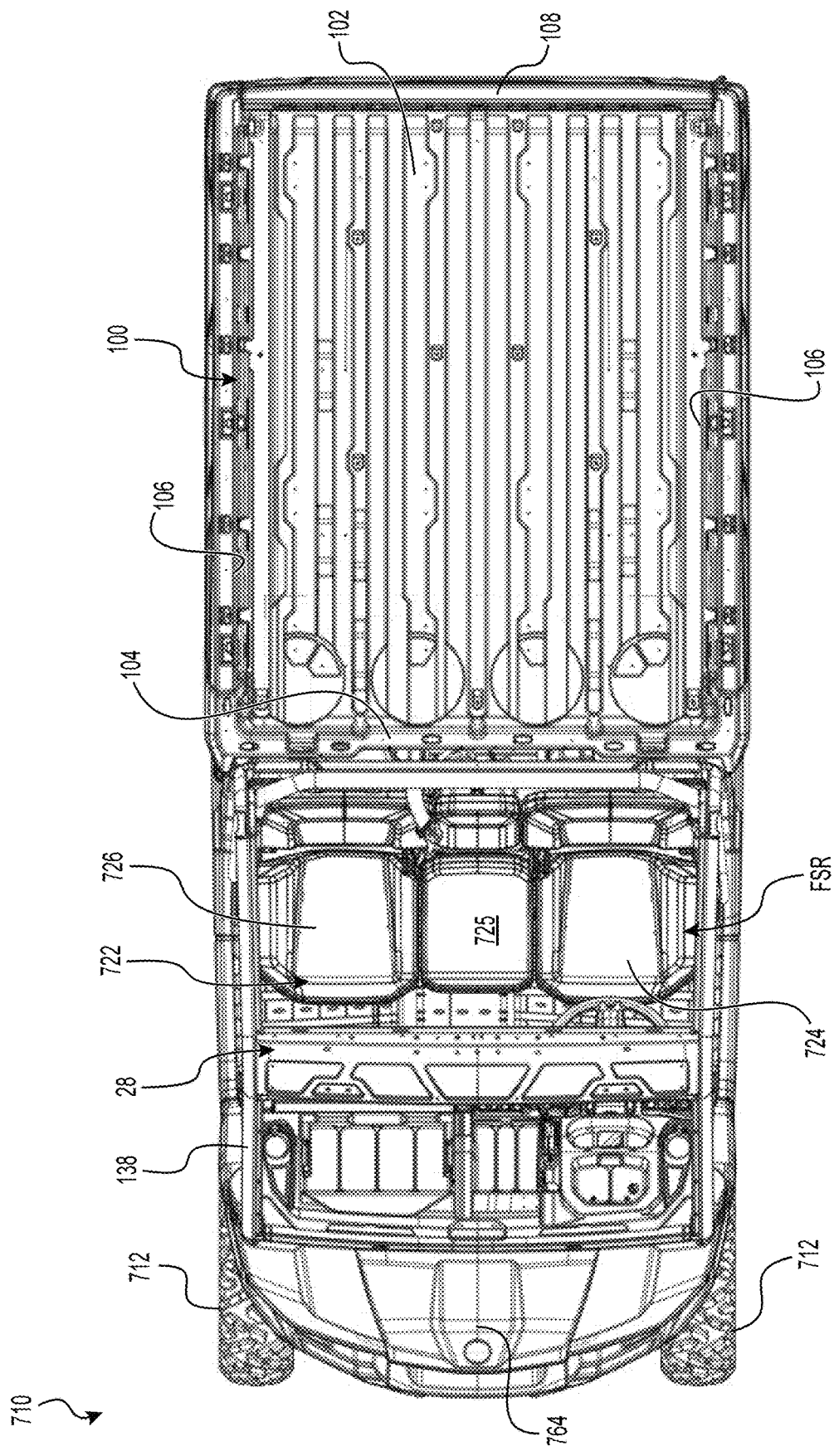
FIG. 37A is a top plan view of the vehicle of FIG. 33.
Figure 37B:
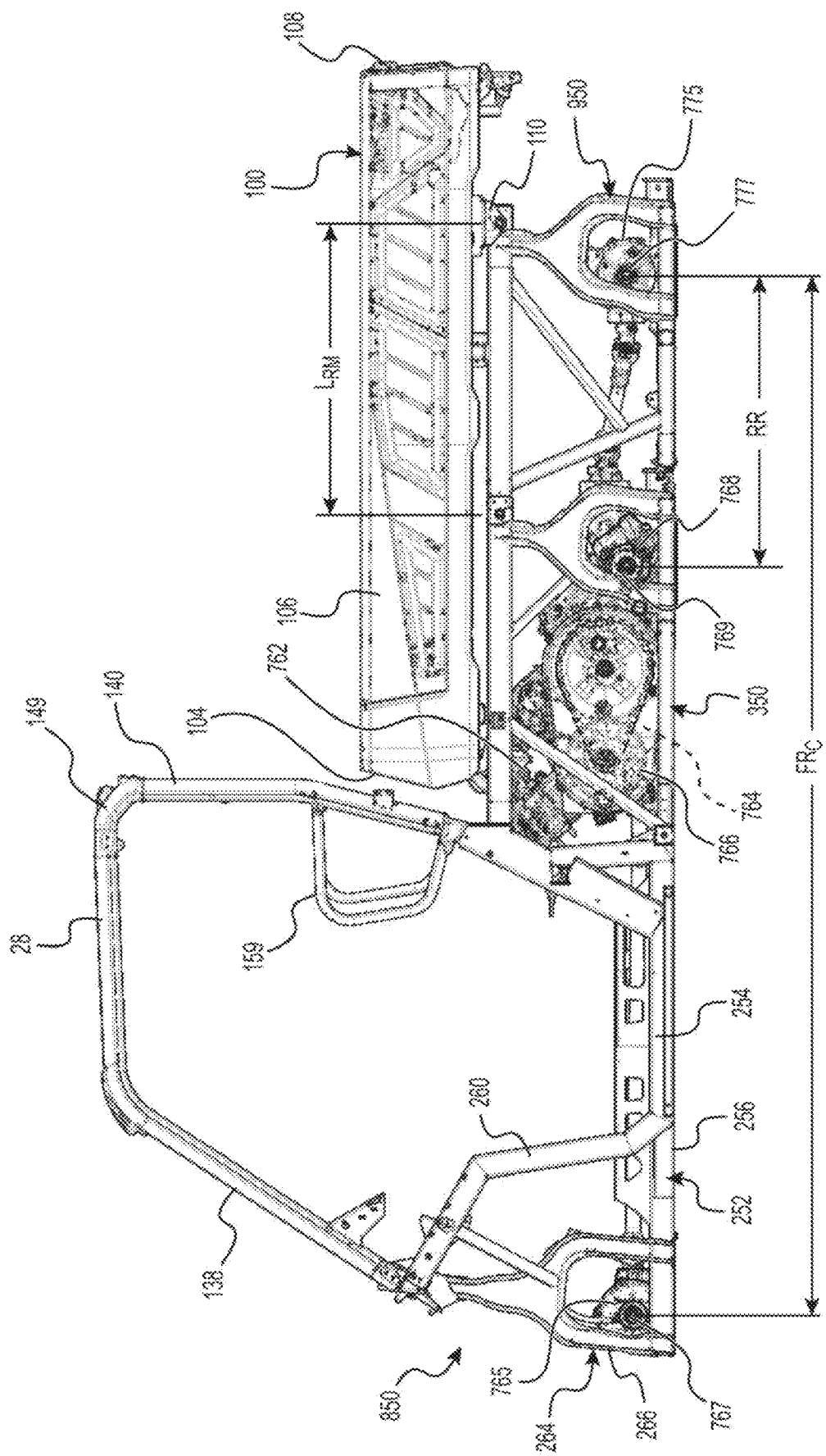
FIG. 37B is left side elevation view of part of a frame, an engine, a continuously variable transmission, a transaxle, a rear differential, a front differential, and a cargo bed of the vehicle of FIG. 33.
Figure 37C:
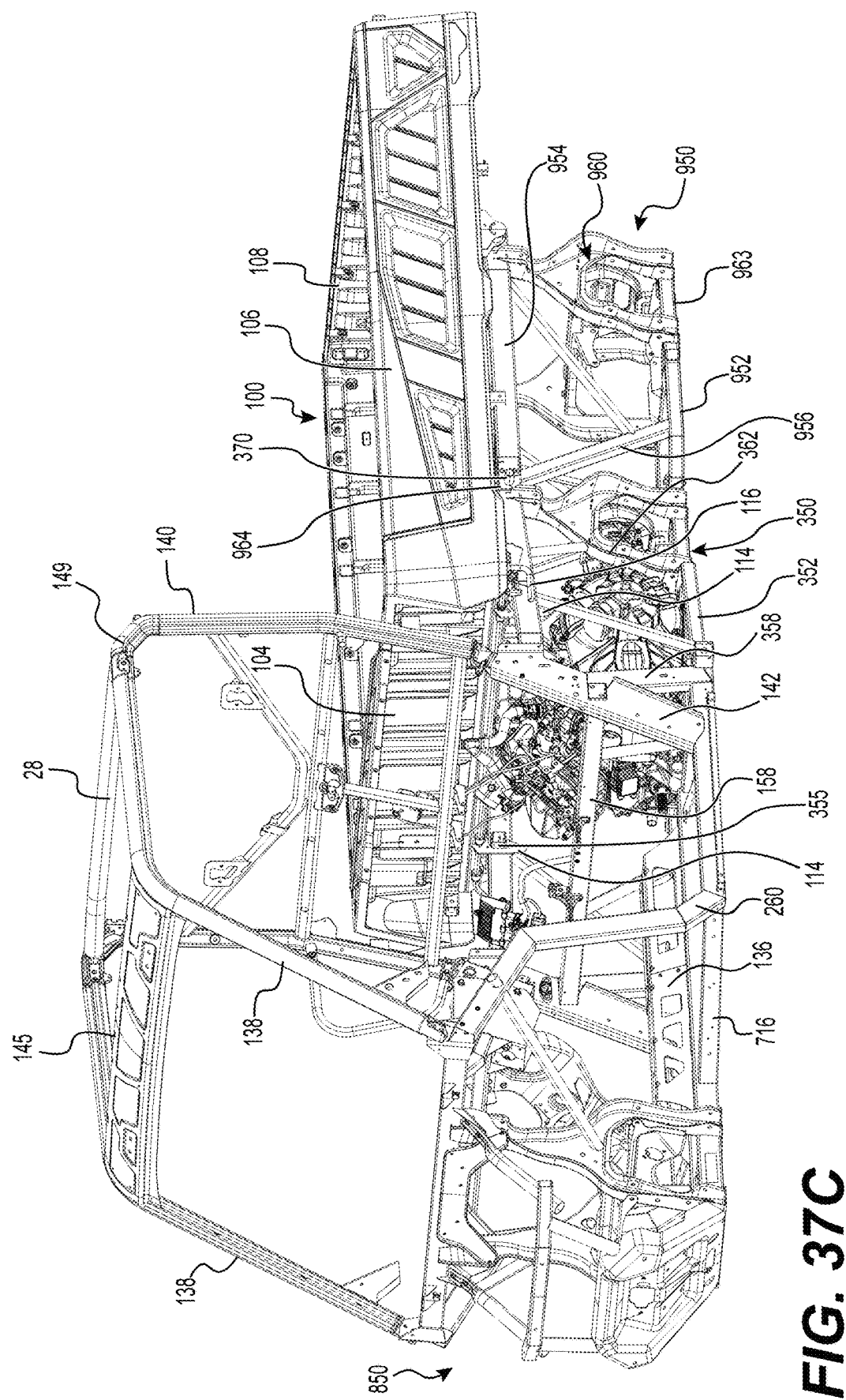
FIG. 37C is a perspective view taken from a front, left side of the vehicle components of FIG. 37B with the front and rear differentials and associated driveshaft removed for clarity.

As shown in FIG. 37B, a front differential 765 is mounted to the alternative front frame module 850. The front differential 765 has a front differential output axis 767 about which the half-shafts connected thereto rotate.

The roll cage 28 is connected to the alternative front frame module 850 to extend over the seat row FSR. In this embodiment, the roll cage 28 is the same short roll cage as that used for the vehicle 10, notably including the front and rear legs 138, 140. The front legs 138 are connected at a front of the cockpit 722 to the left and right roll cage mounts 139 defined at the ends of the laterally-extending upper frame member 262. The rear legs 140 are connected at a rear of the cockpit 722 to left and right roll cage mounts 143 defined at the top ends of the vertically-extending frame members 142 (located longitudinally rearward of the roll cage mounts 139). The roll cage mounts 143 include a plurality of openings extending laterally across the vertically-extending frame members 142. The front and rear legs 138, 140 are connected to one another via the connectors 149 which are connected to one of each of the front and rear legs 138, 140.

Figure 41:
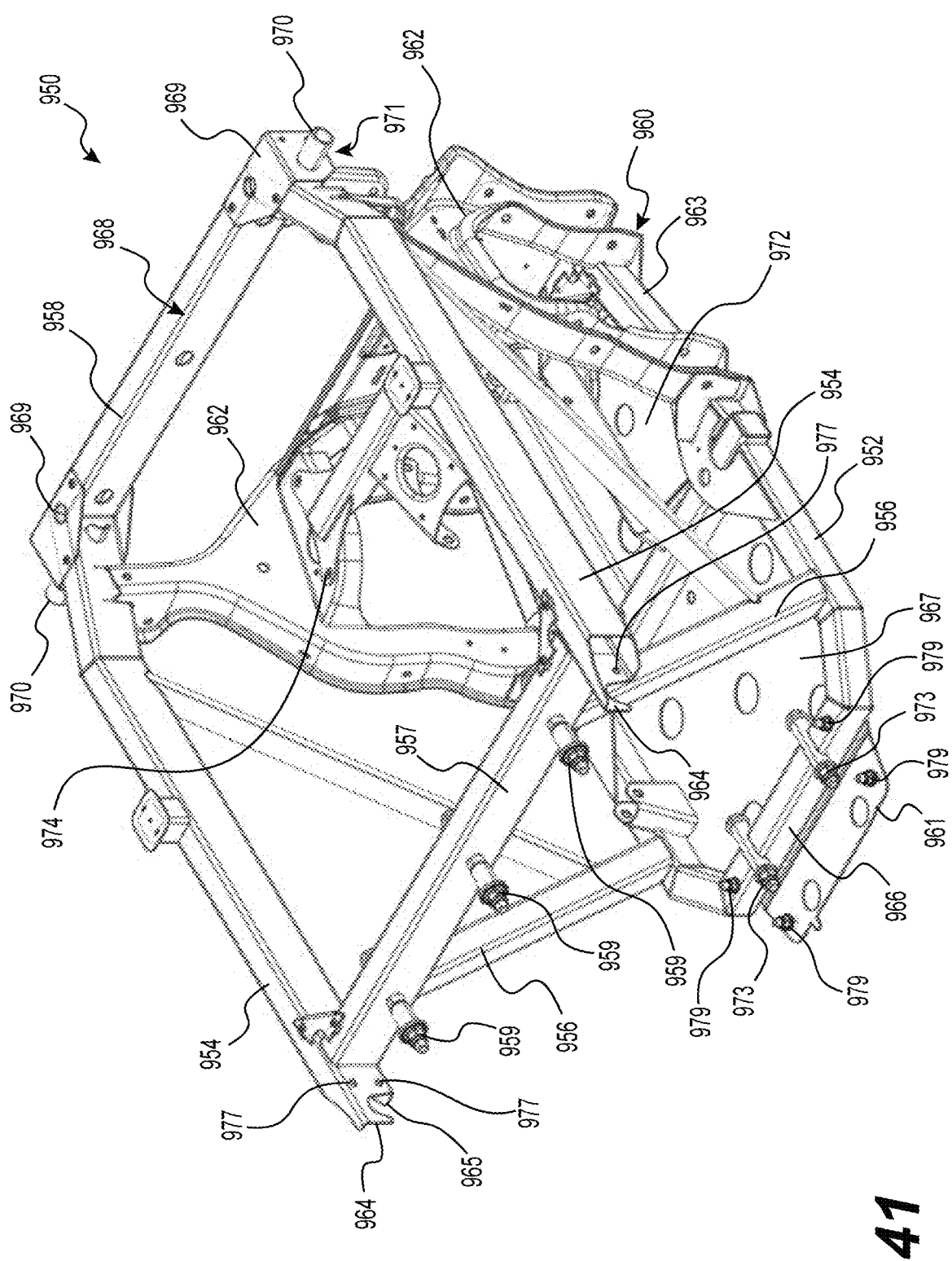
FIG. 41 is a perspective view taken from a front, left side of an additional rear frame module of the frame of the vehicle of FIG. 33.
Figure 42:
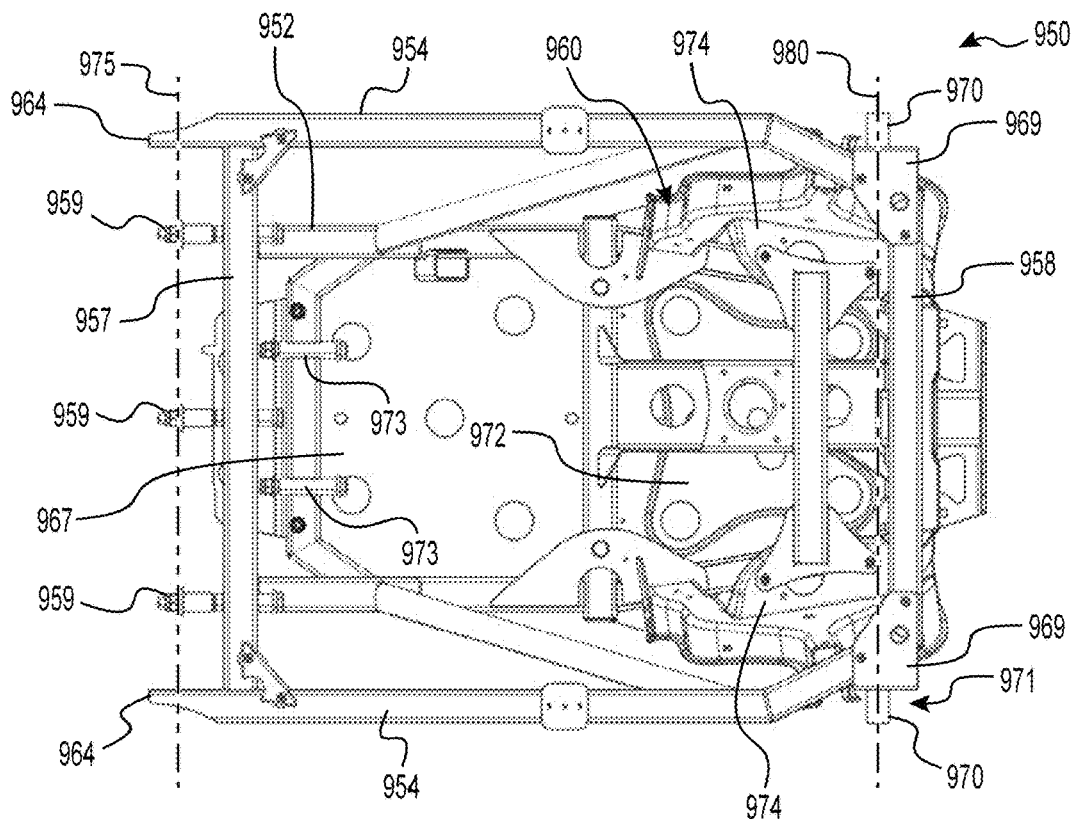
FIG. 42 is a top plan view of the additional rear frame module of FIG. 41.
Figure 43:
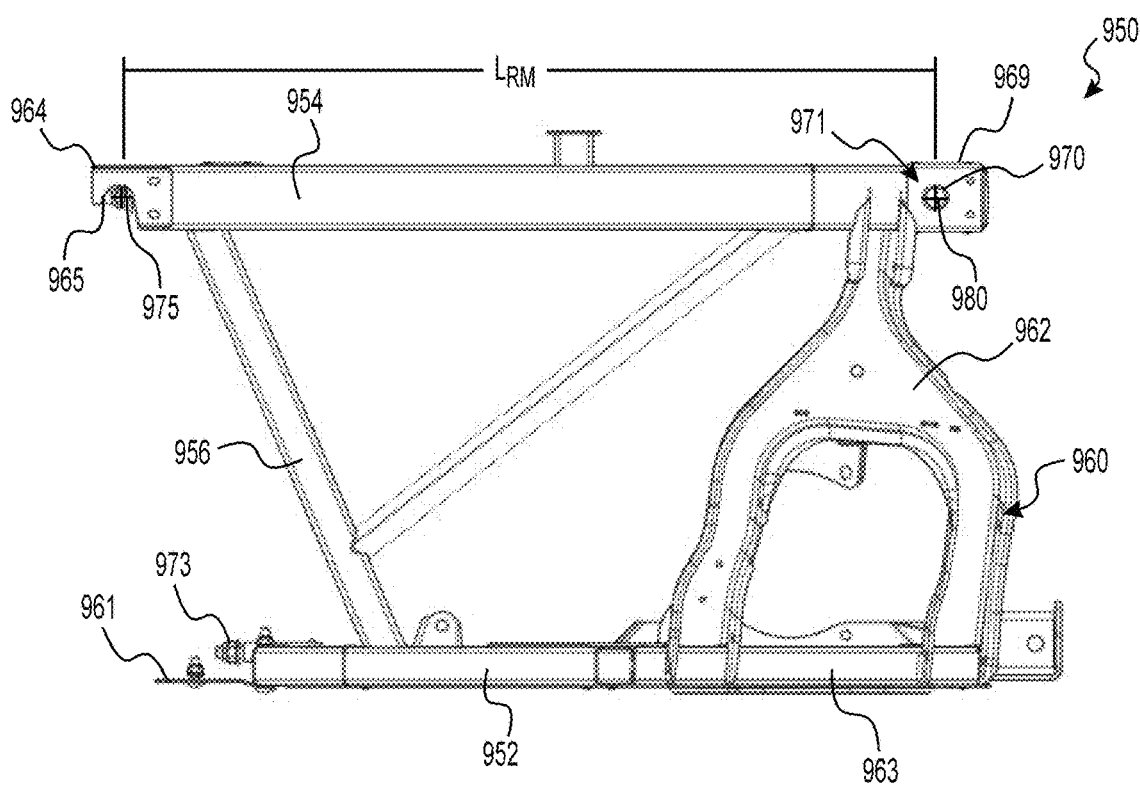
FIG. 43 is a left side elevation view of the additional rear frame module of FIG. 43.
Figure 44:
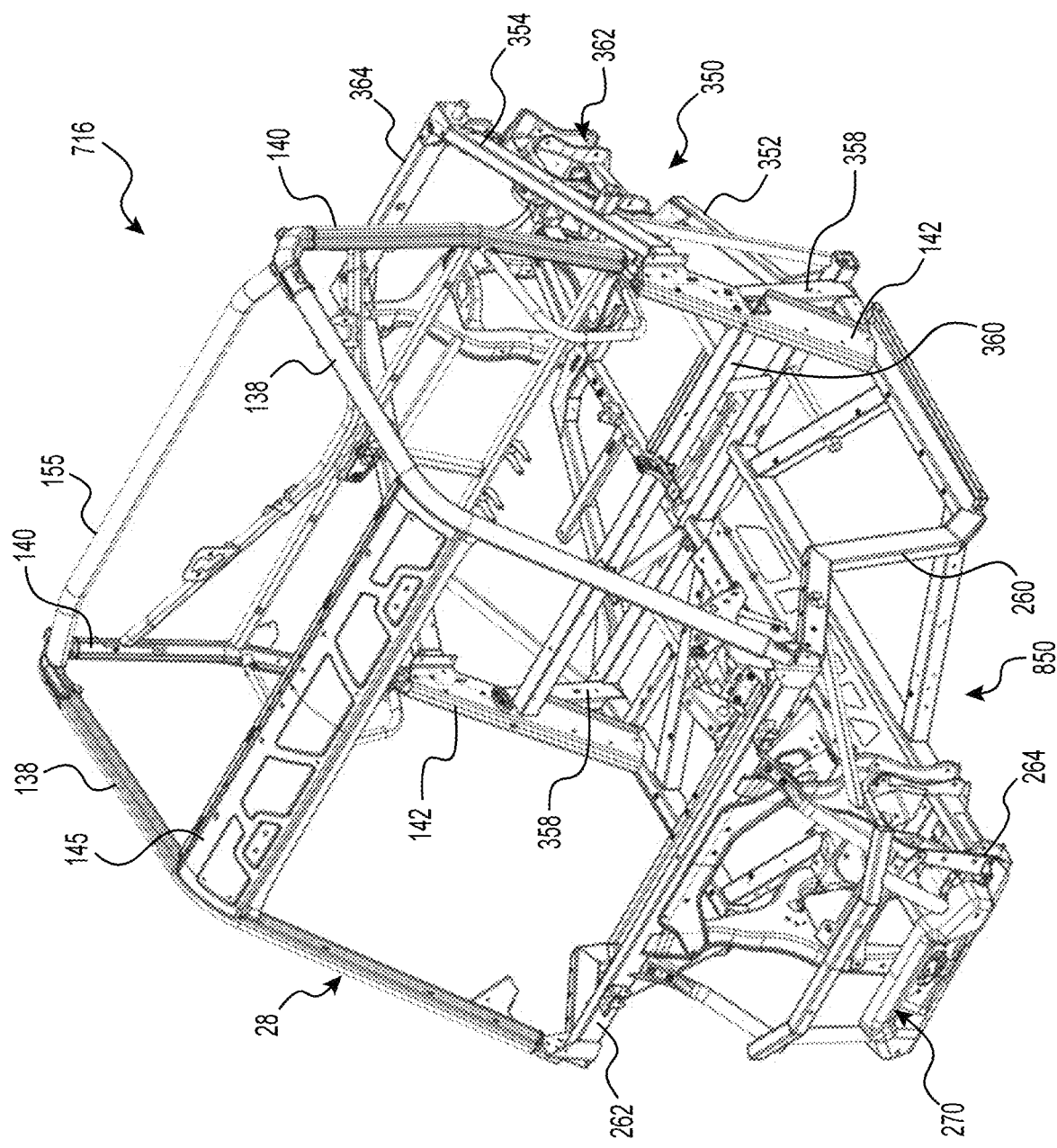
FIG. 44 is a perspective view taken from a front, left side of a portion of the frame of the vehicle of FIG. 33, including the alternative front frame module of FIG. 38 and the rear frame module of FIG. 10.
Figure 45:
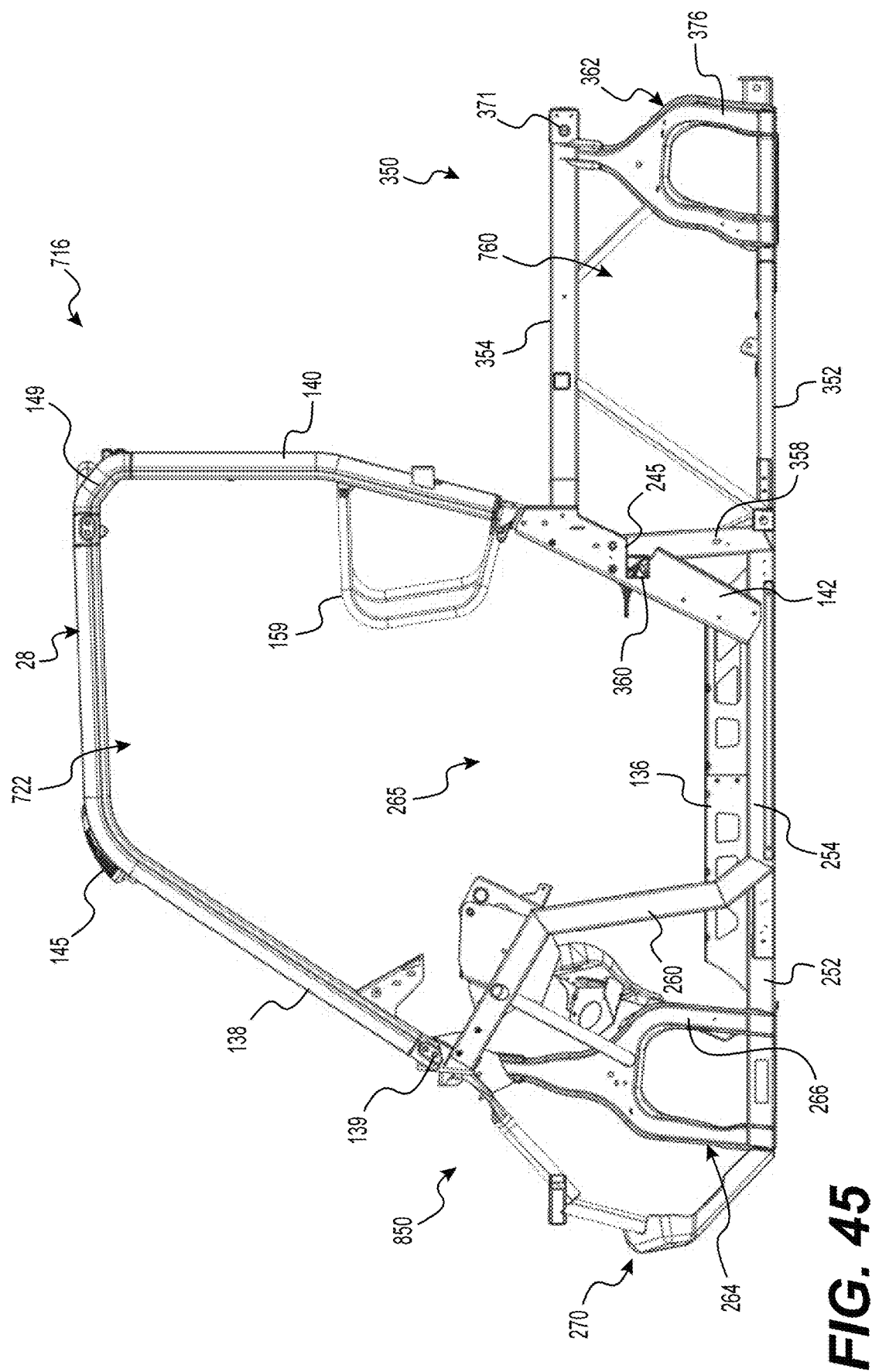
FIG. 45 is a left side elevation view of the portion of the frame of FIG. 44.
Figure 46:
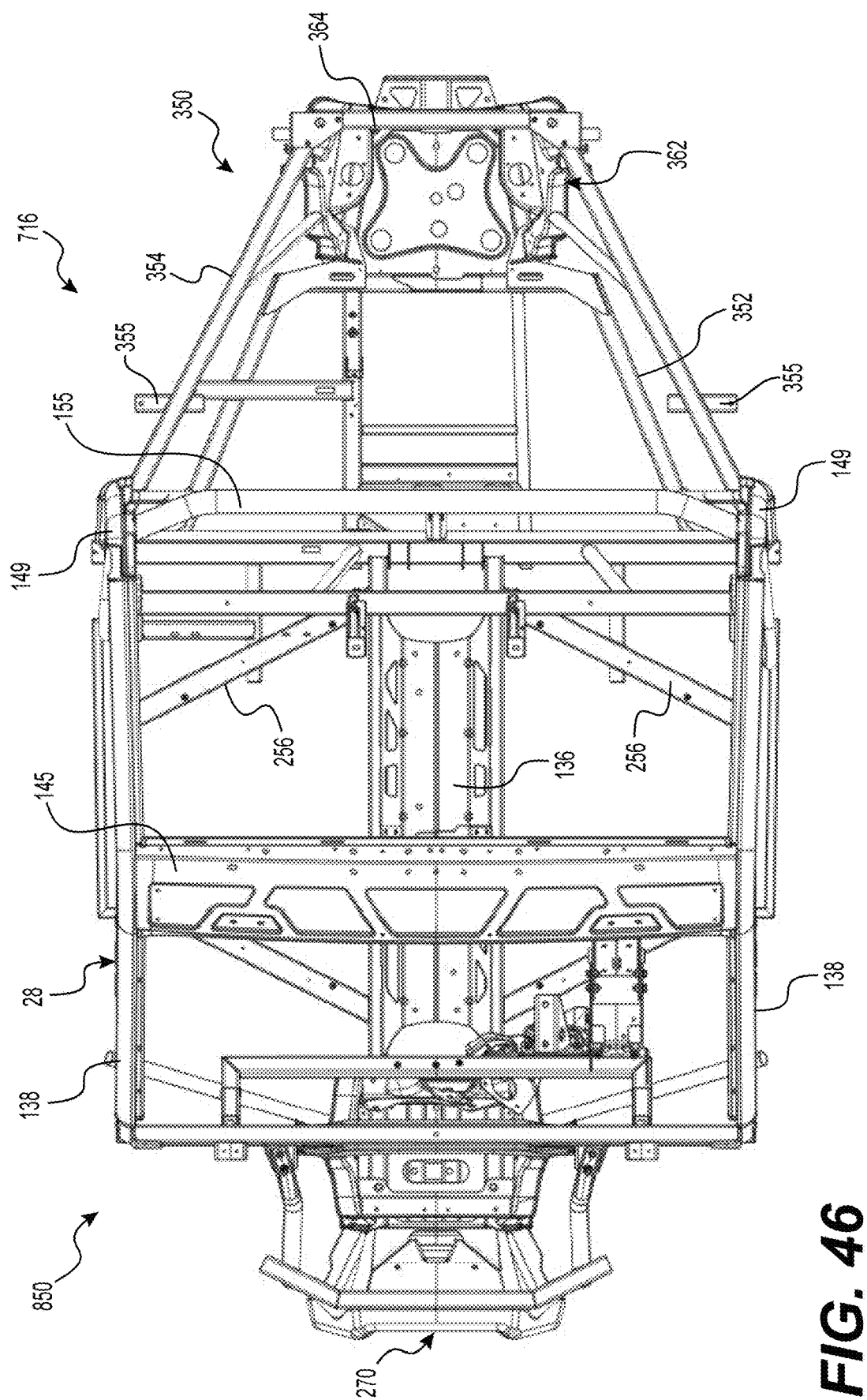
FIG. 46 is a top plan view of the portion of the frame of FIG. 44.

The additional rear frame module 950 is shown in FIGS. 41 to 43. The additional rear frame module 950 has lower longitudinally-extending frame members 952 and upper longitudinally-extending frame members 954. An upper laterally-extending frame member 957 extends between the frame members 954 near their front ends. Frontwardly and upwardly extending members 956 extend between the lower longitudinally-extending frame members 952 and the upper laterally-extending frame member 957. At their rear ends, the frame members 954 are connected to one another by an upper laterally-extending frame member 958. The longitudinally-extending frame members 954 have connecting portions 964 at their front ends. The connecting portions 964 are affixed to a rear top portion of the rear frame module 350 via permanent fasteners (not shown) such as, for example Hemlok® fasteners by Avdel, extending through openings 977 defined by the connecting portions 964. Each connecting portion 964 has a recess 965 for engaging a corresponding axle 370 of the rear frame module 350. In this embodiment, each of the recesses 965 forms a hook for engaging the corresponding axles 370. The recesses 965 define a central axis 975 that extends laterally through a center of each of the recesses 965. Moreover, the upper laterally-extending frame member 957 has fasteners 959 protruding forwardly therefrom to connect with the rear laterally-extending frame member 364 of the rear frame module 350. A front lower laterally-extending member 966 and a bottom connecting plate 961 extending forwardly therefrom are also configured to be connected to a rear bottom portion of the rear frame module 350 via fasteners 977 extending vertically. In this embodiment, the fasteners 977 are permanent fasteners such as, for example HuckBolts® by Arconic (e.g., Magna-Grip MGPB-E12-14). In addition, fasteners 973 extending forwardly from the front lower laterally-extending member 966 are also connected to the rear bottom portion of the rear frame module 350. The fasteners 959, 973 may be removable or permanent fasteners. In yet other embodiments, the fasteners 959, 973 may include a mix of removable and permanent fasteners.

The additional rear frame module 950 also has an additional rear suspension mounting structure 960 for connecting the additional rear suspension assemblies 723 to the frame 716. The rear suspension mounting structure 960 includes two inverted Y-shaped mounts 962 disposed laterally opposite from one another. The inverted Y-shaped mounts 962 are connected at a lower end thereof to the lower longitudinally-extending members 952 (via connecting members 963) and, at an upper end thereof, to the upper longitudinally-extending members 954. A rear bottom mounting plate 972 extends between the inverted Y-shaped mounts 962. Two upper mounting flanges 974 extend inwardly form the inverted Y-shaped mounts 962. A front bottom plate 967 extends between the lower longitudinally-extending members 952. A rear differential 775 (FIG. 37B) is connected to and supported by the additional rear frame module 950 of the frame 716 via one or more of the front and rear bottom plates 967, 972 and the flanges 974 or other structures of the additional rear frame module 950. The rear differential 775 is operatively connected to the transaxle 768. The rear differential 775 is connected by half-shafts (not shown) to the two additional rear wheels 729 to drive the two additional rear wheels 729. As shown in FIG. 37B, the rear differential 775 has a rear differential output axis 777 about which the half-shafts connected thereto rotate. The vehicle 710 has a front-rear output distance $FR_C$ measured longitudinally between the front differential output axis 767 and the rear differential output axis 777 (i.e., the distance between the frontmost output axis and the rearmost output axis).

At its top portion, the additional rear frame module 950 has a cargo bed support structure 968 for supporting the long cargo bed 100. More specifically, the cargo bed support structure 968 includes left and right corner members 969 connected to the ends of the rear laterally-extending frame member 958. Each of the corner members 969 has an axle 970 extending laterally outwardly therefrom. The axles 970 are coaxial with one another. Together, the axles 970 define in part a cargo bed pivot 971 for pivotably mounting the long cargo bed 100 to the additional rear frame module 950. As such, the long cargo bed 100 is pivotable about a cargo bed pivot axis 980 (FIGS. 42, 43) defined by the cargo bed pivot 971. More specifically, the brackets 110 connected to the bottom of the cargo bed 100 are pivotally connected to the cargo bed pivot 971 to allow the long cargo bed 100 to pivot about the cargo bed pivot axis 980. As shown in FIG. 34, the vehicle 10 has a longitudinal cargo pivot distance $PV_C$ measured between the center 713 of the front wheels 712 and the cargo bed pivot axis 980 (when the front wheels 712 are in a straight ahead orientation—i.e., not turning).

Furthermore, a distance $L_{RM}$ (as seen in FIG. 43) measured longitudinally between the central axis 975 of the recesses 965 and the cargo bed pivot axis 980 can be defined as a length of the additional rear frame module 950. As shown in FIG. 37B, the length $L_{RM}$ of the additional rear frame module 950 corresponds to a distance RR measured longitudinally between the transaxle output axis 769 of the transaxle 768 and the rear differential output axis 777 of the rear differential 775. That is, the length Lit is approximately equal to the distance RR. Furthermore, length $L_{RM}$ and the distance RR are approximately equal to a distance $WB_{C2}$ between the centers 715, 731 of the central wheels 714 and the additional rear wheels 729. As such, a difference between the wheelbase length $WB_C$ and the length $L_{RM}$ of the additional rear frame module 950 is equal to a distance $WB_{C1}$ between the centers 713, 715 of the front wheels 712 and the central wheels 714.

As briefly mentioned above and as shown in FIG. 37C, in the context of the vehicle 710, the laterally-extending retaining members 355 of the rear frame module 350 are used for retaining the cargo bed 100 in its lowered position. Notably, in the lowered position of the cargo bed 100, the hooks 114 of the lock 112 engage a respective one of the laterally-extending retaining members 355 to keep the cargo bed 100 in the lowered position. To that end, a distance between the laterally-extending retaining members 355 and the cargo bed pivot axis 980 in the vehicle 710 is approximately the same as a distance between the laterally-extending frame member 118 and the cargo bed pivot axis 380 in the vehicle 10 as the positioning of the lock 112 on the cargo bed 100 is the same in both vehicles.

Figure 47:
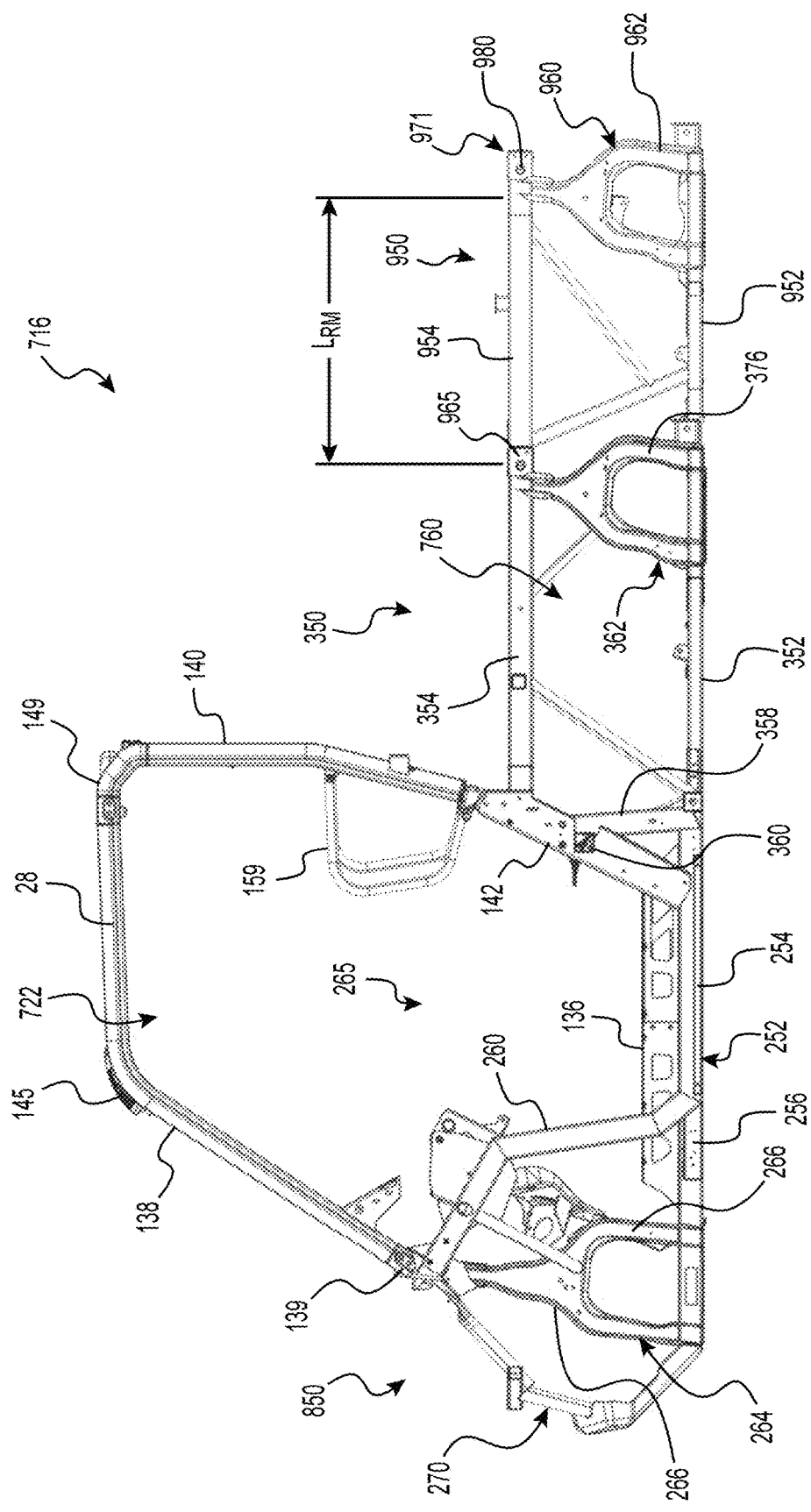
FIG. 47 is a left side elevation view of the frame of the vehicle of FIG. 33.

The assembled frame 716 is shown in FIG. 47. As shown, the frame 716 defines the seat row space 265 in the alternative front frame module 850. The motor compartment 760 of the vehicle 710, defined by the rear frame module 350, is disposed rearwardly of the cockpit 22 and frontwardly of the additional rear frame module 950. The two rear suspension mounting structures 362, 962 are disposed rearwardly of the cockpit 722. In the context of the vehicle 710, the rear frame module 350 can also be considered as a "cargo bed support structure extension" (similarly to the storage compartment structure 150 described above) in that it extends the structure of the frame 716 on which the cargo bed 100 is supported.

As shown in FIG. 34, a CVT air intake conduit 788 is provided to supply air inside the CVT housing to cool the CVT 764 (shown schematically in FIG. 34). The CVT air intake conduit 788 includes an inlet 790 in fluid communication with the CVT housing via a gooseneck and a pipe (not shown—similar to the gooseneck 92 and pipe 94 of the vehicle 10). The inlet 790 is disposed on a left side of the vehicle 710, rearward of the cockpit 722, and extending above the rear frame module 350. The air intake aperture defined by the inlet 790 faces leftward.

An engine air intake conduit (not shown) is also provided for supplying air to the motor 762 (shown schematically in FIG. 34). The engine air intake conduit is similar to the engine air intake conduit 74 of the vehicle 10 except that, similarly to the CVT air intake conduit 788, the inlet of the engine air intake conduit of the vehicle is located rearward of the cockpit 722 and extends above the rear frame module 350.

The vehicle 710 may have different and/or additional partitions than those described with reference to the vehicle 10 and the vehicle 510. Moreover, in the vehicle 710, the floor 218 extends between the frame members 142, 260 since there is no longer cockpit or a storage compartment to accommodate. The vehicle 710 also has body panels, including a hood 764, left and right front fenders 766, and left and right side panels 768. In this embodiment, the hood 764, front fenders 766 and side panels 768 are the same as those used for the vehicle 10 and the vehicle 510 (the hood 164, the front fenders 166, the side panels 168). It is contemplated that, in other embodiments, the body panels of the vehicle 710 could be different from those used for the vehicles 10, 510.

Despite the functional differences between the vehicles 10, 510, 710, the wheelbase lengths $WB_A$, $WB_B$, $WB_C$ of the vehicles 10, 510, 710 are all approximately the same. That is, the differences between the wheelbase lengths $WB_A$, $WB_B$, $WB_C$ are solely due to manufacturing tolerances (i.e., ±0.1%). In other words, the wheelbase lengths of the vehicles are approximately the same regardless of which of the rear seat row RSR or a cargo bed support structure extension is disposed rearwardly of the seat row FSR. Similarly, the longitudinal cargo pivot distances $PV_A$, $PV_B$, $PV_C$ of the vehicles 10, 510, 710 are all approximately the same. That is, the differences between the longitudinal cargo pivot distances $PV_A$, $PV_B$, $PV_C$ are solely due to manufacturing tolerances (i.e., ±0.1%). In other words, the longitudinal cargo pivot distances of the vehicles are approximately the same regardless of which of the rear seat row RSR or a cargo bed support structure extension is disposed rearwardly of the seat row FSR. Similarly, the front-rear output distances $FR_A$, $FR_B$, $FR_C$ of the vehicles 10, 510, 710 are all approximately the same. That is, the differences between the front-rear output distances $FR_A$, $FR_B$, $FR_C$ are solely due to manufacturing tolerances (i.e., ±0.1%). In other words, the front-rear output distances of the vehicles are approximately the same regardless of which of the rear seat row RSR or a cargo bed support structure extension is disposed rearwardly of the seat row FSR.

The common wheelbase lengths $WB_A$, $WB_B$, $WB_C$, longitudinal cargo pivot distances $PV_A$, $PV_B$, $PV_C$, and front-rear output distances $FR_A$, $FR_B$, $FR_C$ of the vehicles 10, 510, 710 allow avoiding a substantial redesign of the frames 16, 516, 716. Notably, if one or both of these dimensions were to vary substantially across the vehicles 10, 510, 710, the corresponding frame 16, 516, 716 would have to be redesigned to ensure it can support the load exerted thereon by the various vehicle components. Furthermore, by keeping these dimensions constant throughout the vehicles 10, 510, 710, certain components that are common to each of the vehicles 10, 510, 710 are ensured to fit the vehicles 10, 510, 710, thus avoiding designing different components with different dimensions for each of the vehicles 10, 510, 710. In turn, this may reduce the manufacturing complexity of the vehicles 10, 510, 710 while reducing their associated production costs.

Figure 50:
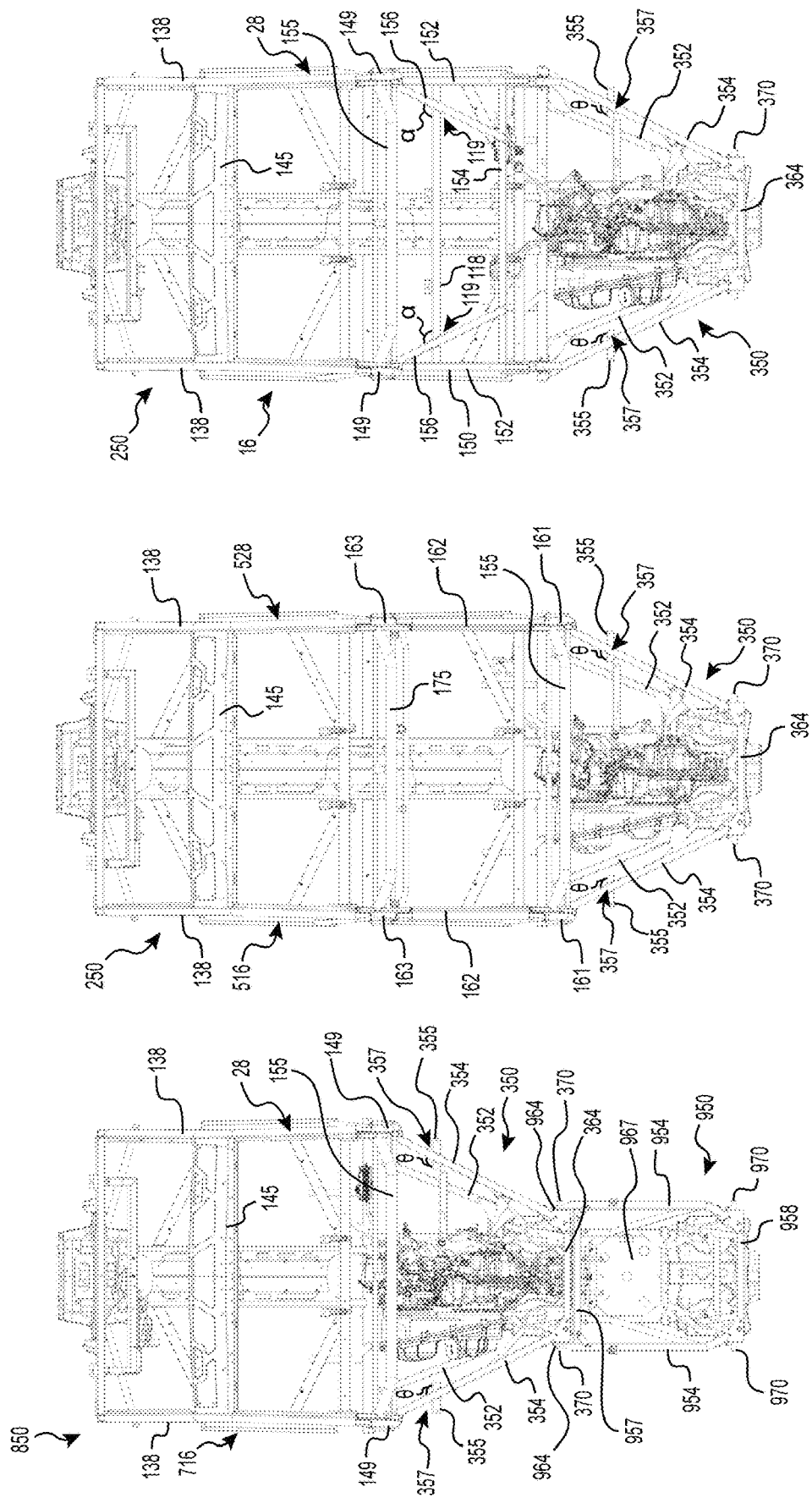
FIG. 50 is a top plan view of the frames of the vehicles of FIG. 1, FIG. 22 and FIG. 33, shown with their respective engines mounted thereto.

Furthermore, as can be seen in FIG. 50, the configuration of the structure of the frames 16, 516, 716 to which the hooks 114, 314 of the locks 112, 312 latch onto when the cargo beds 100, 300 are in the lowered position is substantially similar in each of the frames 16, 516, 716. As described above, in the context of the frame 16 of the vehicle 10, the hooks 114 of the lock 112 latch onto the laterally-extending frame member 118 of the storage compartment structure 150 when the cargo bed 100 is in the lowered position. On the other hand, in the context of the frames 516, 716 of the vehicles 510, 710, the hooks 114, 314 of the locks 112, 312 of the cargo beds 100, 300 (the cargo bed 100 for the vehicle 710, and the cargo bed 300 for the vehicle 510) latch onto the laterally-extending retaining members 355. However, in each of the frames 16, 516, 716, the geometry of the lock-engaging frame subassemblies 119, 357 which support the hooks 114, 314 is substantially similar, notably including, for each hook 114, 314, a laterally-extending member (laterally-extending frame member 118 or laterally-extending retaining member 355) and a supporting member (diagonal frame member 156 or longitudinally-extending frame member 354) connected to the laterally-extending member and disposed at a specific angle relative thereto. In particular, as described above, the angle α between the laterally-extending frame member 118 and each diagonal frame member 156 is equal to the angle θ between each laterally-extending retaining member 355 and a respective longitudinally-extending frame member 354. Given this similar geometry and constant angular disposition between these frame members throughout the frames 16, 516, 716, the cargo beds 100, 300 can be more easily installed on any given one of the frames 16, 516, 716 without needing further customization since the supporting structure is substantially similar in each case.

Figure 51:
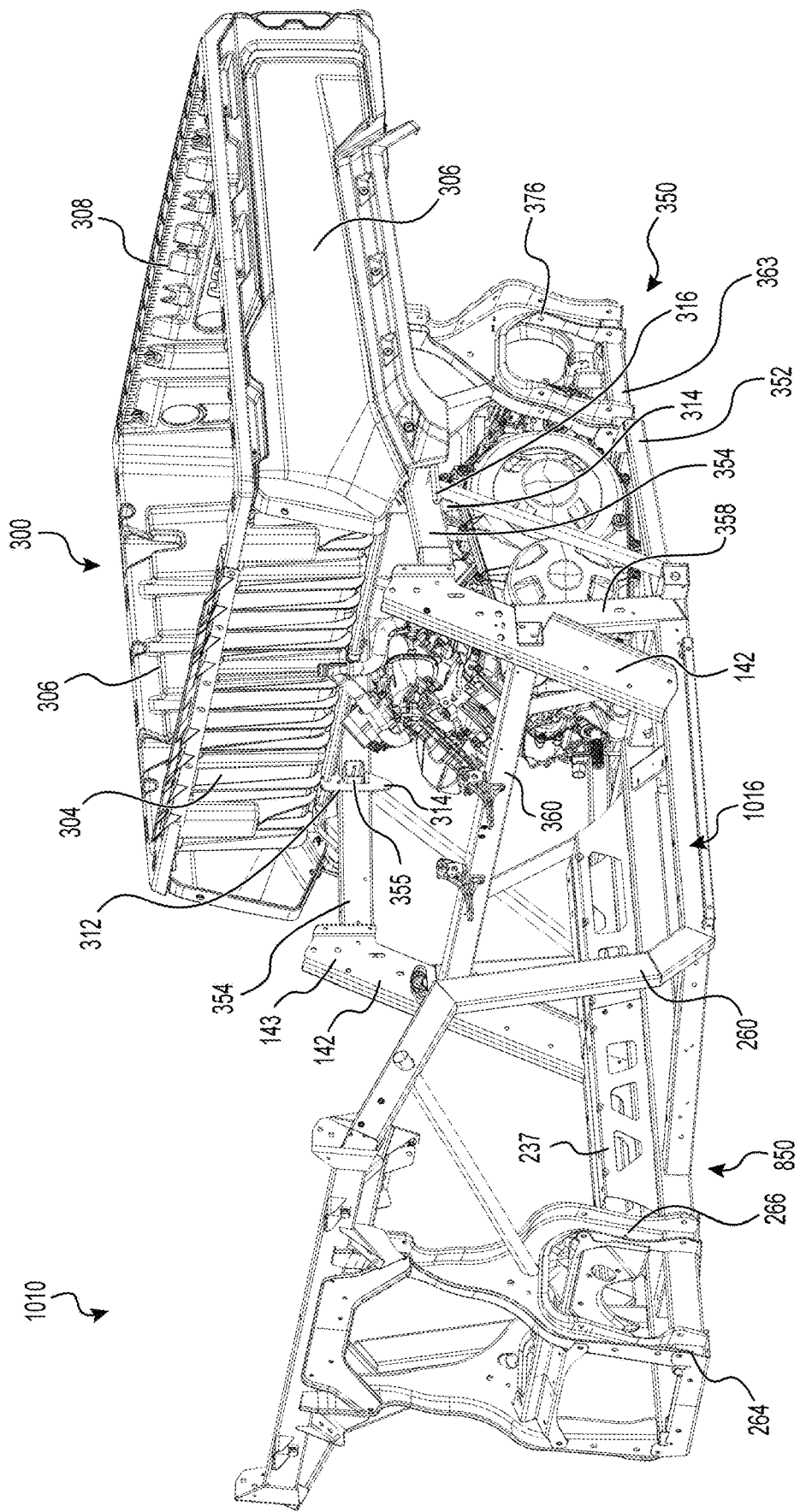
FIG. 51 is a perspective view taken from a front, left side of a portion of a frame of another vehicle, including the alternative frame module of FIG. 38 and the rear frame module of FIG. 10, and mounted with a cargo bed.
Figure 52:
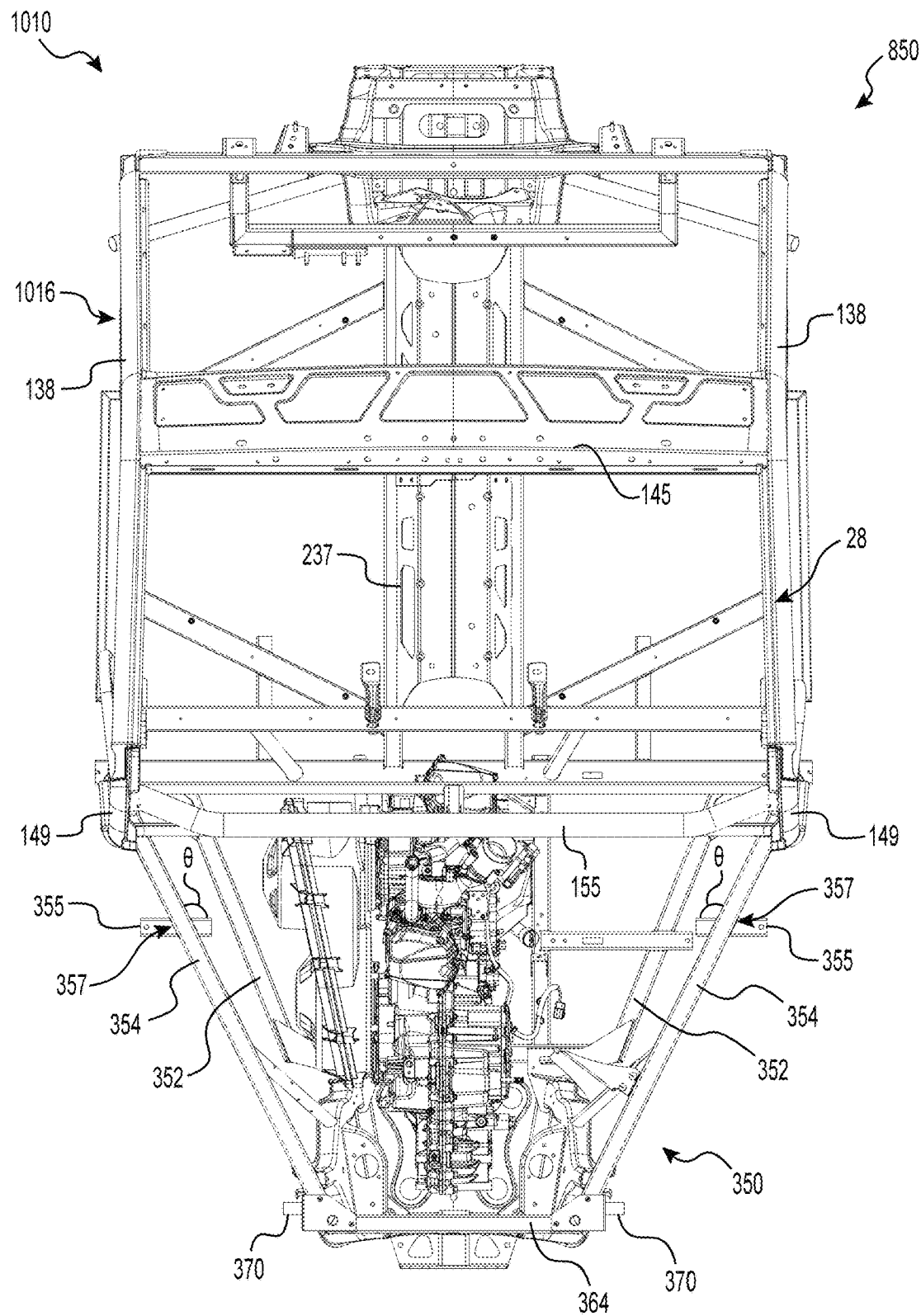
FIG. 52 is a top plan view of the frame of the vehicle of FIG. 51, shown with its engine mounted thereto.

This similarity between the geometry of the supporting structure of the frame onto which the hooks 114, 314 of the locks 112, 312 latch onto in the lowered position can also extend to other vehicles which are made from two or more of the frame modules 250, 350, 850, 950. For instance, a vehicle 1010, partially illustrated in FIGS. 51 and 52, is assembled by connecting the alternative front frame module 850 and the rear frame module 350 to one another to form a frame 1016 of the vehicle 1010. The vehicle 1010 is a four-wheeled vehicle with wheelbase that is smaller than the wheelbase lengths $WB_A$, $WB_B$, $WB_C$ of the vehicles 10, 510, 710. As shown in FIG. 51, the vehicle 1010 is equipped with the short cargo bed 300 which, through the hooks 314 of its lock 312, latches onto the laterally-extending retaining members 355 of the rear frame module 350. Furthermore, as shown in FIG. 52, as described above with respect to the frames 16, 516, 716 of the vehicles 10, 510, 710, the configuration of the structure of the frame 1016 to which the hooks 314 of the lock 312 latch onto when the cargo bed 300 is in the lowered position is substantially similar to that of the frames 16, 516, 716. Notably, the geometry of the lock-engaging frame subassembly 357 which support the hooks 314 in the vehicle 1010 is substantially similar as that in the vehicles 10, 510, 710, notably including, for each hook 314, a laterally-extending retaining member 355 and a longitudinally-extending frame member 354 connected thereto and disposed at the angle θ (which is equal to the angle α) relative thereto.

Figure 48:
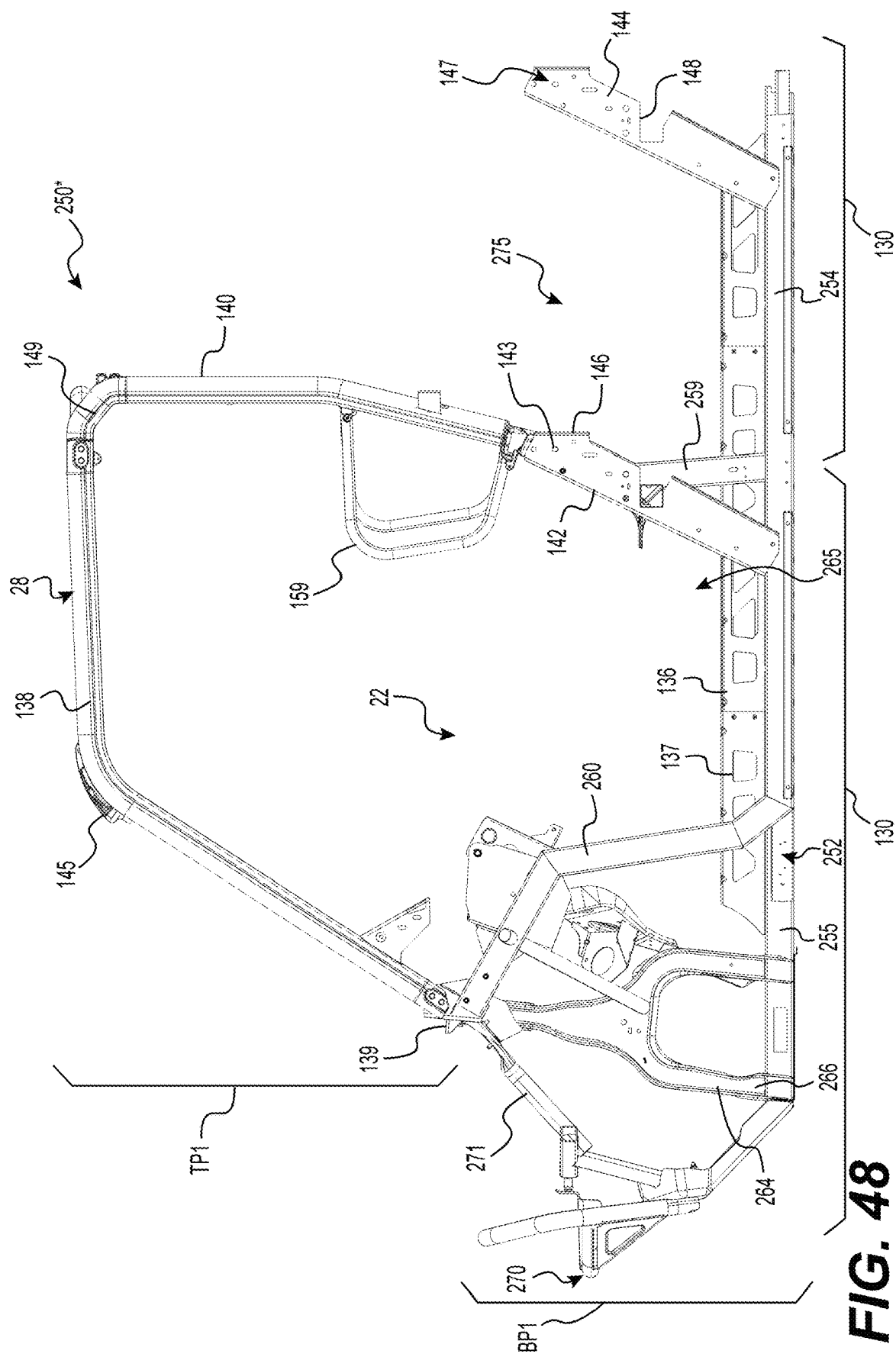
FIG. 48 is left side elevation view of an alternative embodiment of the front frame module of FIG. 7.
Figure 49:
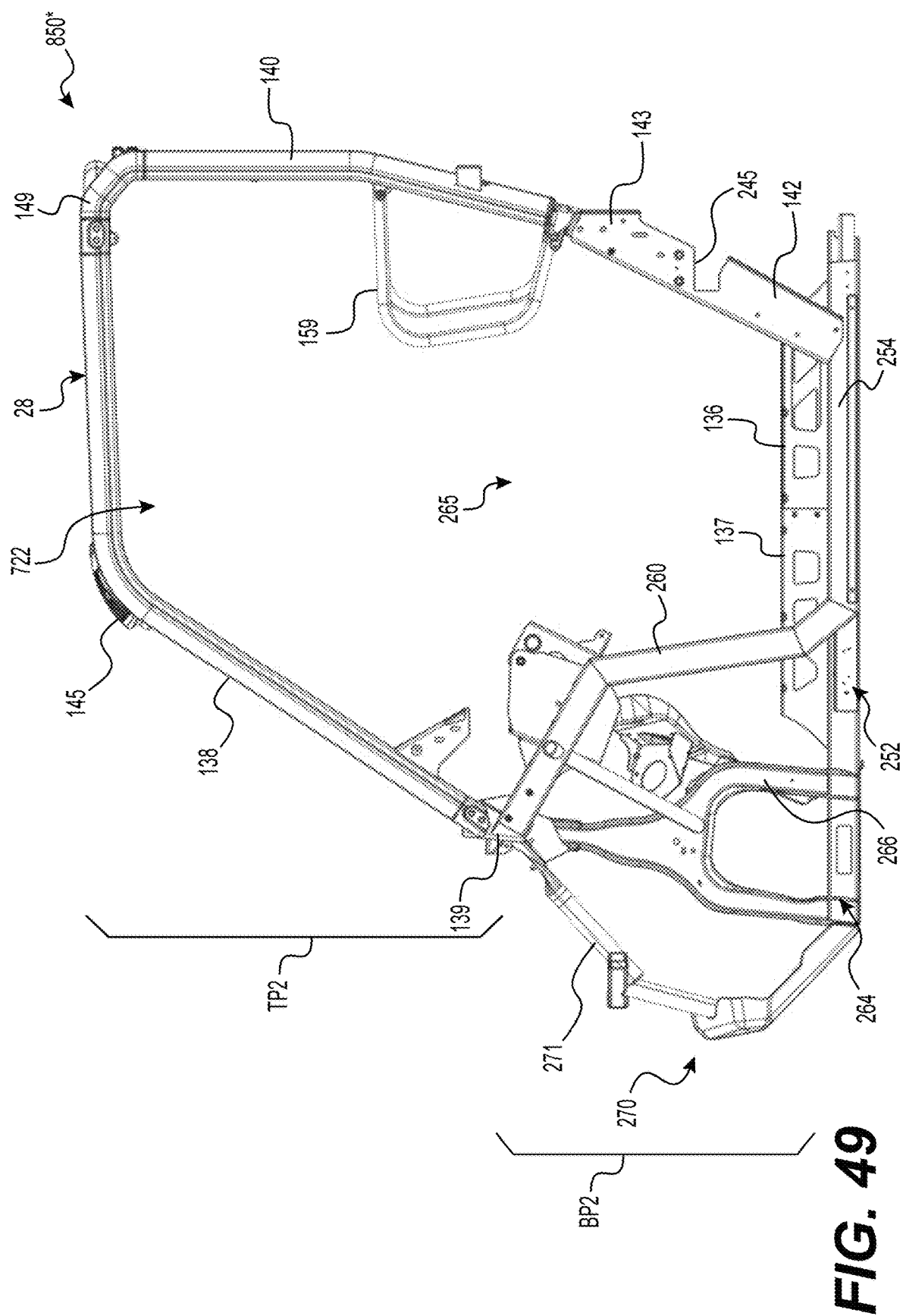
FIG. 49 is a left side elevation view of an alternative embodiment of the alternative front frame module of FIG. 38.

It is contemplated that, in some embodiments, both the front frame module 250 and the alternative front frame module 850 may include part of the roll cage 28. For instance, as shown in FIGS. 48 and 49, each of a front frame module 250* and an alternative front frame module 850* could incorporate the front legs 138 and the rear legs 140 of the roll cage 28. The front frame module 250* and the alternative front frame module 850* could be used to assemble the respective frames 16, 716 of the vehicles 10, 710.

In such an embodiment, the distinction between the front frame module 250* and the alternative front frame module 850* is a lower portion thereof. Notably, the front frame module 250* has a top portion TP1 that is identical to a top portion TP2 of the alternative front frame module 850*. In this embodiment, the top portions TP1, TP2 include the front and rear legs 138, 140, the front upper lateral member 145, the rear upper lateral member 155 and the connectors 149. In some embodiments, the top portions TP1, TP2 may not include the rear legs 140.

On the other hand, the front frame module 250* has a base portion BP1 that is different from a base portion BP2 of the alternative front frame module 850*. In particular, the base portion BP1 has a length that is greater than a length of the base portion BP2. The base portions BP1, BP2 are connected to the respective top portions TP1, TP2 (via the roll cage mounts described above). The base portion BP1 includes the lower frame structure 252 of the front frame module 250*, as well as the vertically-extending frame members 142, 144, 260, the front suspension mounting structure 264 and the bumper structure 270. The base portion BP2 includes the lower frame structure 252 of the alternative front frame module 850*, as well as the vertically-extending frame members 142, 260, the front suspension mounting structure 264 and the bumper structure 270. Thus, in other words, the underlying structures of the base portions BP1, BP2 are identical from the respective front suspension mounting structures 264 to the vertically-extending frame members 142. Minor differences may exist between certain components of the base portions BP1, BP2. For instance, as shown in FIG. 49, the bumper structure 270 of the alternative front frame module 850* is different from the bumper structure 270 of the front frame module 250*.

As such, the lower frame structure 252 of the front frame module 250* extends rearwardly of the rear legs 140. In contrast, the rear legs 140 of the alternative front frame module 850* extend rearwardly of the lower frame structure 252 of the alternative front frame module 850*.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle, comprising:
   a frame comprising:
      a front frame module defining at least in part a cockpit of the vehicle including a front seat row space, the front frame module comprising a front suspension mounting structure;
      a rear frame module connected to the front frame module, the rear frame module comprising a rear suspension mounting structure and a cargo bed support structure defining at least in part a cargo bed pivot;
   a front seat row, including at least a driver seat, supported in the front seat row space defined by the front frame module;
   one of:
      a rear seat row disposed rearwardly of the front seat row; and
      a cargo bed support structure extension disposed rearwardly of the front seat row;
   a motor supported by the frame;
   left and right front suspension assemblies mounted to the front suspension mounting structure;
   left and right rear suspension assemblies mounted to the rear suspension mounting structure;
   left and right front wheels mounted to the front suspension assemblies;
   left and right rear wheels mounted to the rear suspension assemblies; and
   one of a short cargo bed and a long cargo bed pivotably mounted to the cargo bed pivot, the long cargo bed having a length that is greater than a length of the short cargo bed, the one of the short cargo bed and the long cargo bed being:
      the short cargo bed if the one of the rear seat row and the cargo bed support structure extension is the rear seat row; and
      the long cargo bed if the one of the rear seat row and the cargo bed support structure extension is the cargo bed support structure extension;
   the vehicle having:
      a wheelbase length measured longitudinally between respective centers of the front and rear wheels, the wheelbase length being approximately the same regardless of the one of the rear seat row and the cargo bed support structure extension being disposed rearwardly of the front seat row; and
      a longitudinal cargo pivot distance measured between the center of the front wheels and a cargo bed pivot axis defined by the cargo bed pivot, the longitudinal cargo pivot distance being approximately the same regardless of the one of the rear seat row and the cargo bed support structure extension being disposed rearwardly of the front seat row;
   wherein the front frame module comprises:
      first left and right roll cage mounts;
      second left and right roll cage mounts located longitudinally rearward of the first roll cage mounts; and
      third left and right roll cage mounts located longitudinally rearward of the second roll cage mounts; and
   a plurality of cage legs connected to respective ones of the first, second and third roll cage mounts.

2. The vehicle of claim 1, wherein:
   the rear frame module defines at least in part a motor compartment of the frame; and
   the motor is at least partly supported in the rear frame module.

3. The vehicle of claim 2, wherein:
   the one of the rear seat row and the cargo bed support structure extension is the rear seat row;
   the plurality of cage legs comprises:
      front left and front right roll cage legs connected to the first roll cage mounts;
      intermediate left and intermediate right roll cage legs connected to the second roll cage mounts; and
      rear left and rear right roll cage legs connected to the third roll cage mounts,
      the front, intermediate and rear roll cage legs being connected to one another; and
   the short cargo bed is disposed rearwardly of the third roll cage mounts.

4. The vehicle of claim 2, wherein:
   the one of the rear seat row and the cargo bed support structure extension is the cargo bed support structure extension;
   the plurality of cage legs comprises:
      front left and front right roll cage legs connected to the first roll cage mounts; and
      rear left and rear right roll cage legs connected to the second roll cage mounts; and
   the long cargo bed extends, in a lowered position, forwardly of the third roll cage mounts.

5. The vehicle of claim 4, wherein:
   the front frame module comprises:
      a lower frame structure supporting a storage compartment floor; and
      vertically-extending frame members extending vertically from the lower frame structure; and
   the frame further comprises a storage compartment structure connected to the vertically-extending frame members, the storage compartment structure defining at least in part a top of a storage compartment such that the storage compartment structure and the storage compartment floor partly define the storage compartment therebetween.

6. The vehicle of claim 5, wherein the long cargo bed extends longitudinally, in the lowered position, over at least a portion of the storage compartment.

7. The vehicle of claim 2, wherein:
   the front frame module comprises:
      a first sub-module comprising the front suspension mounting structure; and
      a second sub-module connected to the first sub-module, the second sub-module defining a configurable space, the second sub-module being disposed rearwardly of the first sub-module;
   if the one of the rear seat row and the cargo bed support structure extension is the rear seat row, the second sub-module accommodates at least partly the rear seat row in the configurable space.

8. The vehicle of claim 7, wherein:
if the one of the rear seat row and the cargo bed support structure extension is the cargo bed support structure extension, the long cargo bed extends longitudinally, in a lowered position, over at least a portion of the configurable space of the second sub-module.

9. The vehicle of claim 1, wherein:
the front frame module is one of a first front frame module and a second front frame module;
the first front frame module comprises:
  a first top portion; and
  a first base portion extending below and connected to the first top portion;
the second front frame module comprises:
  a second top portion; and
  a second base portion extending below and connected to the second top portion;
the first top portion is identical to the second top portion; and
the first base portion is different from the second base portion.

10. The vehicle of claim 9, wherein the first and second top portions each comprise at least part of a roll cage of the vehicle.

11. The vehicle of claim 9, wherein:
the first base portion comprises a first lower frame structure for supporting a cockpit floor;
the second base portion comprises a second lower frame structure for supporting the cockpit floor; and
the first lower frame structure has a length that is greater than a length of the second lower frame structure.

12. The vehicle of claim 9, wherein:
the rear frame module is a rearmost rear frame module;
the rear suspension mounting structure is a rearmost rear suspension mounting structure;
the rear suspension assemblies are rearmost rear suspension assemblies;
the rear wheels are rearmost rear wheels;
the one of the rear seat row and the cargo bed support structure extension is the cargo bed support structure extension;
the frame further comprises a central frame module, the central frame module being connected between the front frame module and the rearmost rear frame module, the central frame module defining at least in part a motor compartment, the motor is at least partly supported in the central frame module, the central frame module comprising a central suspension mounting structure; and
the vehicle further comprises:
  left and right central suspension assemblies mounted to the central suspension mounting structure; and
  left and right central wheels mounted to the central suspension assemblies.

13. The vehicle of claim 9, wherein the first and second top portions each comprise at least part of a roll cage of the vehicle.

14. The vehicle of claim 9, wherein:
the first base portion comprises a first lower frame structure for supporting a cockpit floor;
the second base portion comprises a second lower frame structure for supporting the cockpit floor; and
the first lower frame structure has a length that is greater than a length of the second lower frame structure.

15. The vehicle of claim 9, wherein:
the rear frame module is a rearmost rear frame module;
the rear suspension mounting structure is a rearmost rear suspension mounting structure;
the rear suspension assemblies are rearmost rear suspension assemblies;
the rear wheels are rearmost rear wheels;
the one of the rear seat row and the cargo bed support structure extension is the cargo bed support structure extension;
the frame further comprises a central frame module, the central frame module being connected between the front frame module and the rearmost rear frame module, the central frame module defining at least in part a motor compartment, the motor is at least partly supported in the central frame module, the central frame module comprising a central suspension mounting structure; and
the vehicle further comprises:
  left and right central suspension assemblies mounted to the central suspension mounting structure; and
  left and right central wheels mounted to the central suspension assemblies.

16. The vehicle of claim 1, wherein:
each of the short cargo bed and the long cargo bed has a lock for retaining the cargo bed in a lowered position;
the rear frame module has a first lock-engaging frame subassembly for engaging and supporting the lock of either of the short and long cargo beds;
the cargo bed support structure extension has a second lock-engaging frame subassembly for engaging and supporting the lock of the long cargo bed; and
the first and second lock-engaging frame subassemblies have substantially similar geometries.

17. The vehicle of claim 16, wherein each of the first and second lock-engaging frame subassemblies includes:
a laterally-extending frame member for engaging the lock; and
a supporting frame member connected to and supporting the laterally-extending frame member, the laterally-extending frame member being disposed at a given angle relative to the laterally-extending frame member,
the given angle being substantially the same in the first lock-engaging frame subassembly and the second lock-engaging frame subassembly.

18. The vehicle of claim 16, wherein each of the first and second lock-engaging frame subassemblies includes:
a laterally-extending frame member for engaging the lock; and
a supporting frame member connected to and supporting the laterally-extending frame member, the laterally-extending frame member being disposed at a given angle relative to the laterally-extending frame member,
the given angle being substantially the same in the first lock-engaging frame subassembly and the second lock-engaging frame subassembly.

19. A method of assembling a vehicle of a family of vehicles, including at least a first vehicle and a second vehicle, the method comprising:
providing a front frame module defining at least in part a cockpit of the vehicle, the front frame module comprising:
  a front suspension mounting structure for mounting left and right front suspension assemblies of the vehicle, the left and right front suspension assemblies being configured to operatively connect left and right front wheels of the vehicle to the front frame module;

providing a rear frame module defining at least in part a motor compartment of the vehicle for supporting a motor of the vehicle, the rear frame module comprising:
- a rear suspension mounting structure for mounting left and right rear suspension assemblies of the vehicle, the left and right rear suspension assemblies being configured to operatively connect left and right rear wheels to the rear frame module; and
- a cargo bed support structure for supporting a cargo bed of the vehicle, the cargo bed support structure defining at least in part a cargo bed pivot for pivotably mounting the cargo bed;

providing a group of cargo beds, including a short cargo bed and a long cargo bed, the long cargo bed having a length that is greater than a length of the short cargo bed;

when assembling the first vehicle:
- connecting the front frame module to the rear frame module;
- mounting the short cargo bed to the cargo bed pivot;
- mounting first front suspension assemblies and first rear suspension assemblies to the front and rear frame modules respectively; and
- mounting first front wheels and first rear wheels to the first front and first rear suspension assemblies respectively,
- the first vehicle having a first wheelbase length measured longitudinally between respective centers of the first front and first rear wheels,
- the first vehicle having a first longitudinal cargo pivot distance measured between the center of the first front wheels and a cargo bed pivot axis defined by the cargo bed pivot;

when assembling the second vehicle:
- connecting the front frame module to the rear frame module;
- mounting the long cargo bed to the cargo bed pivot;
- mounting second front suspension assemblies and second rear suspension assemblies to the front and rear frame modules respectively; and
- mounting second front wheels and second rear wheels to the second front and second rear suspension assemblies respectively,
- the second vehicle having a second wheelbase length measured longitudinally between the respective centers of the second front and second rear wheels,
- the second vehicle having a second longitudinal cargo pivot distance measured between the center of the second front wheels and the cargo bed pivot axis defined by the cargo bed pivot;

wherein:
- the first and second wheelbase lengths are approximately the same; and
- the first and second longitudinal cargo pivot distances are approximately the same.

20. A vehicle, comprising:
a frame comprising:
- a front frame module defining at least in part a cockpit of the vehicle including a front seat row space, the front frame module comprising a front suspension mounting structure;
- the front frame module is one of a first front frame module and a second front frame module;

the first front frame module comprises:
- a first top portion; and
- a first base portion extending below and connected to the first top portion;

the second front frame module comprises:
- a second top portion; and
- a second base portion extending below and connected to the second top portion;

the first top portion is identical to the second top portion; and the first base portion is different from the second base portion; and a rear frame module connected to the front frame module, the rear frame module comprising a rear suspension mounting structure and a cargo bed support structure defining at least in part a cargo bed pivot;

a front seat row, including at least a driver seat, supported in the front seat row space defined by the front frame module;

one of:
- a rear seat row disposed rearwardly of the front seat row; and
- a cargo bed support structure extension disposed rearwardly of the front seat row;

a motor supported by the frame;

left and right front suspension assemblies mounted to the front suspension mounting structure;

left and right rear suspension assemblies mounted to the rear suspension mounting structure;

left and right front wheels mounted to the front suspension assemblies;

left and right rear wheels mounted to the rear suspension assemblies; and one of a short cargo bed and a long cargo bed pivotably mounted to the cargo bed pivot, the long cargo bed having a length that is greater than a length of the short cargo bed, the one of the short cargo bed and the long cargo bed being:
- the short cargo bed if the one of the rear seat row and the cargo bed support structure extension is the rear seat row; and
- the long cargo bed if the one of the rear seat row and the cargo bed support structure extension is the cargo bed support structure extension;

the vehicle having:
- a wheelbase length measured longitudinally between respective centers of the front and rear wheels, the wheelbase length being approximately the same regardless of the one of the rear seat row and the cargo bed support structure extension being disposed rearwardly of the front seat row; and a longitudinal cargo pivot distance measured between the center of the front wheels and a cargo bed pivot axis defined by the cargo bed pivot, the longitudinal cargo pivot distance being approximately the same regardless of the one of the rear seat row and the cargo bed support structure extension being disposed rearwardly of the front seat row.

21. A vehicle, comprising:
a frame comprising:
- a front frame module defining at least in part a cockpit of the vehicle including a front seat row space, the front frame module comprising a front suspension mounting structure;
- a rear frame module connected to the front frame module, the rear frame module comprising a rear suspension mounting structure and a cargo bed support structure defining at least in part a cargo bed pivot;
a front seat row, including at least a driver seat, supported in the front seat row space defined by the front frame module;
one of:
- a rear seat row disposed rearwardly of the front seat row; and
- a cargo bed support structure extension disposed rearwardly of the front seat row;

a motor supported by the frame;
left and right front suspension assemblies mounted to the front suspension mounting structure;
left and right rear suspension assemblies mounted to the rear suspension mounting structure;
left and right front wheels mounted to the front suspension assemblies;
left and right rear wheels mounted to the rear suspension assemblies; and
one of a short cargo bed and a long cargo bed pivotably mounted to the cargo bed pivot, the long cargo bed having a length that is greater than a length of the short cargo bed, the one of the short cargo bed and the long cargo bed being:
- the short cargo bed if the one of the rear seat row and the cargo bed support structure is the rear seat row; and
- the long cargo bed if the one of the rear seat row and the cargo bed support structure extension is the cargo bed support structure extension;

each of the short cargo bed and the long cargo bed has a lock for retaining the cargo bed in a lowered position;
the rear frame module has a first lock-engaging frame subassembly for engaging and supporting the lock of either of the short and long cargo beds;
the cargo bed support structure extension has a second lock-engaging frame subassembly for engaging and supporting the lock of the long cargo bed;
the first and second lock-engaging frame subassemblies have substantially similar geometries; and
the vehicle having:
- a wheelbase length measured longitudinally between respective centers of the front and rear wheels, the wheelbase length being approximately the same regardless of the one of the rear seat row and the cargo bed support structure extension being disposed rearwardly of the front seat row; and
- a longitudinal cargo pivot distance measured between the center of the front wheels and a cargo bed pivot axis defined by the cargo bed pivot, the longitudinal cargo pivot distance being approximately the same regardless of the one of the rear seat row and the cargo bed support structure extension being disposed rearwardly of the front seat row.

* * * * *